(12) United States Patent
Shimizu

(10) Patent No.: US 9,341,768 B2
(45) Date of Patent: May 17, 2016

(54) LIGHTING DEVICE, DISPLAY DEVICE AND TELEVISION DEVICE

(71) Applicant: Sharp Kabushiki Kaisha, Osaka-shi, Osaka (JP)

(72) Inventor: Takaharu Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/395,554

(22) PCT Filed: Apr. 25, 2013

(86) PCT No.: PCT/JP2013/062205
§ 371 (c)(1),
(2) Date: Oct. 20, 2014

(87) PCT Pub. No.: WO2013/179831
PCT Pub. Date: Dec. 5, 2013

(65) Prior Publication Data
US 2015/0070593 A1    Mar. 12, 2015

(30) Foreign Application Priority Data

May 31, 2012    (JP) .................................. 2012-125226

(51) Int. Cl.
F21V 8/00    (2006.01)
G02F 1/1333    (2006.01)
(52) U.S. Cl.
CPC ............ G02B 6/0091 (2013.01); G02B 6/0061 (2013.01); G02B 6/0068 (2013.01); G02B 6/0088 (2013.01); G02F 1/133308 (2013.01); G02B 6/0043 (2013.01); G02F 2001/133325 (2013.01)

(58) Field of Classification Search
CPC .. G02B 6/0091; G02B 6/0088; G02B 6/0086; G02B 6/0061; G02F 1/133308
USPC ........................................ 362/613, 97.2, 97.3
See application file for complete search history.

(56) References Cited

FOREIGN PATENT DOCUMENTS

| JP | 2004-296193 A | 10/2004 |
|---|---|---|
| JP | 2008-275689 A | 11/2008 |
| JP | 2009-277641 A | 11/2009 |
| JP | 2011-216270 A | 10/2011 |
| JP | 2012-028142 A | 2/2012 |
| JP | 2012028142 A * | 2/2012 |

OTHER PUBLICATIONS

Official Communication issued in International Patent Application No. PCT/JP2013/062205, mailed on Jun. 4, 2013.

* cited by examiner

Primary Examiner — David V Bruce
(74) Attorney, Agent, or Firm — Keating & Bennett, LLP

(57) ABSTRACT

A backlight device includes a light guide plate, a first light source, a second light source, and a positioning portion. The light guide plate has at least one end surface as a light entrance surface and one plate surface as a light exit surface. The first light source is opposed to a first light entrance surface that is a first end surface of the light guide plate. The second light source is opposed to a second light entrance surface that is an end surface opposite from the first light entrance surface of the light guide plate. The second light source is arranged to have a distance from the second light entrance surface relatively greater than a distance between the first light source and the first light entrance surface. The positioning portion is configured to position the light guide plate in a direction in which the first light source, the light guide plate, and the second light source are arranged, and to position the light guide plate with respect to the first light source and the second light source. The positioning portion is arranged to have a distance from the second light entrance surface relatively greater than a distance from the first light entrance surface.

18 Claims, 32 Drawing Sheets

FIG.19
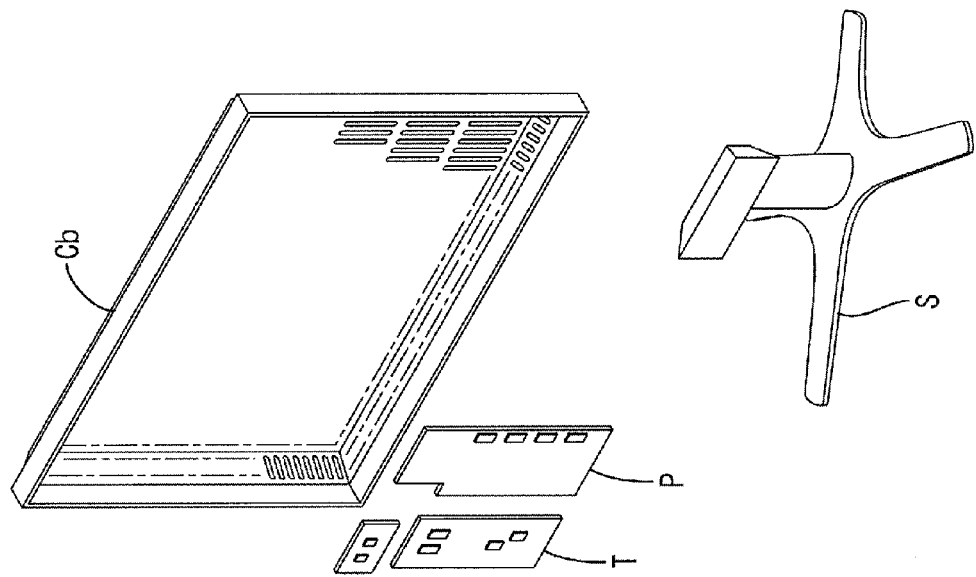
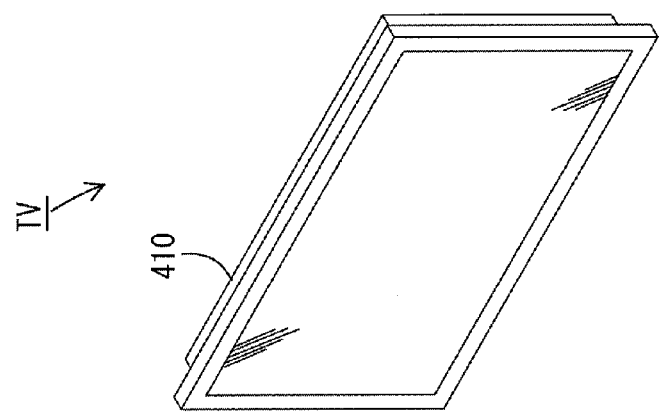
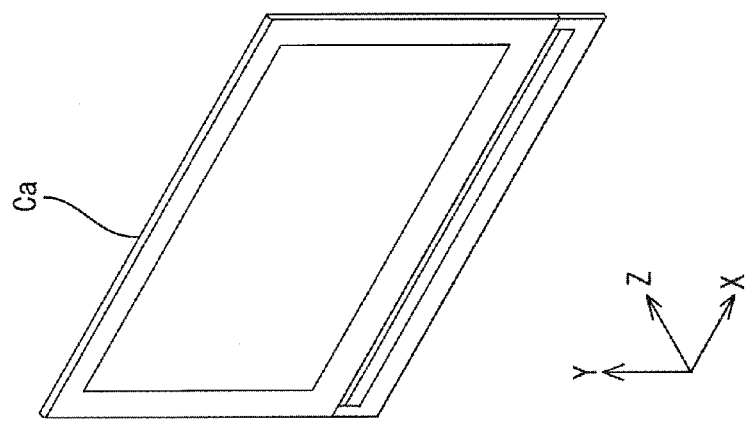

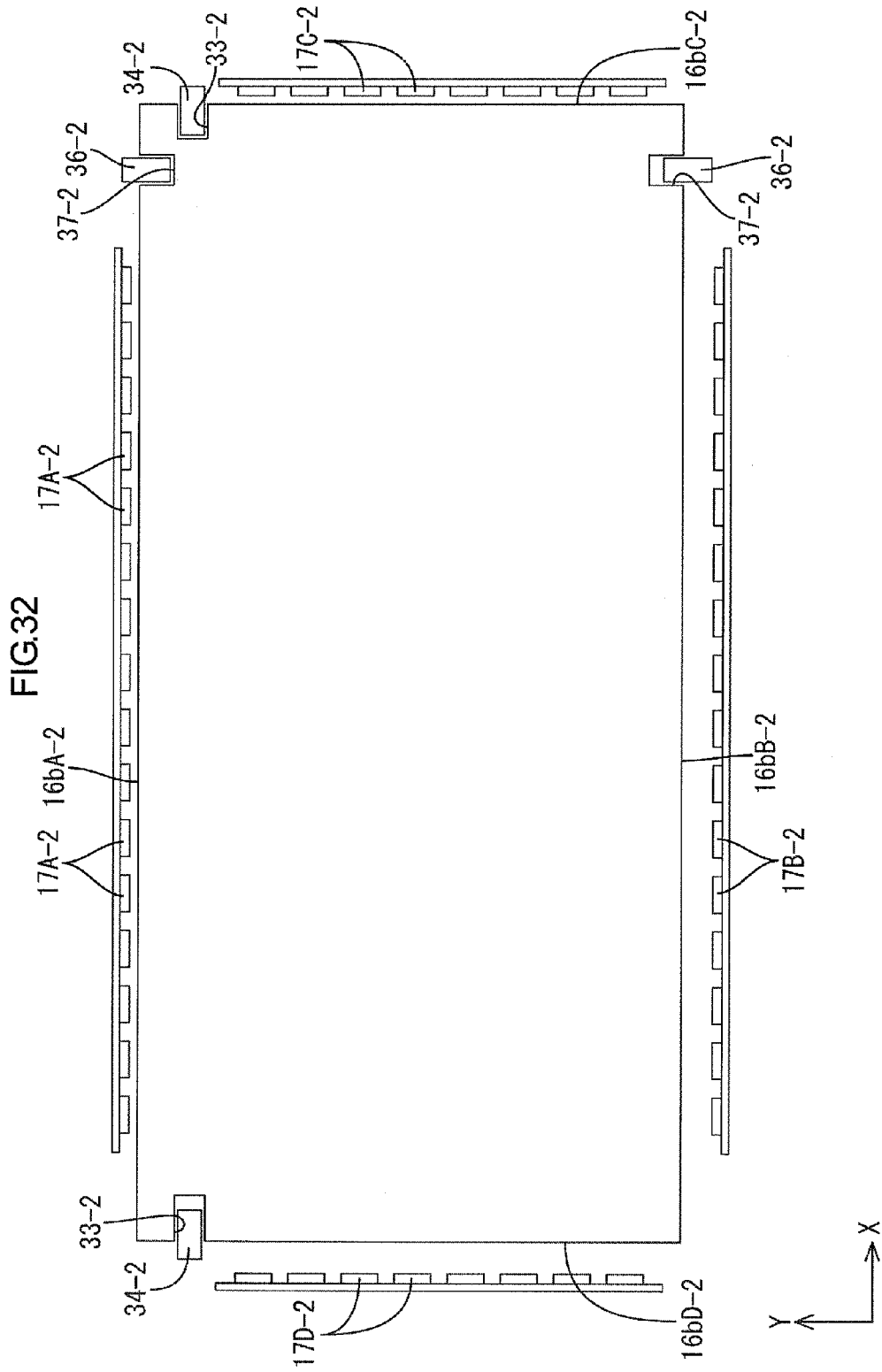

LIGHTING DEVICE, DISPLAY DEVICE AND TELEVISION DEVICE

TECHNICAL FIELD

The present invention relates to a lighting device, a display device and a television device.

BACKGROUND ART

In recent years, displays in image display devices, such as television devices, are being shifted from conventional cathode-ray tube displays to thin display panels, such as liquid crystal panels and plasma display panels. With the thin displays, thicknesses of the image display devices can be decreased. Liquid crystal panels used for the liquid crystal display device do not emit light. Therefore, liquid crystal display devices including liquid crystal panels require backlight devices. The backlight devices are classified broadly into a direct type and an edge-light type based on mechanisms. For further reduction in thicknesses of the liquid crystal display devices, the edge-light type backlight devices are more preferable. A backlight device disclosed in Patent Document 1 is known as an example of the kind.

RELATED ART DOCUMENT

Patent Document

Patent Document 1: Japanese Unexamined Patent Application Publication No. 2011-216270

Problem to be Solved by the Invention

In the edge-light type backlight device, light entrance efficiency is likely to be improved as a distance between the light source and the light entrance surface of the light guide plate is decreased, and the light entrance efficiency is likely to be decreased as the distance is increased. On the other hand, the light guide plate expands due to heat from the lighted light source and therefore, a space is necessary to be provided between the light source and the light entrance surface of the light guide plate so that the light guide plate that may increase its size due to its thermal expansion does not contact the light source. This may limit improvement of the light entrance efficiency of light emitted from the light source and entering the light guide plate through the light entrance surface.

DISCLOSURE OF THE PRESENT INVENTION

A technology disclosed herein was made in view of the above circumstances. An object is to improve light use efficiency.

Means for Solving the Problem

A technology disclosed herein relates to a lighting device including a light guide plate, a first light source, a second light source, and a positioning portion. The light guide plate has at least one end surface as a light entrance surface and one plate surface as a light exit surface. The first light source is opposed to a first light entrance surface that is a first end surface of the light guide plate. The second light source is opposed to a second light entrance surface that is an end surface opposite from the first light entrance surface of the light guide plate, and the second light source is away from the second light entrance surface with a distance relatively greater than a distance between the first light source and the first light entrance surface. The positioning portion is configured to position the light guide plate in a direction in which the first light source, the light guide plate, and the second light source are arranged, and to position the light guide plate with respect to the first light source and the second light source. The positioning portion is arranged to be away from the second light entrance surface with a distance relatively greater than a distance between the positioning portion and the first light entrance surface.

With such a configuration, the light emitted from the first light source enters the light guide plate through the first light entrance surface and the light emitted from the second light source enters the light guide plate through the second light entrance surface and then, the light entering the light guide plate travels within the light guide plate and exit through the light exit surface. The light guide plate is positioned by the positioning portions with respect to the first light source and the second light source in the direction in which the first light source, the light guide plate, and the second light source are arranged. Therefore, the light entrance efficiency of the light emitted from the respective light sources and entering through the respective light entrance surfaces is less likely to be varied unexpectedly.

The distance between the first light source and the first light entrance surface of the light guide plate is relatively small and the distance between the second light source and the second light entrance surface of the light guide plate is relatively great. Therefore, the light entrance efficiency of the light emitted from the first light source and entering the light guide plate through the first light entrance surface is relatively high and the light entrance efficiency of the light emitted from the second light source and entering the light guide plate through the second light entrance surface is relatively low. According to the inventor's studies, it is found that if the distance between the respective light sources and the respective light entrance surfaces becomes a certain value or more, the light entrance efficiency of light is less likely to be decreased due to the increase of the distance. Therefore, the light entrance efficiency of the light emitted from the second light source and entering the light guide plate through the second light entrance surface becomes lower than the light entrance efficiency of the light emitted from the first light source and entering the light guide plate through the first light entrance surface. However, the light entrance efficiency of the light emitted from the second light source and entering the light guide plate through the second light entrance surface is not further decreased from the certain value because the light entrance efficiency of light is less likely to be decreased due to the increase of the distance. The light entrance efficiency of light with the distances between the respective light sources and the respective light entrance surfaces being equal to each other is referred to as a reference value. A plus difference value between the reference value and the light entrance efficiency of light emitted from the first light source and entering the light guide plate through the first light entrance surface (the light entrance efficiency is higher than the reference value) is greater than a minus difference value between the reference value and the light entrance efficiency of light emitted from the second light source and entering the light guide plate through the second light entrance surface (the light entrance efficiency is lower than the reference value). Thus, the light use efficiency as a whole is improved compared to the configuration in which the distances between the respective light sources and the respective light entrance surfaces are equal to each other.

The size increase of the light guide plate due to the thermal expansion occurs from the positioning portion, and therefore, the movement amount of each light entrance surface due to the expansion of the light guide plate tends to be proportional to the distance from the positioning portion to each of the light entrance surfaces. The distance between the positioning portion and the second light entrance surface is relatively greater than the distance between the positioning portion and the first light entrance surface of the light guide plate. With such a configuration, the movement amount of the second light entrance surface due to the thermal expansion of the light guide plate is relatively greater than the movement amount of the first entrance surface. The light guide plate can increase its size by using the relatively great distance provided between the second light source and the second light entrance surface. This minimizes the total of the distance and the distance that are provided between the light sources and the light entrance surfaces, respectively. This effectively decreases the size (of the frames) of the lighting device.

The present technology may include following configurations.

(1) The distance between the first light source and the first light entrance surface may be represented by A, the distance between the second light source and the second light entrance surface may be represented by B, the distance between the positioning portion and the first light entrance surface may be represented by C, and the distance between the positioning portion and the second light entrance surface may be represented by D, and the distance A and the distance C may be set to satisfy following formulae (1) and (2).

[formula 1]

$$A \leq \tfrac{1}{3}(A+B) \qquad (1)$$

[formula 2]

$$C \leq \tfrac{1}{3}(C+D) \qquad (2)$$

Accordingly, the distance A between the first light source and the first light entrance surface is effectively small and the light entrance efficiency of light emitted from the first light source and entering the light guide plate through the first light entrance surface is further improved. On the other hand, the light entrance efficiency of light emitted from the light source and entering the light guide plate through the second light entrance surface is less likely to be further decreased even if the distance B is increased. Accordingly, the light use efficiency becomes high as a whole. The positional relation between each of the light entrance surfaces and the positioning portion is similar to that between the light source and the light entrance surfaces, as described above. Accordingly, the light guide plate increases its size effectively due to the thermal expansion and the total of the distances provided between the respective light sources and the respective light entrance surfaces is further decreased. This is effective to decrease the size of (the frame of) the lighting device.

(2) A ratio of the distance between the first light source and the first light entrance surface and the distance between the second light source and the second light entrance surface may be substantially equal to a ratio of the distance between the positioning portion and the first light entrance surface and the distance between the positioning portion and the second light entrance surface. With this configuration, the total of the distances provided between the respective light sources and the respective light entrance surfaces is minimized, and this is effective to decrease the size (of the frame) of the lighting device.

(3) The first light source and the second light source may be parts of a same type. Accordingly, a manufacturing cost of the first light source and the second light source is reduced and a management cost thereof is also reduced.

(4) The first light source and the second light source may represent a lambertian light intensity distribution. Accordingly, the light intensity distribution of the light emitted from the first light source and the second light source represents the lambertian light intensity distribution. Therefore, the emission light intensity is lowered with a curved inclination according to the increase of an angle of incidence of light with respect to the optical axis that is a traveling direction of the light having highest light emission intensity. In the lambertian light intensity distribution, the light entrance efficiency of the light emitted from the respective light sources and entering through the respective light entrance surfaces is improved as the distance between the respective light sources and the respective light entrance surfaces is decreased, and the light entrance efficiency is decreased as the distance is increased. However, if the distance reaches a certain value, the light entrance efficiency is less likely to be decreased and eventually does not change. Therefore, the distance between the first light entrance surface and the first light source that represents the lambertian light intensity distribution is set to be relatively small to improve the light entrance efficiency. Further, the distance between the second light entrance surface and the second light source that represents the lambertian light intensity distribution is set to be relatively great to allow the light guide plate to increase its size and keep the light entrance efficiency to be the certain value. This improves the light entrance efficiency as a whole.

(5) Each of the first light source and the second light source may include a base board and LEDs that are mounted on the base board. With this configuration, the LED are generally the light source representing the lambertian light intensity distribution and therefore, the emission light intensity is lowered with a curved inclination according to the increase of an angle of incidence of light with respect to the optical axis that is a traveling direction of the light having highest light emission intensity. In the lambertian light intensity distribution, the light entrance efficiency of the light emitted from the respective LEDs and entering through the respective light entrance surfaces is improved as the distance between the respective LEDs and the respective light entrance surfaces is decreased, and the light entrance efficiency is decreased as the distance is increased. However, if the distance reaches a certain value, the light entrance efficiency is less likely to be decreased and eventually does not change. Therefore, the distance between the first light entrance surface and the first LEDs that are the first light source and represent the lambertian light intensity distribution is set to be relatively small to improve the light entrance efficiency. Further, the distance between the second light entrance surface and the second LEDs that are the second light source and represent the lambertian light intensity distribution is set to be relatively great to allow the guide plate to increase its size and keep the light entrance efficiency to be the certain value. This improves the light entrance efficiency as a whole.

(6) The lighting device may further include a chassis where the first light source, the light guide plate, and the second light source are arranged, and the chassis may include the positioning portion. The positioning portion may be fitted to a part of the light guide plate with concavo-convex fitting. The positioning portions provided on the chassis are fitted to a part of the light guide plate with the concavo-convex fitting and accordingly, the light guide plate is effectively positioned with respect to the chassis where the first LEDs, the light guide plate, and the second LEDs are arranged.

(7) The lighting device may further include a reflection member arranged to cover at least a space provided between the second light source and the second light entrance surface from a light exit side. With such a configuration, the light entrance efficiency of the light emitted from the second light source and entering through the second light entrance surface is relatively lower than the light entrance efficiency of the light emitted from the first light source and entering through the first light entrance surface. However, since at least the space provided between the second light source and the second light entrance surface is covered with and closed by the reflection member from the light exit side, the light entrance efficiency of the light emitted from the second light source and entering through the second light entrance surface is improved. Accordingly, the light use efficiency as a whole is further improved.

(8) The reflection member may be selectively arranged to cover the space provided between the second light source and the second light entrance surface from the light exit side. For example, if the reflection member covers not only the space provided between the second light source and the second light entrance surface but also a space provided between the first light source and the first light entrance surface, the light use efficiency is further improved. However, this increases a cost for providing the reflection member. The reflection member may be arranged to cover only the space between the second light source and the second light entrance surface so that the cost for providing the reflection member is reduced and the light use efficiency as a whole is effectively improved.

(9) The light guide plate may have a square shape, and the lighting device may further include a third light source, a fourth light source, and a second positioning portion. The third light source may be opposed to a third light entrance surface of the light guide plate, and the third light entrance surface may be an end surface that is adjacent to the first light entrance surface and the second light entrance surface. The fourth light source may be opposed to a fourth light entrance surface of the light guide plate, and the fourth light entrance surface may be an end surface opposite from the third light entrance surface, and the fourth light source may be arranged to have a distance from the fourth light entrance surface relatively greater than a distance between the third light source and the third light entrance surface. The second positioning portion may be configured to position the light guide plate in a direction in which the third light source, the light guide plate, and the fourth light source are arranged, and to position the light guide plate with respect to the third light source and the fourth light source. The second positioning portion may be arranged to have a distance from the fourth light entrance surface relatively greater than a distance from the third light entrance surface. With such a configuration, the side end surfaces of the square light guide plate are the first light entrance surface, the second light entrance surface, the third light entrance surface, and the fourth light entrance surface through which the light emitted from the first light source, the second light source, the third light source, and the fourth light source enters the light guide plate 216, respectively. Accordingly, a sufficient large amount of incident light that enters the light guide plate is ensured and this is effective to increase a size of the backlight device. The distance between the third light source and the third light entrance surface is relatively small and the light entrance efficiency of the light emitted from the third light source is improved. The distance between the fourth light source and the fourth light entrance surface is relatively great and the light entrance efficiency of the light emitted from the fourth light source is not decreased from the certain value. Accordingly, the light use efficiency as a whole is further improved. The distance between the second positioning portion and the fourth light entrance surface is relatively greater than the distance between the second positioning portion and the third light entrance surface of the light guide plate. With such a configuration, the movement amount of the fourth light entrance surface due to the thermal expansion of the light guide plate is greater than the movement amount of the third entrance surface. The light guide plate can increase its size by using the relatively great distance that is provided between the fourth light source and the fourth light entrance surface. This minimizes the total of the distance provided between the third light source and the third light entrance surface and the distance provided between the fourth light source and the fourth light entrance surface. This effectively decreases the size (of the frames) of the backlight device.

Next, to solve the above problems, a display device according to the present technology includes the above lighting device and a display panel displaying with using light from the lighting device.

Such a display device includes the lighting device supplying light to the display panel has improved light use efficiency, and therefore, the display having high brightness and excellent display quality is achieved.

The display panel may be a liquid crystal panel. The display device as a liquid crystal display device has a variety of applications, such as a television display or a personal-computer display. In particular, it is suitable for a large screen display.

Advantageous Effect of the Invention

According to the technology disclosed herein, light usage efficiency is improved.

BRIEF DESCRIPTION OF THE DRAWINGS

FIG. 19 is an exploded perspective view of a general configuration of a television device according to a fifth embodiment.

FIG. 32 is a plan view illustrating a general arrangement configuration of LEDs, alight guide plate, positioning portions, fitting portions, second positioning portions, and second fitting portions according to another embodiment (2).

MODE FOR CARRYING OUT THE INVENTION

First Embodiment

A first embodiment will be described with reference to FIGS. 1 to 14. According to this embodiment, a liquid crystal display device 10 will be described. X-axis, Y-axis and Z-axis are indicated in some drawings. The axes in each drawing correspond to the respective axes in other drawings. An upper side in FIG. 4 corresponds to a front side and a lower side in FIG. 4 corresponds to a rear side.

Figure 1:
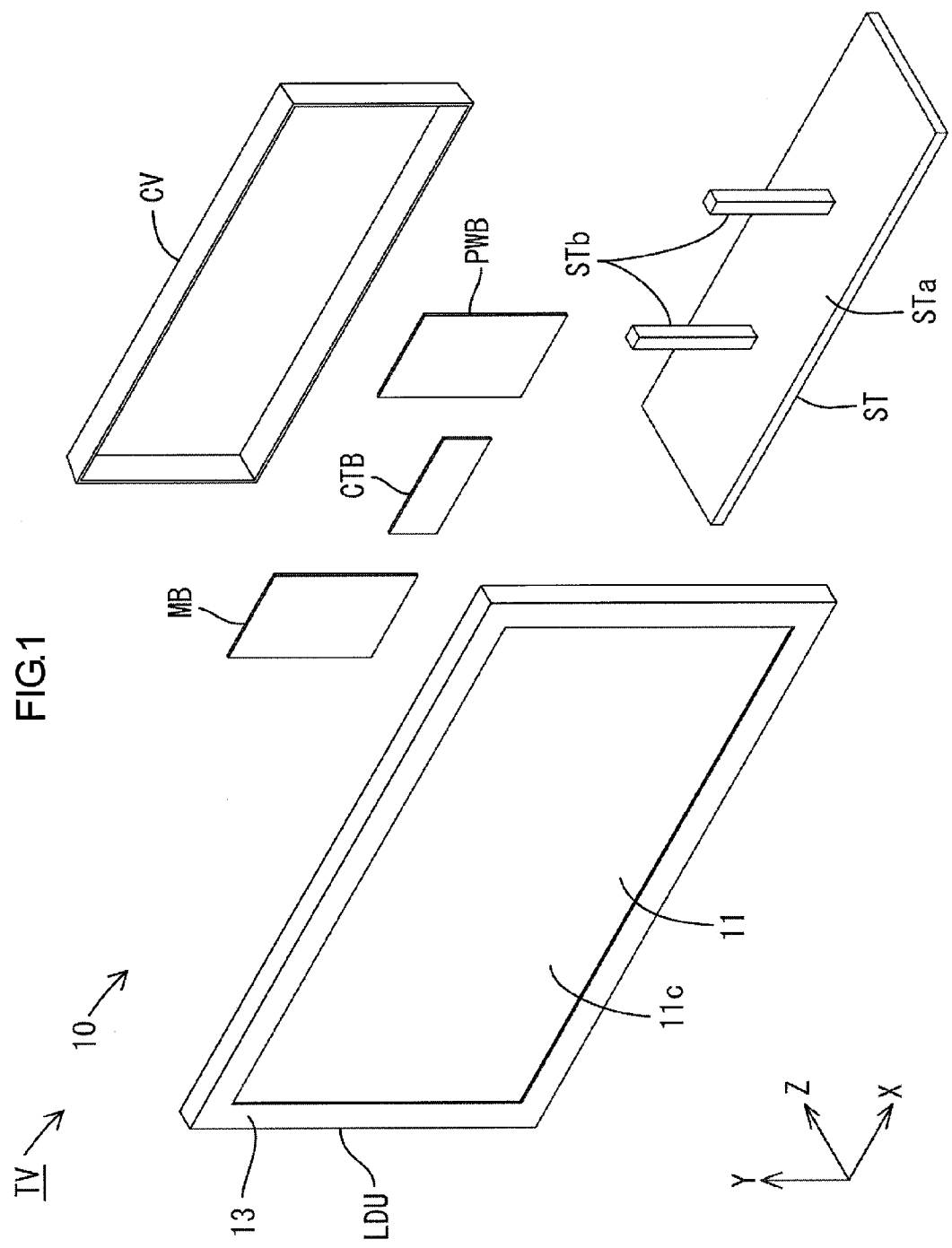
FIG. 1 is an exploded perspective view of a general configuration of a television device and a liquid crystal display device according to a first embodiment.
Figure 3:
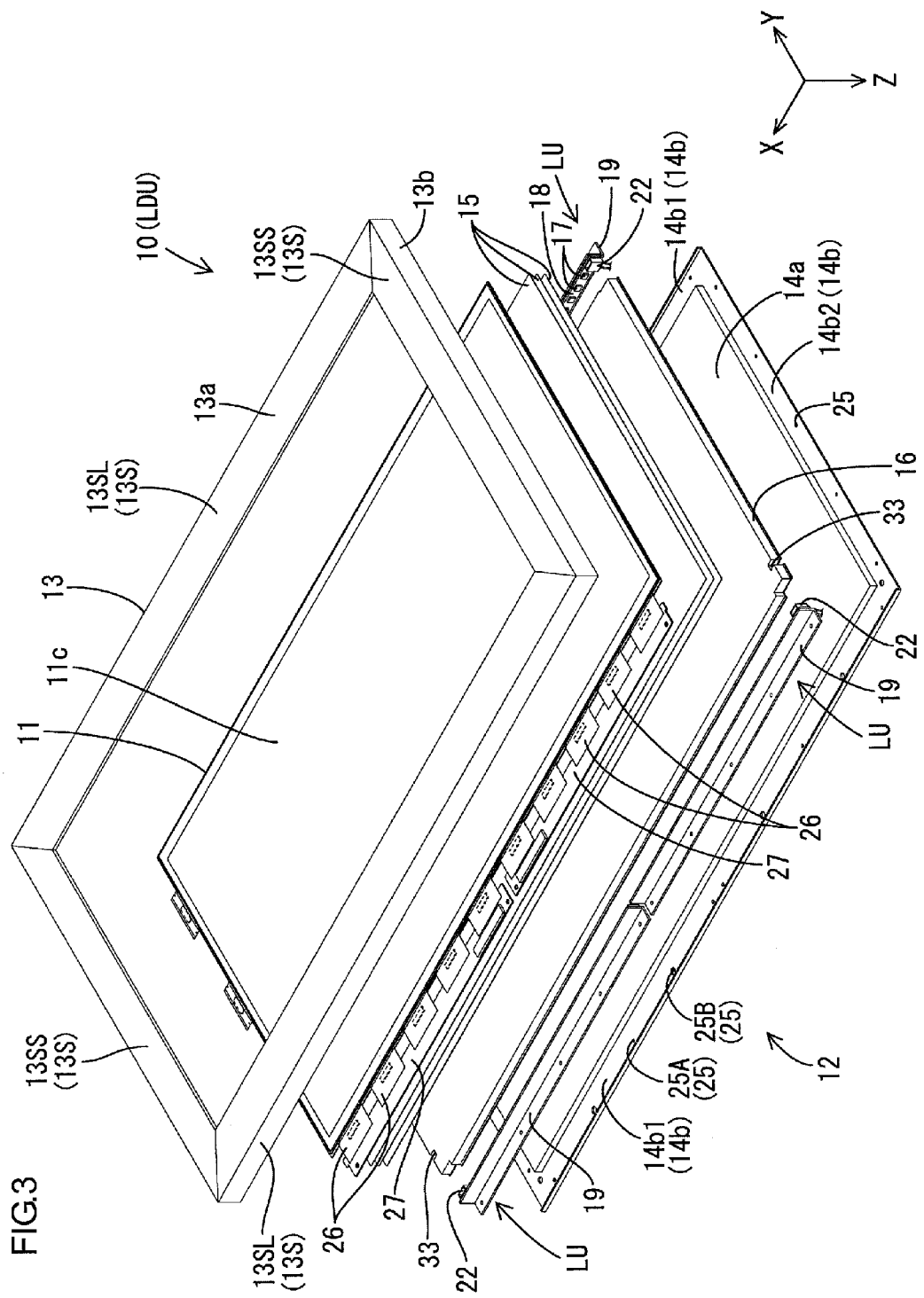
FIG. 3 is an exploded perspective view of a general configuration of the liquid crystal display unit of the liquid crystal display device.

According to this embodiment, as illustrated in FIG. 1, a television device TV includes a liquid crystal display unit (a display unit) LDU, boards PWB, MB, and CTB, a cover CV, and a stand ST. The boards PWB, MB, and CTB are attached to a rear surface (a back surface) of the liquid crystal display unit LDU. The cover CV is attached to the rear surface of the liquid crystal display unit LDU so as to cover the boards PWB, MB, and CTB. The stand ST holds the liquid crystal display unit LDU such that a display surface of the liquid crystal display unit LDU extends in the vertical direction (the Y-axis direction). The liquid crystal display device 10 according to this embodiment has the same configuration as the above-described television device TV except for at least a component for receiving television signals (e.g. a tuner included in a main board MB). As illustrated in FIG. 3, the liquid crystal display unit LDU has a landscape rectangular overall shape (rectangular and longitudinal). The liquid crystal display unit LDU includes a liquid crystal panel 11 as a display panel and a backlight device (a lighting device) 12 as an external light source. The liquid crystal panel 11 and the backlight device 12 are collectively held by a frame (a holding member provided on a display surface 11c side, one holding member) 13 and a chassis (a holding member provided on a side opposite from the display surface 11c side, another holding member) 14. The frame 13 and the chassis 14 constitute a holding member and are external members that provide an external configuration of the liquid crystal display device 10. The chassis 14 in this embodiment constitutes a part of the exterior and a part of the holding member and also constitutes apart of the backlight device 12.

Figure 2:
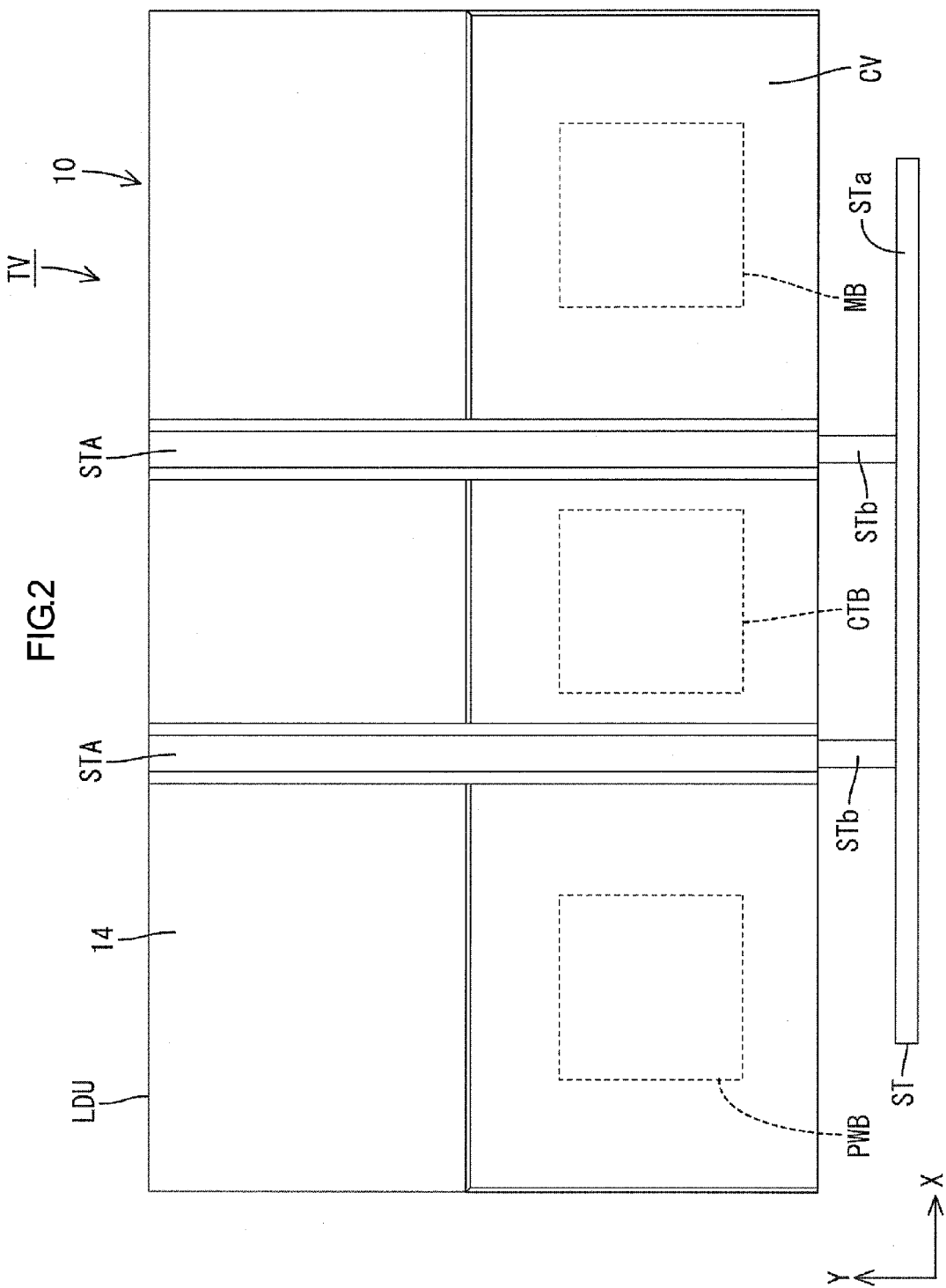
FIG. 2 is a rear view of the television device and the liquid crystal display device.

Configurations of the liquid crystal display device 10 on a rear surface side will be described. As illustrated in FIG. 2, stand fitting members STA are attached to a rear surface of the chassis 14 that provides an external configuration of the back of the liquid crystal display device 10. The stand fitting members STA are spaced away from each other in an X-axis direction and each extend along the Y-axis direction. Each stand fitting member STA has a cross section that corresponds to a cross section of a channel beam and opens to the chassis 14. A space is provided between the stand fitting member STA and the chassis 14. Support portions STb included in the stand ST are inserted in the respective stand fitting members STA. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand fitting members STA in the X-axis direction. A component storage space is provided between the cover CV and the chassis 14 such that the boards PWB, MB, and CTB, which will be described next, are stored therein.

As illustrated in FIG. 2, the liquid crystal display device 10 includes a power source board PWB, a main board MB, and a control board CTB as the boards PWB, MB, and CTB. The power source board PWB will be referred to as a power supply of the liquid crystal display device 10 and supplies drive power to the other boards MB and CTB and LEDs (an example of light sources) 17 included in the backlight device 12. Namely, the power source board PWB also serves as "an LED drive board that drives the LEDs 17 (a light source drive board, a power supply)". The main board MB includes at least a tuner and an image processor, which are not illustrated. The tuner is configured to receive television signals. The image processor performs image processing on the received television signals. The main board MB is configured to output the processed image signals to the control board CTB, which will be described next. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which is sent from the main board, to driving signals for liquid crystals and to supply the driving signals to the liquid crystal panel 11.

As illustrated in FIG. 3, main components of the liquid crystal display unit LDU included in the liquid crystal display device 10 are arranged in a space provided between the frame (a front frame) 13, which constitutes a front exterior, and the chassis (a rear chassis) 14, which constitutes a rear exterior. The main components arranged in the frame 13 and the chassis 14 include at least the liquid crystal panel 11, an optical member 15, a light guide plate, and a LED unit (a light source unit) LU. The liquid crystal panel 11, the optical member 15, and the light guide plate 16 are placed on top of one another and held between the front frame 13 and the rear chassis 14. The optical member 15, the light guide plate 16, the LED unit LU, and the chassis constitute the backlight unit 12. In other words, the above-described liquid crystal display unit LDU without the liquid crystal panel 11 and the frame 13 is the backlight unit 12. The back light device 12 includes a pair of LED units LU on each side of the light guide plate 16 with respect to a short-side direction thereof (a Y-axis direction), and the LED units LU in a pair are arranged in a long-side direction of the light guide plate 16 (a X-axis direction). The LED units LU in a pair is provided on each side of the light guide plate 16 to hold the light guide plate 16 with respect to the short-side direction thereof in the frame 13 and the chassis 14. Four LED units LU in total are provided. The LED unit LU includes an LED 17 as a light source, a LED board (a light source board) 18, and a heat dissipation member (a heat spreader, a light source attachment member) 19 where the LED board 18 is attached. Each of the components will be described below.

As illustrated in FIG. 3, the liquid crystal panel has a landscape rectangular shape (rectangular and longitudinal) in a plan view and includes a pair of glass substrates 11a and 11b and liquid crystals. The substrates 11a and 11b each having high light transmissivity are bonded together with a predetermined gap therebetween. The liquid crystals are sealed between the substrates 11a and 11b. The substrate 11a provided on a front side (a front-surface side) is a CF substrate 11a and the substrate 11b provided on a rear side (a rear-surface side) is an array substrate 11b. On the array substrate 11b, switching elements (e.g. TFTs), pixel electrodes, and an alignment film are arranged. The switching elements are connected to gate lines and source lines that are arranged perpendicular to each other. The pixel electrodes are connected to the switching elements. On the CF substrate 11a, color filters, a counter electrode, and an alignment film are arranged. The color filters include red (R), green (G), and blue (B) color portions that are arranged in a predetermined arrangement. A polarizing plate (not illustrated) is disposed on an outer side of each substrate 11a, 11b.

Figure 4:
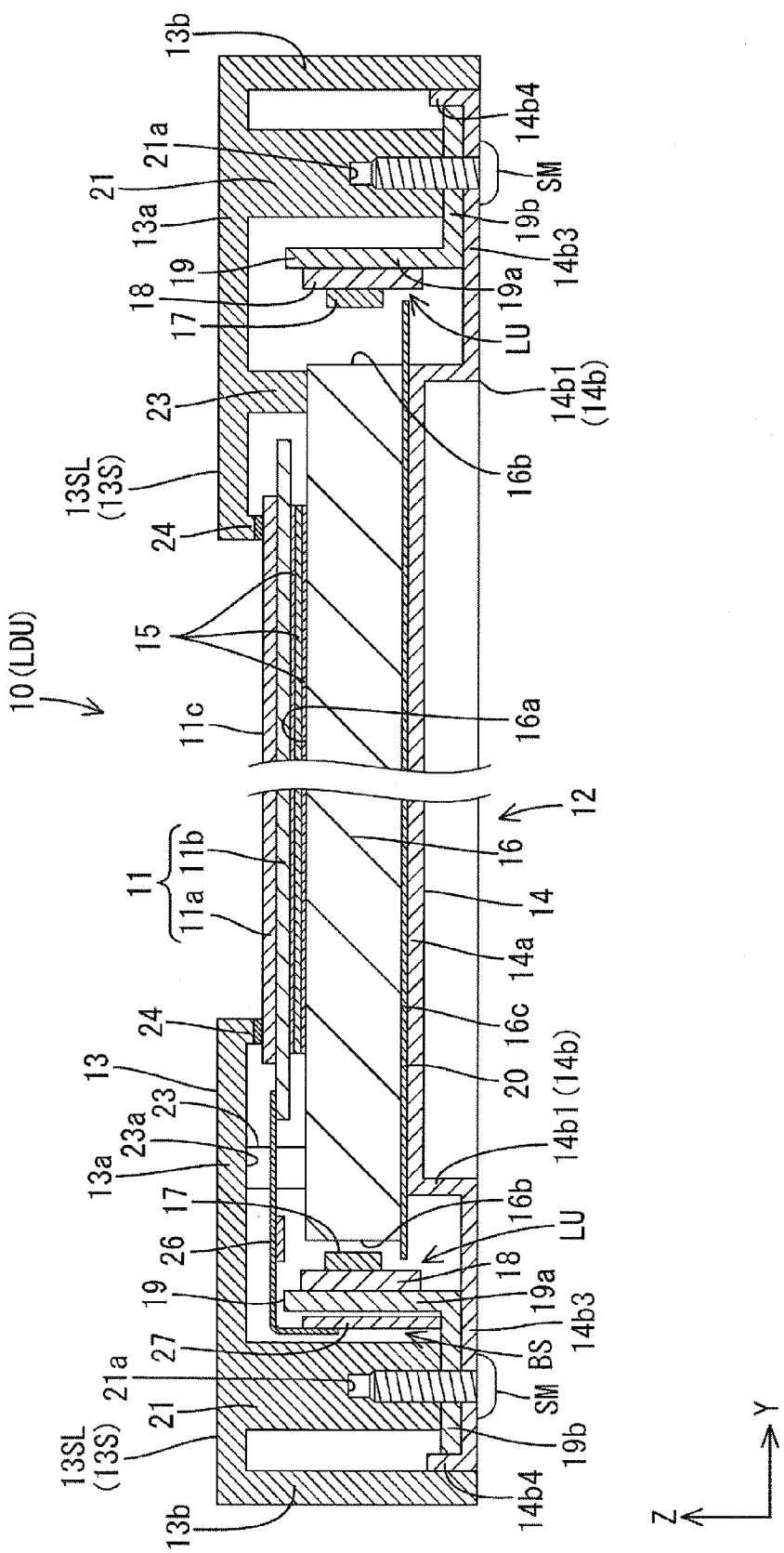
FIG. 4 is a cross-sectional view of the liquid crystal display device taken along a short-side direction thereof.
Figure 5:
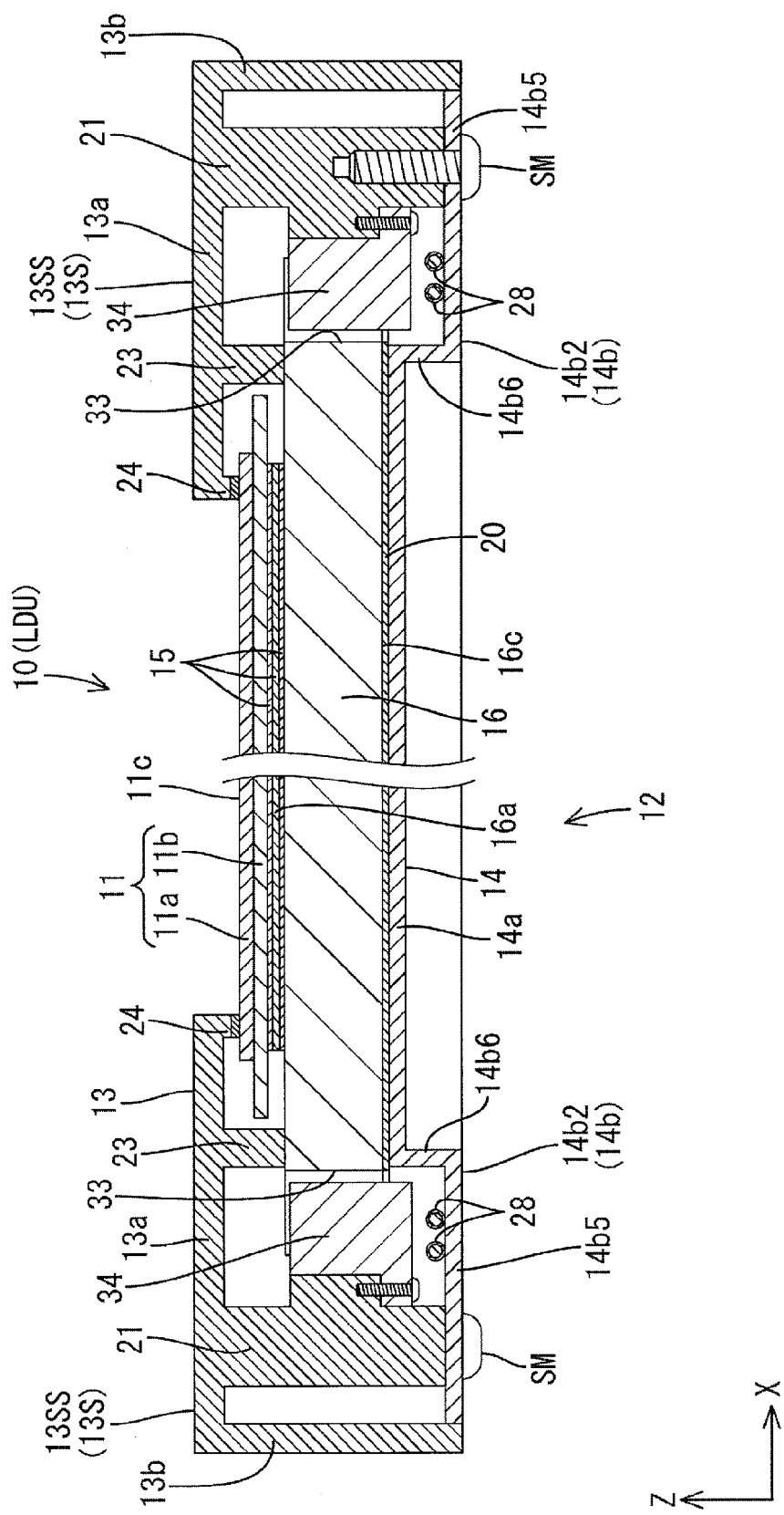
FIG. 5 is a cross-sectional view of the liquid crystal display device taken along a long-side direction thereof.

As illustrated in FIGS. 4 and 5, among the substrates 11a, 11b included in the liquid crystal panel 11, the array substrate 11b has a larger size than the CF substrate 11a in a plan view and is arranged such that each end of the array substrate 11b is located on an outer side of each end of the CF substrate 11a. Specifically, the array substrate 11b is slightly larger in size than the CF substrate 11a such that an entire outer peripheral end of the array substrate 11b protrudes outwardly from an entire outer peripheral end of the CF substrate 11a. The outer peripheral end of the array substrate 11b includes a pair of long-side ends. In one of long-side end portions of the array substrate 11b that is close to the control board CTB with respect to the Y-axis direction (in a left-side end portion in FIG. 4), terminals extended from the gate lines and the source lines are arranged. As illustrated in FIGS. 2 and 4, flexible boards (FPC boards) 26 where drivers DR for liquid crystal driving are connected to the respective terminals. The flexible boards 26 are arranged apart from each other in the X-axis direction, i.e., a direction along the long-side end of the array substrate 11b. A part of each source flexible board 26 protrudes outwardly from the long-side end of the array substrate 11b in the Y-axis direction. Each of the flexible boards 26 includes a film-like base made of synthetic resin (for example polyimide resin) that has an insulation property and flexibility. Each flexible board 26 includes traces (not illustrated) arranged on the base and a driver DR on about a middle of the base. The traces are connected to the driver DR. One end of each flexible board 26 is pressed and connected to each terminal of the array substrate 11b via an anisotropic conductive film (ACF). Another end of each flexible board 26 is pressed and connected to each terminal of a printed circuit board 27, which will be described later, via another anisotropic conductive film. The printed circuit board 27 is connected to the control board CTB via a wiring member, which is not illustrated, and thus signals from the control board CTB are transmitted to the source flexible boards 26. The liquid crystal panel 11 thus displays images on the display surface 11c according to the signals from the control board CTB.

As illustrated in FIGS. 4 and 5, the liquid crystal panel 11 is placed on a front side (a light exit side) of the optical member 15, which will be described next. A rear surface of the liquid crystal panel 11 (a rear surface of the polarizing plate on the rear side) is fitted to the optical member 15 with minimal gaps therebetween. Therefore, dust is less likely to enter the gaps between the liquid crystal panel 11 and the optical member 15. The display surface 11c in the liquid crystal panel 11 includes a display area and a non-display area. The display area is an inner area of a screen in which images are displayed. The non-display area is an outer area of the screen around the display area and has a frame-like shape. The terminals and the flexible boards 26 described earlier are arranged in the non-display area.

As illustrated in FIG. 3, similar to the liquid crystal panel 11, the optical member 15 has a landscape rectangular shape in a plan view and has the same size (a short-side dimension and a long-side dimension) as the liquid crystal panel 11. The optical member 15 is placed on the front side (a light exit side) of the light guide plate 16, which will be described later, and sandwiched between the light guide plate 16 and the liquid crystal panel 11. The optical member 15 includes three sheets that are placed on top of one another. Specifically, the optical member 15 includes a diffuser sheet, a lens sheet, and a reflecting type polarizing sheet, and one or some of the three sheets may be selectively used as the optical member 15.

The light guide plate 16 is made of substantially transparent (high transmissivity) synthetic resin (e.g. acrylic resin or polycarbonate such as PMMA) that has a refractive index sufficiently higher than that of the air. As illustrated in FIG. 3, the light guide plate 16 has a landscape rectangular shape in a plan view similar to the liquid crystal panel 11 and the optical member 15. A thickness of the light guide plate 16 is larger than a total thickness of the optical member 15. A long-side direction and a short-side direction of a main surface of the light guide plate 16 correspond to the X-axis direction and the Y-axis direction, respectively. A thickness direction of the light guide plate 16 that is perpendicular to the main surface of the light guide plate 16 corresponds to the Z-axis direction (a direction in which the liquid crystal panel 11 and the light guide plate 16 overlap each other). The light guide plate 16 is arranged on a rear side of the optical member 15 and held between the optical member 15 and the chassis 14. As illustrated in FIGS. 4 and 5, the light guide plate 16 has a short-side dimension and a long-side dimension larger than those of the liquid crystal panel 11 and the optical member 15 in a plan view. Ends of four sides of the light guide plate 16 is disposed on an outer side from ends of four sides of the liquid crystal panel 11 and the optical member 15 (such that end portions of the light guide plate 16 does not overlap end portions of the liquid crystal panel 11 and the optical member 15). This provides a sufficient distance for which the light emitted from LED 17 and entering the light guide plate 16 travels inside the light guide plate 16. Further, the end portions of the light guide plate 16 where unevenness is likely to be caused in the light exiting the light guide plate 16 compared to the middle portion thereof are arranged outside the display area of the liquid crystal panel 11. The LED units LU are arranged on each end in the short-side direction of the light guide plate 16 so as to have the light guide plate 16 between the two pairs of LED units LU in the Y-axis direction. Light from the LEDs 17 enters the light guide plate 16 through the ends in the short-side direction. The light guide plate 16 is configured to guide the light, which is from the LEDs 17 and enters the light guide plate 16 through the ends in the short-side direction, toward the optical members 15 (on the front side).

As illustrated in FIG. 4, one of plate surfaces of the light guide plate 16 that faces the front side (a surface opposite the optical member 15) is a light exit surface 16a. Light exits the light guide plate 16 through the light exit surface 16a toward the optical members 15 and the liquid crystal panel 11. The light guide plate 16 include outer peripheral end surfaces that are adjacent to the plate surfaces of the light guide plate 16, and two end surfaces thereof each extend in the X-axis direction are elongated long-side surfaces (end surfaces in the short-side direction). Each long-side surface is opposite the LEDs 17 (the LED boards 18) with a predetermined space therebetween and serves as light entrance surfaces 16b through each of which light from LEDs 17 enters the light guide plate 16. The light entrance surfaces 16b are parallel to the X-Z plane (main surfaces of the LED boards 18) and substantially perpendicular to the light exit surface 16a. An arrangement direction of the LED 17 and the light entrance surface 16b corresponds to the Y-axis direction and parallel to the light exit surface 16a.

Figure 11:
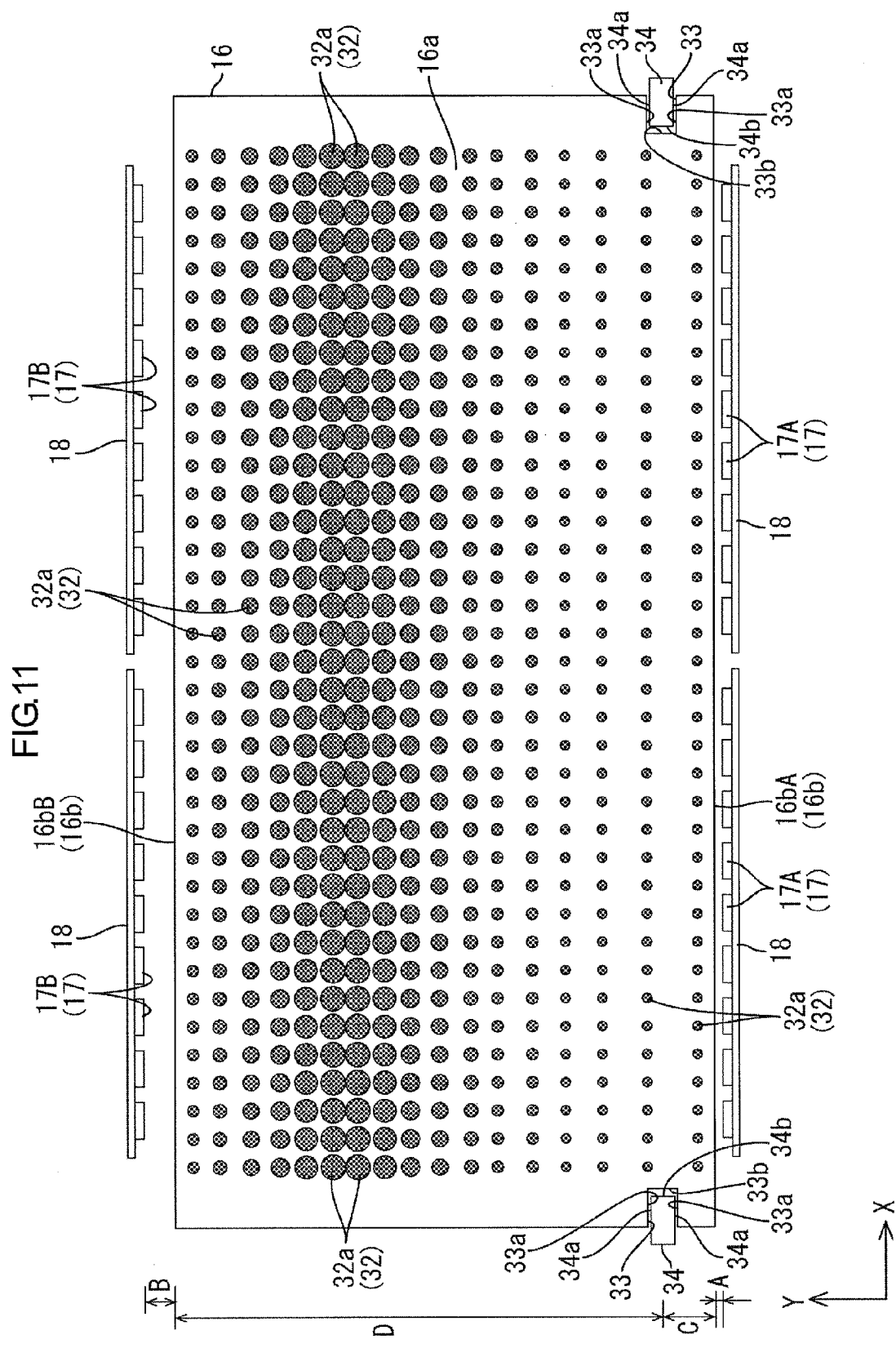
FIG. 11 is a plan view generally illustrating an arrangement configuration of LEDs, the light guide plate, positioning portions, and fitting portions.

As illustrated in FIGS. 4 and 5, the light guide reflection sheet (a reflection member) 20 is arranged on the rear side of the light guide plate 16, i.e., a plate surface 16c opposite to the light exit surface 16a (a surface opposite the chassis 14). Light that travels toward the rear outside through the plate surface 16c is reflected by the light guide reflection sheet 20 toward the front side. The light guide reflection sheet 20 is arranged to cover an entire area of the plate surface 16c. The light guide reflection sheet 20 is arranged between the chassis 14 and the light guide plate 16. The light guide reflection sheet 20 is made of synthetic resin and has a white surface having high light reflectivity. As illustrated in FIGS. 4 and 5, a short-side dimension and a long-side dimension of the light guide reflection sheet 20 are larger than those of the light guide plate 16, respectively. The light guide reflection sheet 20 is arranged such that ends of the four sides thereof protrude outwardly than ends of the four sides of the light guide plate 16. Especially, as illustrated in FIG. 4, the light guide reflection sheet 20 is arranged such that long-side ends of the light guide reflection sheet 20 protrude closer to the LEDs 17 compared to the light entrance surfaces 16b of the light guide plate 16. Light that travels from the LEDs 17 toward the chassis 14 at an angle is effectively reflected toward the light entrance surfaces 16b of the light guide plate 16 by the protruded portions (the long-side ends) of the light guide reflection sheet 20. The plate surface 16c opposite to the light exit surface 16a of the light guide plate 16 has a light reflection portion 32 (FIG. 11). The light reflection portion 32 is configured to reflect the light inside the light guide plate 16 toward the light exit surface 16a to accelerate exiting of light through the light exit surface 16a. The light reflection portion 32 is disposed between the plate surface 16c opposite to the light exit surface 16a of the light guide plate 16 and the light guide reflection sheet 20.

As illustrated in FIG. 11, the light reflection portion 32 is formed by printing a light reflective material on the plate surface 16c of the light guide plate 16 away from the light exit surface 16a. Namely, the light reflection portion 32 may be referred to as light reflective prints. The light reflective material used for the light reflection portion 32 is a white ink (or a paste) containing metal oxide such as titanium oxide. The light reflection portion 32 is configured to diffusely reflect the rays of light entering the light guide plate 16 and reaching the plate surface 16c away from the light exit surface 16a toward the light exit surface 16a. The light reflection portion 32 is further configured to vary an angle of incidence at the light exit surface 16a compared with an angle of incidence of light that is fully reflected at the plate surface 16c. With this configuration, more rays of light have the angles of incidence which do not exceed the critical angle and thus the amount of light that exits through the light exit surface 16a increases. The light reflection portion 32 may be formed on the light guide plate 16 by printing methods including silk printing (screen printing) and inkjet printing. With the silk printing, production cost is reduced when the light guide plates 16 are mass-produced. With the inkjet printing, the light reflection portion 32 can be formed with high accuracy even if the light reflection portion 32 is formed in a complex pattern. A dot pattern of the light reflection portion 32 will be described in detail below.

Figure 9:
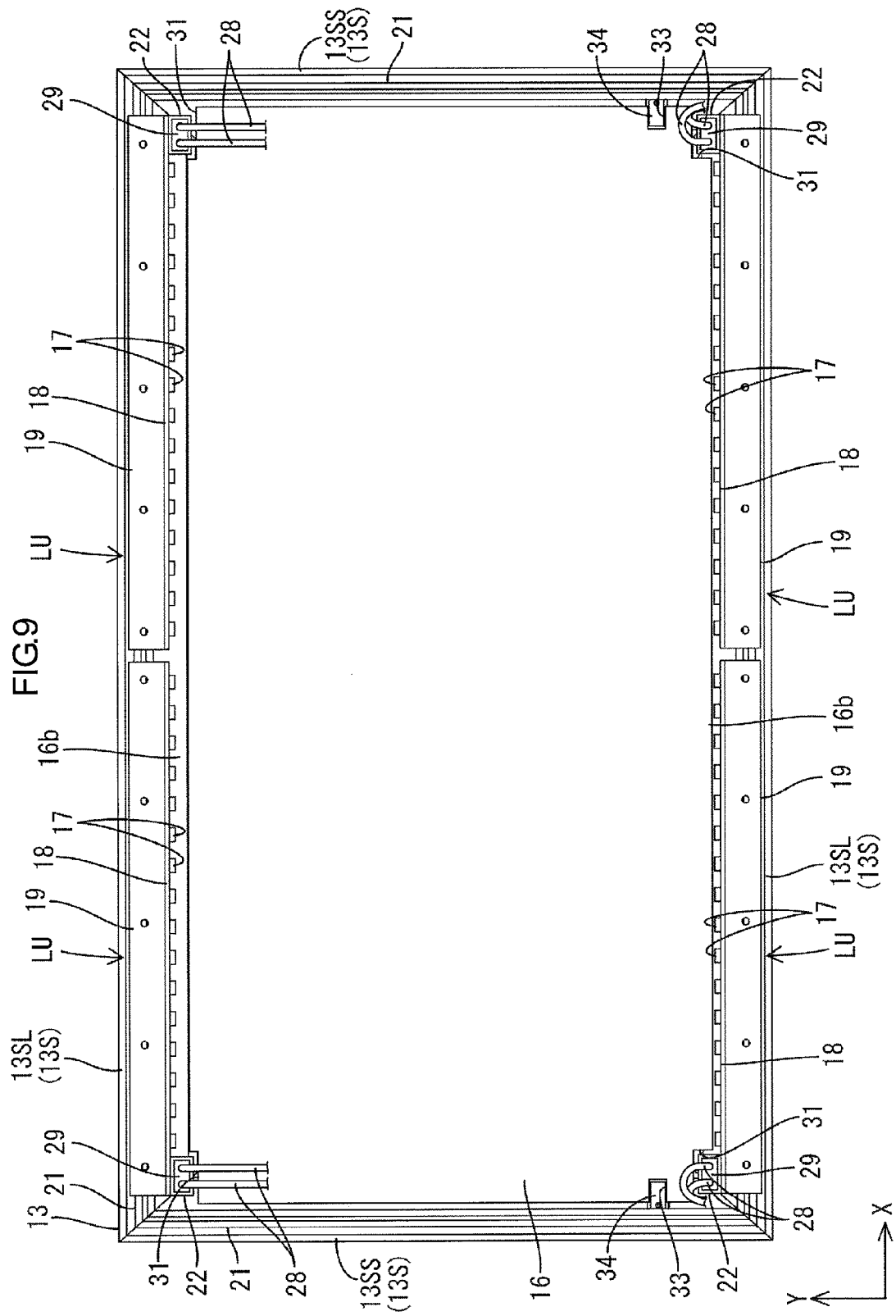
FIG. 9 is a rear view of the liquid crystal display device without having a chassis.
Figure 10:
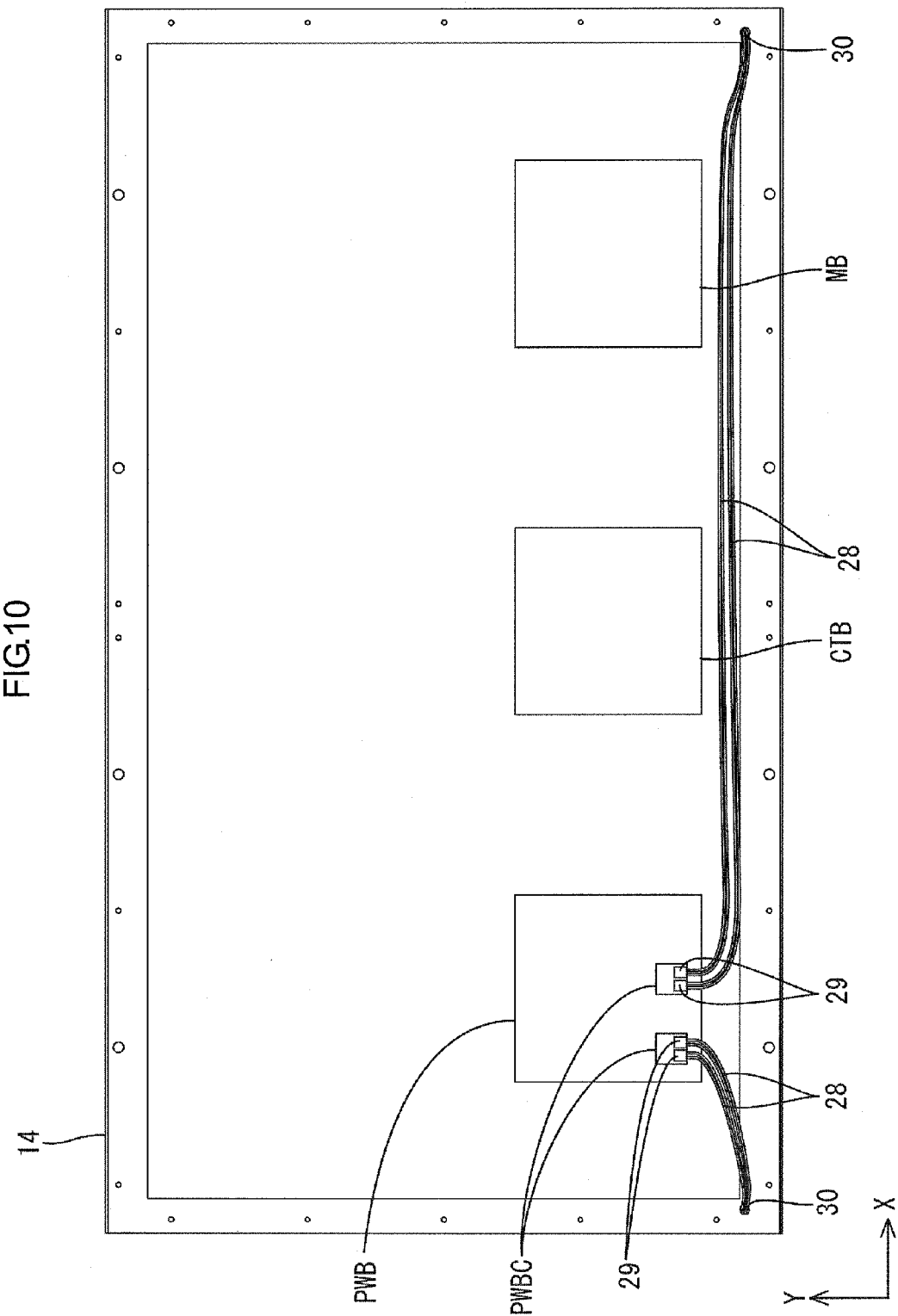
FIG. 10 is a rear view of the liquid crystal display device having various boards being attached to a rear surface of the chassis.

As illustrated in FIGS. 5 and 9, each of the short-side end portions of the light guide plate 16 has a fitting portion 33 that is positioned by a positioning portion 34 provided in the chassis 14. The fitting portion 33 has a recessed shape formed by cutting off a part of the short-side end portion of the light guide plate 16. Specifically, the fitting portion 33 is through the short-side end portion of the light guide plate 16 in the Z-axis direction (a plate thickness direction) and opens at a side thereof in the X-axis direction (the long-side direction). The fitting portion 33 has a substantially rectangular plan view shape and has a pair of first side surfaces 33a and a second side surface 33b. The first side surfaces 33a are parallel to the X-axis direction to face each other. The second side surface 33b is parallel to the Y-axis direction and faces the outer side. The positioning portion 34, which will be described later, is fitted to the fitting portion 33 with concavo-convex fitting so as to position the light guide plate in the Y-axis direction, i.e., an arrangement direction in which the LED 17 and the light guide plate 16 are arranged. As illustrated in FIG. 9, the light guide plate 16 has a board-side connector insertion recess 31 at each of four corner portions thereof. A board-side connector 22 is passed through the board-side connector insertion recess 31.

Next, a configuration of each of the LEDs 17, the LED board 18, and the heat dissipation member 19 included in the LED unit LU will be described. As illustrated in FIGS. 3 and 4, each LED 17, which is included in the LED unit LU, includes an LED chip arranged on a board that is fixed on the LED board 18 and sealed with resin. The LED chip mounted on the board has one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Thus, overall color of light emitted from the LED 17 is white. The phosphors may be selected, as appropriate, from yellow phosphors that emit yellow light, green phosphors that emit green light, and red phosphors that emit red light. The phosphors may be used in combination of the above phosphors or one single one of the phosphors may be used. The LED 17 includes a main light-emitting surface 17a that is opposite to a surface on which the LED board 18 is mounted (a surface opposite the light entrance surfaces 16b of the light guide plate 16). Namely, the LED 17 is a top-surface-emitting type LED. The LED 17 has a substantially quadrate shape such that the main light-emitting surface 17a has a rectangular front view shape (elongated in the X-axis direction).

As illustrated in FIGS. 3 and 4, each LED board 18 included in the LED unit LU has an elongated plate-like shape and extends in the long-side direction of the light guide plate 16 (the X-axis direction, the long-side direction of the light entrance surface 16b). The LED boards 18 are arranged in the frame 13 and the chassis 14 such that a plate surface of each LED board 18 is parallel to the X-Z plane, i.e., parallel to the light entrance surface 16b of the light guide plate 16. Each LED board 18 has a long-side dimension that is about a half of the long-side dimension of the light guide plate 16. The LED board 18 includes amount surface 18a on which the LEDs 17 are surface-mounted. The mount surface 18a is a plate surface that faces inward, namely, a plate surface of the LED board 18 that faces the light guide plate 16 (the surface opposite the light guide plate 16). The LEDs 17 are arranged in line (i.e., linearly) at intervals on the mount surface 18a of the LED board 18 along the long-side direction of the LED board 18 (the X-axis direction). In other words, multiple LEDs 17 are arranged away from each other in the long-side direction of the backlight unit 12 along the long sides of the backlight unit 12. Distances between the adjacent LEDs 17 in the X-axis direction are substantially equal, that is, the LEDs 17 are arranged at substantially equal intervals. An arrangement direction of the LEDs 17 corresponds to the longitudinal direction of the LED board 18 (the X-axis direction). The LED boards 18 in a pair that are arranged so as to sandwich the light guide plate 16 therebetween are arranged in the frame 13 and the chassis 14 such that the mount surfaces 18a on which the LEDs 17 are mounted face each other. The main light-emitting-surfaces 17a of the LEDs 17 on one of the LED boards 18 face the main light-emitting-surfaces 17a of the LEDs 17 on the other one of the LED boards 18. A light axis of each LED 17 is substantially corresponds to the Y-axis direction. A substrate of each LED board 18 is made of metal such as aluminum. Traces (not illustrated) are formed on the surface of the LED board 18 via an insulating layer. A material used for the LED boards 18 may be an insulating material including ceramic.

The traces (not illustrated) are formed on the mount surface 18a of the LED board 18. The trace extends in the longitudinal direction of the LED board 18 (the X-axis direction), that is the arrangement direction of the LEDs 17, and are connected to each of the LEDs 17. The board-side connector 22 is mounted at an end portion of the trace. A relay member-side connector 29 that is provided at an end of relay lines 28, which will be described later, is fitted to the board-side connector 22 with concavo-convex fitting from the rear side (the chassis 14 side) along the Z-axis direction (the plate thickness direction of the light guide plate 16). The relay lines 28 are connected to the power supply board PWB to supply driving power to each of the LEDs 17. The board-side connector 22 is arranged on one of end portions in the longitudinal direction thereof. Specifically, the board-side connector 22 is arranged on an outer end portion of the LED board 18 in the long-side direction of the frame 13 and the light guide plate 16 (adjacent to each of the short side of the frame 13). Accordingly, the board-side connectors 22 that are included in the respective four LED boards 18 are arranged in the respective four corner portions of the frame 13 and the light guide plate 16. The board-side connector 22 is a non-light emission part on the LED board 18 and therefore, the board-side connector 22 is arranged closer to the end of the LED board 18, as described before. Accordingly, light from the LED 17 is unlikely to be blocked by the board-side connector 22. The number of the LEDs 17 (the number of mounted LEDs), an arrangement interval between the LEDs 17 (a mounting interval, an arrangement pitch) and the arrangement of the board-side connector 22 are same on each of the four LED boards 18 included in the liquid crystal display device 10, and each of the four LED boards 18 is a same part. Accordingly, a manufacturing cost and a management cost of the LED boards 18 are reduced.

As illustrated in FIGS. 3 and 4, the heat dissipation member 19 included in each LED unit LU is made of metal having high thermal conductivity, such as aluminum. The heat dissipation member 19 includes an LED attachment portion (light source attachment portion) 19a and a heat dissipation portion 19b. The LED board 18 is attached on the LED attachment portion 19a. The heat dissipation portion 19b is in plane-contact with a plate surface of the chassis 14. The LED attachment portion 19a and the heat dissipation portion 19b form an angle therebetween so as to have an L-like shape in a cross-section. The heat dissipation member 19 has a long-side dimension substantially equal to the long-side dimension of the LED board 18. The LED attachment portion 19a of the heat dissipation member 19 has a plate-like shape parallel to the plate surface of the LED board 18 and the light entrance surface 16b of the light guide plate 16. A long-side direction, a short-side direction, and a thickness direction of the LED attachment portion 19a are aligned with the X-axis direction, the Z-axis direction, and the Y-axis direction, respectively. The LED board 18 is mounted on an inner surface of the LED attachment portion 19a, that is, a plate surface that faces the light guide plate 16. While the LED attachment portion 19a has a long-side dimension that is substantially equal to the long-side dimension of the LED board 18, a short-side dimension of the LED attachment portion 19a is larger than a short-side dimension of the LED board 18. Therefore, ends of the LED attachment portion 19a in the short-side direction protrude out from the ends of the LED board 18 in the Z-axis direction. An outer plate surface of the LED attachment portion 19a, that is, a plate surface opposite to the plate surface on which the LED board 18 is attached, faces a screw attachment portion 21 (a fixing member attachment portion) included in the frame 13, which will be described later. The LED attachment portion 19a is located between the screw attachment portion 21 of the frame 13 and the light guide plate 16. The LED attachment portion 19a extends from an inner end of the heat dissipation portion 19b, i.e., an end of the heat dissipation portion 19b on the LEDs 17 (the light guide plate 16) side, toward the front side in the Z-axis direction (a direction in which the liquid crystal panel 11, the optical member 15, and the light guide plate 16 overlap each other), i.e., toward the frame 13.

As illustrated in FIGS. 3 and 4, the heat dissipation portion 19b has a plate-like shape and is parallel to the plate surface of the chassis 14. A long-side direction, a short-side direction, and a thickness direction of the heat dissipation portion 19b are aligned with the X-axis direction, the Y-axis direction, and the Z-axis direction, respectively. The heat dissipation portion 19b extends from a rear-side end of the LED attachment portion 19a toward the outer side in the Y-axis direction. In other words, the heat dissipation portion 19b extends from an end of the LED attachment portion 19a closer to the chassis 14 toward a counter direction from the light guide plate 16. The heat dissipation portion 19b has a long-side dimension substantially equal to the long-side dimension of the LED attachment portion 19a. An entire rear plate surface of the heat dissipation portion 19b, i.e., a plate surface of the heat dissipation portion 19b facing the chassis 14, is in contact with the plate surface of the chassis 14. A front plate surface of the heat dissipation portion 19b, i.e., a plate surface opposite from the surface in contact with the chassis 14, faces the screw attachment portion 21 of the frame 13, which will be described later. Specifically, the front plate surface of the heat dissipation portion 19b is in contact with a projected end surface of the screw attachment portion 21. The heat dissipation portion 19b is sandwiched (disposed) between the screw attachment portion 21 of the frame 13 and the chassis 14. With this configuration, heat generated by the lightened LEDs 17 is transferred to the chassis 14 and the frame 13 including the screw attachment portion 21 via the LED board 18, the LED attachment portion 19a, and the heat dissipation portion 19b. Therefore, heat is effectively released to the outside of the liquid crystal display device 10 and thus the heat is less likely to stay therein. The heat dissipation portion 19b includes through holes 19b1 through which screw members (fixing members) SM are passed. The heat dissipation portion 19b is fixed to the screw attachment portion 21 with the screw members SM.

Next, configurations of the frame 13 and the chassis 14 that constitute the external members and the holding member will be described. The frame 13 and the chassis 14 are made of metal such as aluminum so as to have mechanical strength (rigidity) and thermal conductivity compared to a frame 13 and a chassis 14 made of synthetic resin. As illustrated in FIG. 3, while the frame 13 and the chassis 14 have the LED units LU in each end portion of the frame 13 and the chassis 14 in the short-side direction (the long-side end portions), the frame 13 and the chassis 14 hold the liquid crystal panel 11, the optical member 15, and the light guide plate 16, which are placed on top of the other, from the front side and the rear side.

As illustrated in FIG. 3, the frame 13 has a landscape rectangular shape so as to surround the display area in the display surface 11c of the liquid crystal panel 11. The frame 13 includes a panel holding portion 13a and a sidewall 13b.

The panel holding portion 13a is parallel to the display surface 11c of the liquid crystal panel 11 and presses the liquid crystal panel 11 from the front side. The sidewall 13b protrudes from an outer peripheral portion of the panel holding portion 13a toward the rear side. The panel holding portion 13a and the sidewall 13b form an L-like shape in a cross-section. The panel holding portion 13a has a landscape-rectangular and frame-like shape as a whole that corresponds to an outer peripheral portion (the non-display area, a frame-like portion) of the liquid crystal panel 11. The panel holding portion 13a presses a substantially entire area of the outer peripheral portion of the liquid crystal panel 11 from the front side. The panel holding portion 13a has a width that is large enough to cover not only the outer peripheral portion of the liquid crystal panel 11 but also the outer peripheral portions of the light guide plate 16 and the LED units LU from the front side. The outer peripheral portions of the optical members 15 and the light guide plate 16 and the LED units LU are located out from the outer peripheral portion of the liquid crystal panel 11 in a radiation direction. Similar to the display surface 11c of the liquid crystal panel 11, a front exterior surface (a surface opposite to the surface facing the liquid crystal panel 11) of the panel holding portion 13a is seen from the front side of the liquid crystal display device 10. The panel holding portion 13a constitutes a front exterior of the liquid crystal display device 10 together with the display surface 11c of the liquid crystal panel 11. The sidewall 13b has a substantially rectangular hollow shape and protrudes from the outer peripheral portion (specifically, an outer peripheral edge) of the panel holding portion 13a toward the rear side. The sidewall 13b entirely surrounds the liquid crystal panel 11, the optical member 15, the light guide plate 16, and the LED units LU, which are arranged in the space between the frame 13 and the chassis 14, in a peripheral direction thereof. The sidewall 13b also entirely surrounds the chassis 14, which is on the rear side, in a peripheral direction thereof. Outer surfaces of the sidewall 13b that extend in the peripheral direction of the liquid crystal display device 10 face outside of the liquid crystal display device 10. Therefore, the outer surfaces of the sidewall 13b constitute a top surface, a bottom surface, and side surfaces of the liquid crystal display device 10.

As illustrated in FIGS. 3 and 9, the frame 13 formed in a frame-like shape with the above basic configuration includes four frame pieces 13S that are assembled together. Each frame piece 13S corresponds to each side portion of the frame 13 (long-side portions and shot-side portions). Specifically, the frame pieces 13S include long-side frame pieces 13SL and short-side frame pieces 13SS that constitute long-side portions and short-side portions of the frame 13 (the panel holding portion 13a and the sidewall 13b), respectively. Each long-side frame piece 13SL is a rectangular block member that extends in the X-axis direction and has an L-like cross section. Each short-side frame piece 13SS is a rectangular block member that extends in the Y-axis direction and has an L-like cross section. In such a configuration, the frame pieces 13S can be formed by extruding metal material in the production process, for example, and thus the production cost can be reduced compared to a frame 13 formed by cutting a metal material. The long-side frame pieces 13SL and the short-side frame pieces 13SS that are adjacent to each other form the frame 13 by jointing the respective edges thereof in the respective extending directions. The edges of the long-side frame pieces 13SL and the edges of the short-side frame pieces 13SS, which are the joint portions of the frame pieces 13SL and 13SS (joints in the frame 13), are angled against the X-axis and Y-axis directions in a plan view. Specifically, each of the edges extends along a line that connecting an inner edge and an outer edge of the corner portion in the panel holding portion 13a. The long-side frame pieces 13SL cover not only the liquid crystal panel 11, the optical member 15, and the light guide plate 16 but also the LED units LU (refer to FIG. 6), and the short-side frame pieces 13SS (see FIG. 8) do not cover the LED units LU. Therefore, the long-side frame piece 13SL has a relatively larger width than the short-side frame pieces 13SS.

As illustrated in FIGS. 4 and 5, the panel holding portion 13a includes the screw attachment portions (fixing member attachment portions) 21 at a further interior position than the sidewall 13b of the panel holding portion 13a (a position away from the sidewall 13b toward the light guide plate 16). The screw member (the fixing member) SM is attached to the screw attachment portion 21. The screw attachment portions 21 each protrude from an inner surface of the panel holding portion 13a toward the rear side in the Z-axis direction and each have an elongated block-like shape that extends along a side of the panel holding portion 13a (in the X-axis direction and the Y-axis direction). The screw attachment portions 21 each extend on each side of the panel holding portion 13a with a length equal to the length of each side of the panel holding portion 13a. As illustrated in FIG. 9, the screw attachment portions 21 are each arranged on each frame piece 13S included in the frame 13. If the frame pieces 13S are connected with each other, the screw attachment portions 21 form a frame-like shape that continues to inner surfaces of the sidewall 13b having a rectangular hollow shape over its entire length. As illustrated in FIG. 4 and FIG. 5, each screw attachment portion 21 includes a groove 21a that opens to the rear side and to which the screw member SM can be fastened. The groove 21a extends in the longitudinal direction of the screw attachment portion 21 over substantially the entire length thereof. The groove 21a has a width that is slightly smaller than that of a shaft portion of the screw member SM. The screw attachment portion 21 is positioned between the panel holding portion 13a of the frame 13 and the chassis 14 in the Z-axis direction.

Figure 6:
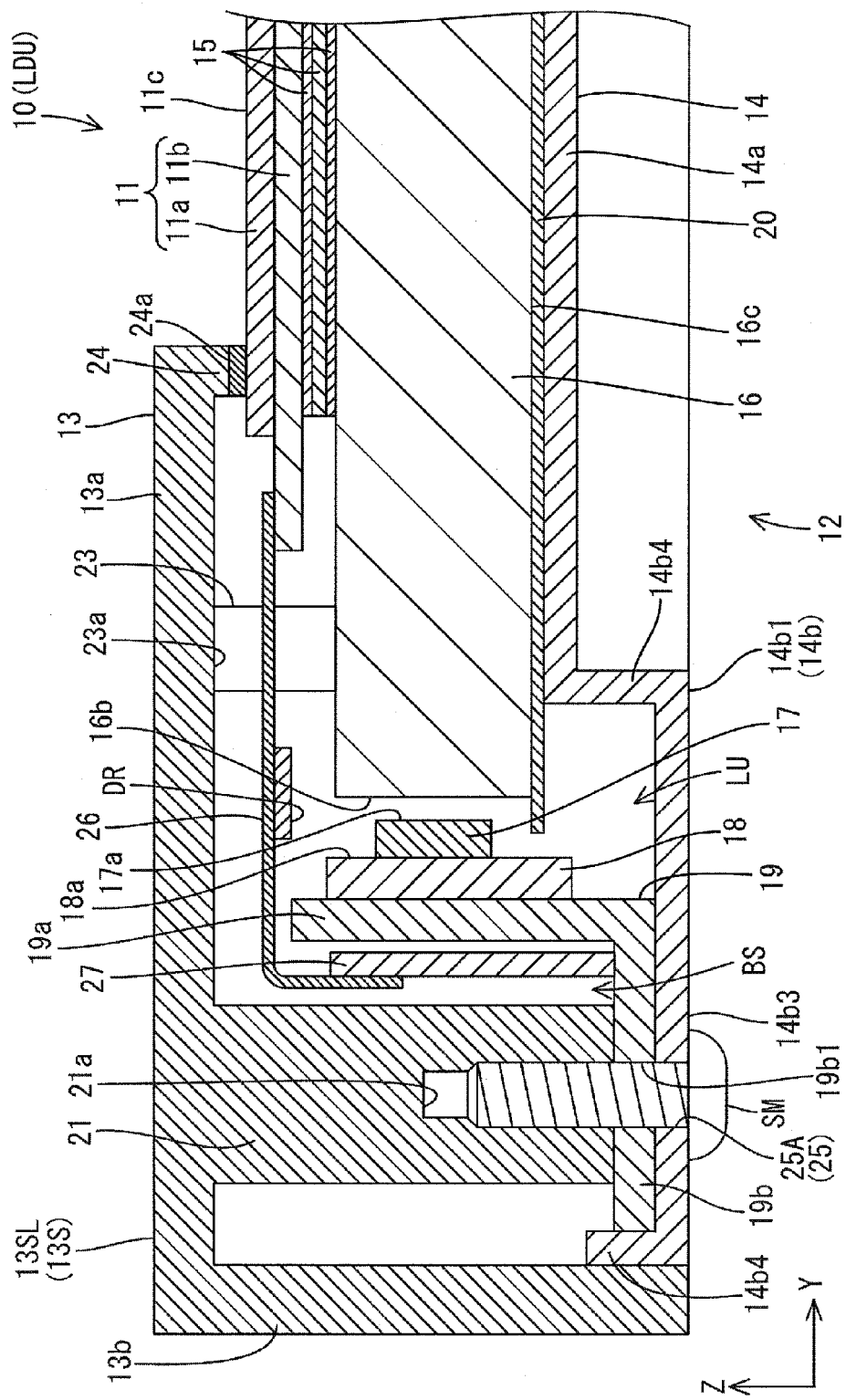
FIG. 6 is a cross-sectional view of the liquid crystal display device taken along the short-side direction thereof and an enlarged cross-sectional view of a flexible board (parts fastening screw insertion hole).
Figure 7:
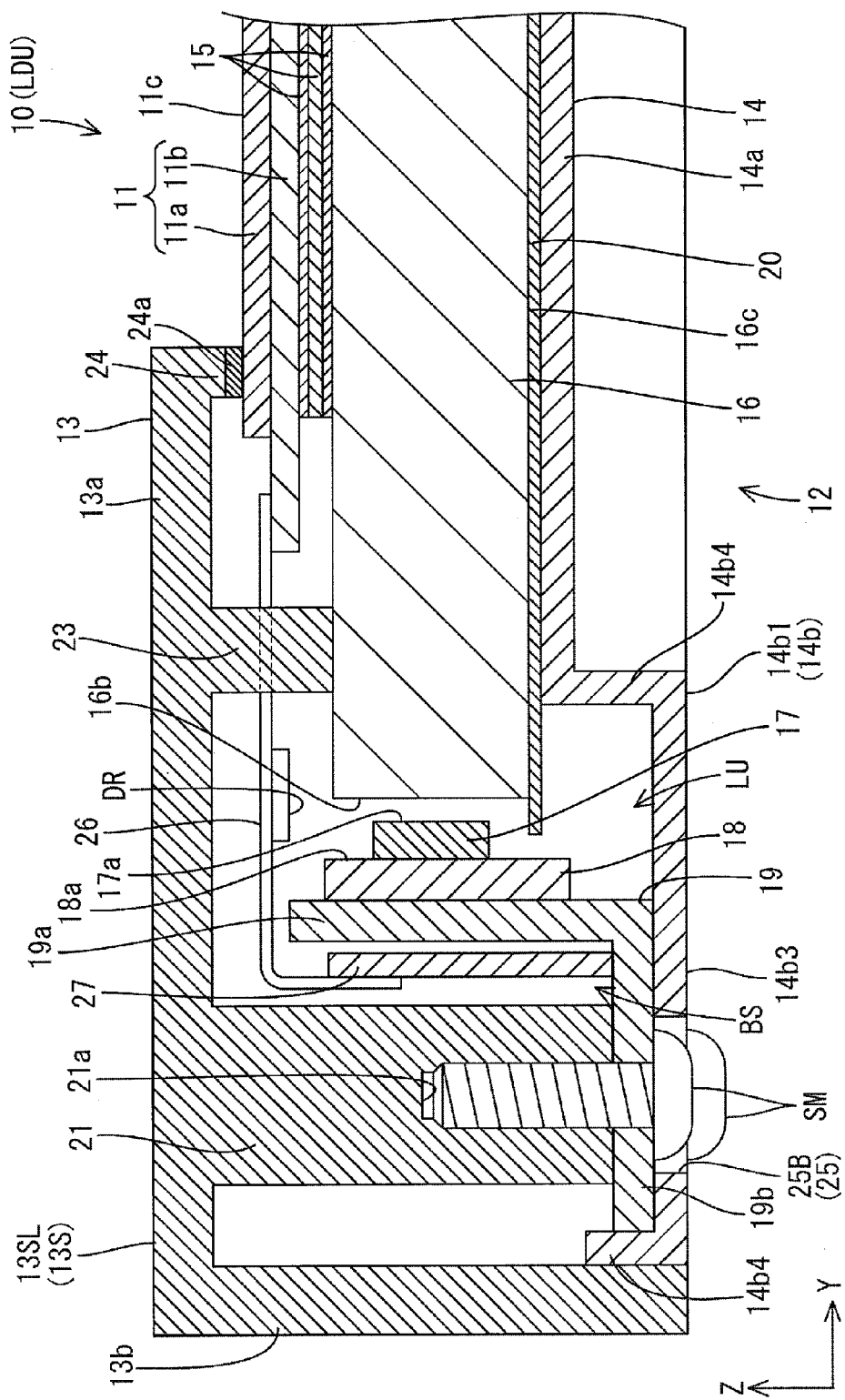
FIG. 7 is a cross-sectional view of the liquid crystal display device taken along the short-side direction thereof and an enlarged cross-sectional view of a light guide plate support portion (heat dissipation member screw insertion hole).

As illustrated in FIG. 4, the screw attachment portions 21 that extend along the long sides are each positioned between the sidewall 13b of the frame 13 and the LED attachment portion 19a of the heat dissipation member 19, which is included in the LED unit LU, in the Y-axis direction. The screw attachment portion 21 is away from the LED attachment portion 19a by a predetermined distance. As illustrated in FIGS. 6 and 7, a board space BS in which the printed circuit board 27 is arranged is provided between one of the heat dissipation members 19 that overlaps the source flexible board 26 in a plan view and the screw attachment portion 21, to which the heat dissipation member 19 is attached. In other words, the printed circuit board 27 is arranged between the screw attachment portion 21 and the LED attachment portion 19a. The printed circuit board 27 is made of synthetic resin and has an elongated plate-like shape that extends in the longitudinal direction of the screw attachment portion 21 and the LED attachment portion 19a (in the X-axis direction). The printed circuit board 27 is arranged in the board space BS such that a plate surface of the printed circuit board 27 extends parallel to an outer plate surface of the LED attachment portion 19a (a surface opposite to the LED board 18 side). On the printed circuit board 27, multiple source flexible boards 26 are arranged away from each other in the long-side direction of the printed circuit board 27 and connected to the printed circuit board 27 at the other end thereof. The source flexible boards 26 that are connected to the printed circuit board 27 and the array board 11b of the liquid crystal panel 11 extend over the LED attachment portion 19a, the LED board 18, and the LEDs 17 in the Y-axis direction. The printed circuit board 27 includes a connector (not illustrated) to which an end of an FPC (not illustrated) is connected. The other end of the FPC extends to the rear side of the chassis 14 through an FPC hole (not illustrated) in the chassis 14 and is connected to the control board CTB.

Figure 8:
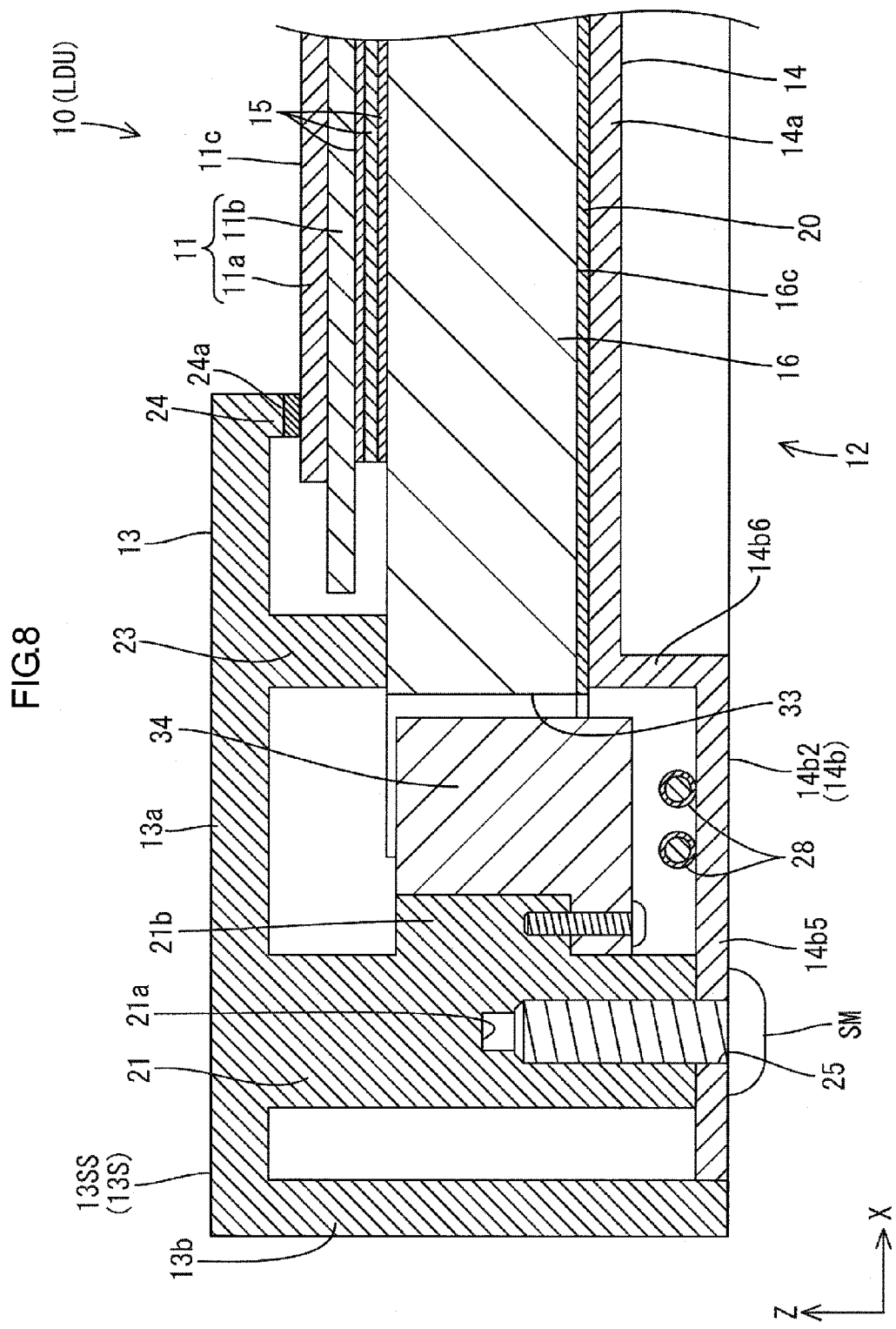
FIG. 8 is a magnified cross-sectional view of FIG. 5.

As illustrated in FIGS. 5 and 9, each of the screw attachment portions 21 on the short-side has a positioning portion attachment portion 21b where the positioning portion 34 is attached to position the light guide plate 16. The positioning portion attachment portion 21b inwardly projects partially from an inner surface of the screw attachment portion 21 (facing the light guide plate 16). The positioning portion attachment portion 21b is integral with the screw attachment portion 21. The positioning portion 34 is made of metal and has a rectangular plan view shape and a substantially block shape as a whole. An outer end portion of the positioning portion 34 is fixed to the positioning portion attachment portion 21b with a screw. As illustrated in FIGS. 8 and 9, the positioning portion 34 is a projection that is fitted to the fitting portion 33 that is a recess in the light guide plate 16. The positioning portion 34 has a pair of first side surfaces 34a and a second side surface 23b. The first side surfaces 34a are parallel to the X-axis direction and face opposite sides, and the second side surface 23b is parallel to the Y-axis direction. According to the fitting of the positioning portion 34 into the fitting portion 33 of the light guide plate 16, the first side surfaces 34a face the respective first side surfaces 33a of the fitting portion 33. Accordingly, the light guide plate 16 is positioned with respect to the Y-axis direction. A clearance is provided between the second side surface 34b of the positioning portion 34 and a second side surface 33b of the fitting portion 34 to allow the size increase of the light guide plate 16 in the long-side direction thereof (the X-axis direction) due to its thermal expansion.

As illustrated in FIGS. 4 and 5, the panel holding portion 13a integrally includes a light guide plate support portion 23 at a portion inner than the screw attachment portion 21. The light guide plate support portion 23 supports the light guide plate 16 from the front side (a display surface 11c side). The light guide plate support portion 23 projects from an inner surface of the panel holding portion 13a toward the rear side (the light guide plate 16) along the Z-axis direction (a direction in which the screw attachment portion 21 projects). The light guide plate support portion 23 has a substantially thin elongated block shape extending along a side of each of the panel holding portion 13a. The light guide plate support portion 23 is provided at a side of each panel holding portion 13a and has a length dimension extending over an entire length of each side. The light guide plate support portion 23 is provided separately on each of the frame pieces 13S included in the frame 13 similar to the screw attachment portion 21. The frame pieces 13S are mounted together to form a frame-shaped light guide plate support portion 23 that extends along an entire periphery of the panel holding portion 13a (the light guide plate 16) as a whole. The light guide plate support portion 23 has a projected distal end surface that is in contact with a front-side surface of an end portion of the light guide plate 16, i.e., the light exit surface 16a. The end portion of the light guide plate 16 projects to an outer side than the liquid crystal panel 11. Therefore, the light guide plate support portion 23 and the chassis 14 hold the light guide plate 16 therebetween such that the light guide plate support portion 23 supports the light guide plate 16 from the front side (the display surface 11c side) and has a light guide plate supporting function.

A pair of long-side light guide plate support portions 23 is provided on the long-side frame pieces 13SL and extends along the long sides of the panel holding portions 13a. As illustrated in FIG. 4, the long-side light guide plate support portions 23 support the long-side end portions of the light guide plate 16 having the light entrance surfaces 16b so that a positional relation between the LEDs 17 and the light entrance surface 16b with respect to the Z-axis direction is maintained stably. Further, the long-side light guide plate support portions 23 are arranged between the liquid crystal panel 11 and the LEDs 17. Specifically, each of the long-side light guide plate support portions 23 is located in and divides a space between the end surfaces of the liquid crystal panel 11 and the optical member 15 facing the LEDs 17 and the LEDs 17 to close a divided space. Accordingly, light from the LEDs 17 is less likely to enter the liquid crystal panel 11 and the optical member 15 through the end surfaces thereof without passing through the light guide plate 16. Namely, the long-side light guide plate support portions 23 have a light blocking property and function as a light blocking member. As illustrated in FIGS. 6 and 7, one of the long-side light guide plate supporting portions 23 overlaps the flexible boards 26 with a plan view and the one of the long-side light guide plate supporting portions 23 has flexible board insertion recesses 23a that are arrange at intervals along the X-axis direction. The flexible boards 26 are inserted through the respective flexible board insertion recesses 23a. The arrangement of the flexible board insertion recesses 23a is same as that of the flexible boards 26.

As illustrated in FIGS. 4 and 5, the panel holding portion 13a integrally includes a holding protrusion 24 that protrudes from an inner edge of the panel holding portion 13a toward the rear-surface side, i.e., toward the liquid crystal panel 11. The holding protrusion 24 includes a shock absorber 24a at its protruded end. The holding protrusion 24 can press the liquid crystal panel 11 from the front side via the shock absorber 24a in between. Similar to the screw attachment portion 21, the holding protrusion 24 and the shock absorber 24a extend along a side of each of the frame pieces 13S, which form the frame 13, and each holding protrusion 24 and each shock absorber 24a are provided on each of the sides of the frame pieces 13S, separately. The frame pieces 13S are mounted together to form a frame-like shape as a whole at an entire inner peripheral edge of the panel holding portion 13a.

As illustrated in FIG. 3, the chassis 14 has a substantially longitudinal shallow tray shape as a whole and covers overall areas of the light guide plate 16 and the LED units LU from the rear side. A rear outer surface of the chassis 14 (a surface of the chassis 14 opposite from a surface that faces the light guide plate 16 and the LED units LU) is seen from the rear side and constitutes a back surface of the liquid crystal display device 10. The chassis 14 includes a light guide plate receiving portion 14a and housings 14b. The light guide plate receiving portion 14a has a landscape rectangular shape similar to the light guide plate 16. Each of the housings 14b protrudes from an outer peripheral end of the light guide plate receiving portion 14a toward the rear side to form a step and holds the LED unit LU and relay lines 28. A middle portion of the light guide plate 16 overlaps the light guide plate receiving portion 14a with a plan view, and the outer peripheral portions of the light guide plate 16 protrude outwardly from the light guide plate receiving portion 14a and overlap the housings 14b with a plan view.

As illustrated in FIGS. 3 to 5, the light guide plate receiving portion 14a has a plane plate shape so as to receive a large portion of the light guide plate 16 in its middle portion from the rear side. The housings 14b have a plane longitudinal frame-like shape so as to surround the light guide plate receiving portion 14a. The housings 14b are recessed toward the rear side than the light guide plate receiving portion 14a to have the LED units LU and the relay lines 28 therein. The housings 14b include LED unit housings 14b1 on a pair of long-side portions thereof and relay member housings 14b2 on a pair of short-side portions thereof. The LED units LU are arranged in the respective LED unit housings 14b1 and the relay lines 28 are arranged in the respective relay member housings 14b2. As illustrated in FIG. 4, the LED unit housing 14b1 includes a bottom plate portion 14b3 that is parallel to the light guide plate receiving portion 14a and a pair of side plate portions 14b4 that extend from respective ends of the bottom plate portion 14b3 toward the front side. An inner one of the side plate portions 14b4 is continuous from the light guide plate receiving portion 14a. The bottom plate portion 14b3 receives the heat dissipation portion 19b of the heat dissipation member 19, which is included in the LED unit LU, at an inner surface thereof with surface contact. Screw members (fixing members) SM are attached to the bottom plate portion 14b3 from the outside to fix the frame 13 and the chassis 14 together.

As illustrated in FIG. 5, the relay member housing 14b2 includes a bottom plate portion 14b5 that is parallel to the light guide plate receiving portion 14a and a side plate portion 14b6 that extends from an inner end of the bottom plate portion 14b5 and is continuous to the light guide plate receiving portion 14a. The bottom plate portions 14b5 overlap the short-side end portions of the light guide plate 16 with a plan view and are opposed to the light guide plate 16 with respect to the Z-axis direction with a certain space therebetween. The relay lines 28 are arranged in the space between the bottom plate portion 14b5 and the light guide plate 16. As illustrated in FIG. 9, a relay member-side connector 29 provided at one ends of the relay lines 28 is connected to the board-side connector 22 included in the LED board 18, and other ends of the relay lines 28 extend within the chassis 14 to the outside of the chassis 14. A portion of the chassis 14 that is covered with a cover member CV, i.e., a lower portion of the chassis 14 in FIGS. 9 and 10 has relay member insertion holes 30. With this configuration, the relay member-side connector 29 provided at the other ends of the relay lines 28 is connected to the board connector PWBC included in the power supply board PWB that is arranged on an outer side of the chassis 14. Accordingly, the relay lines 28 that extend to the rear outer side of the chassis 14, which constitutes a part of exterior of the liquid crystal display device 10, are not seen on its exterior. The relay lines 28 that are connected to the upper LED board 18 in FIG. 9 are passed through the relay member insertion hole 30 at the other end thereof. The relay lines 28 connected to the upper LED board 18 extend along the short-side of the light guide plate 16 and are arranged in the relay member housing 142b. Screw members (fixing members) SM are attached to the bottom plate portion 14b5 from the outside to fix the frame 13 and the chassis 14 together.

As illustrated in FIGS. 6 to 8, each of the bottom plate portions 14b3, 14b5 of the housings 14b1, 14b2 has screw insertion holes 25 through which the screw members SM are inserted. Outer side portion of each bottom plate portion 14b3, 14b5 overlaps the screw attachment portion 21 of the frame 13 with a plan view and the screw insertion holes 25 formed in each of the bottom plate portions 14b3, 14b5 are communicated with the respective grooves 21a of the screw attachment portion 21. Each screw member SM is passed through the screw insertion hole 25 in the Z-axis direction (the direction in which the liquid crystal panel 11, the optical member 15 and the light guide plate 16 overlap) from the rear side of the chassis 14 (the side opposite from the display surface 11*c*). The screw member SM that is inserted through the screw insertion hole 25 and holds the corresponding bottom plate portion 14*b*3, 14*b*5 is tightened to the groove 21*a* of the screw attachment portion 21. According to tightening and threading of the screw member SM, a thread groove is formed on the groove 21*a* by a screw thread formed on a shaft of the screw member SM. The screw insertion holes 25 formed in a pair of bottom portions 14*b*3, which are included in the LED housing 14*b*1, include parts fastening screw insertion holes 25A and dissipation member fastening screw insertion holes 25B. As illustrated in FIG. 6, only the shaft of the screw member SM is passed through the parts fastening screw insertion hole 25A, and as illustrated in FIG. 7, the shaft and a screw head of the screw member SM are passed through the dissipation member fastening screw insertion hole 25B. The screw member SM passed through the hole 25A fastens the heat dissipation portion 19*b* and the bottom plate portion 14*b*3 together to fix them to the screw attachment portion 21. The screw member SM passed through the hole 25B fastens only the dissipation portion 19*b* and fix it to the screw attachment portion 21.

Figure 12:
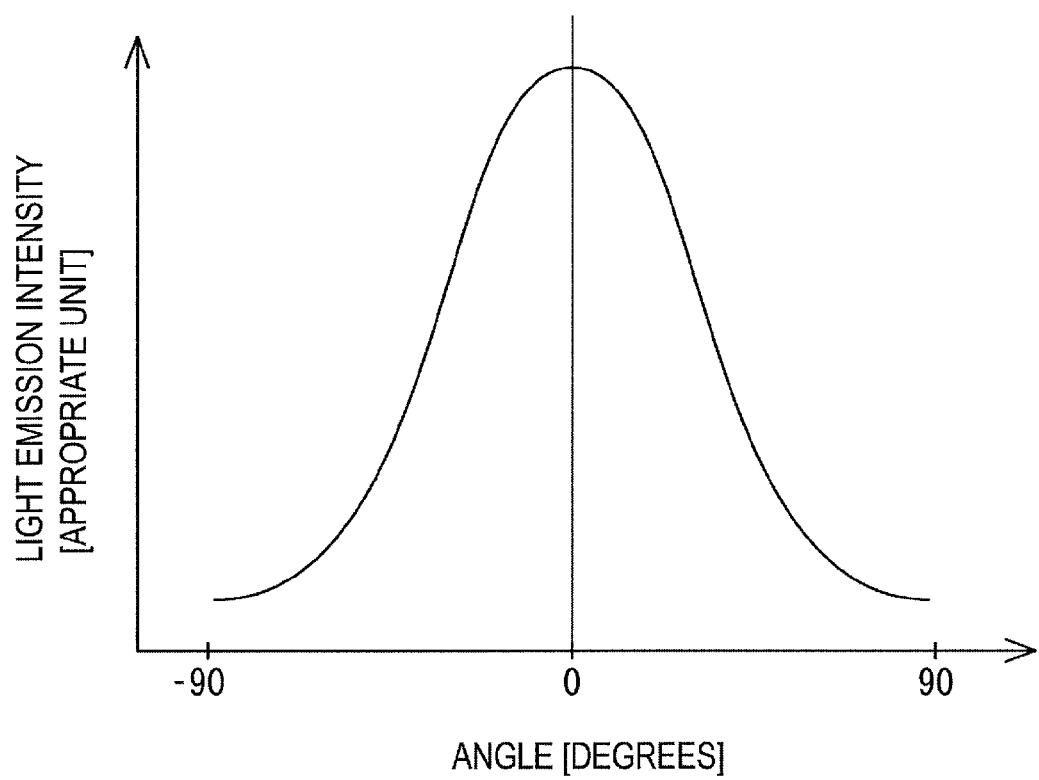
FIG. 12 is a graph representing a light intensity distribution of LEDs.

Next, a light intensity distribution of the LEDs 17 that are the light source will be described with reference to FIG. 12. In FIG. 12, a lateral axis represents an angle (degrees) with respect to an optical axis (a front direction) of light from the LED 17 and a vertical axis represents light emission intensity (appropriate unit). Herein, a specific unit of the light intensity includes a radiant intensity (W/sr·m2), a radiant flux (W), and irradiance (W/m2). Any other physical quantities relating to quantity of radiation may be used as the specific unit of the light intensity. In the light intensity distribution of light from the LED 17, the rays of light traveling toward a front direction of the main light emission surface 17*a*, i.e., along the optical axis have a peak light intensity and the light emission intensity tends to decrease with a curved line in the graph as the angle with respect to the optical axis increases. Namely, the light intensity distribution is represented by the curved graph having an angle range with certain light emission intensity or more or having a width continuously increasing and decreasing. Thus, the LED 17 represents a lambertian light intensity distribution. Such a light intensity distribution represents a graph having a shape similar to a normal distribution and a substantially symmetrical shape with respect to an optical axis. In the lambertian light intensity distribution, the light entrance efficiency is improved as the distance between the LED 17 and the light entrance surface 16*b* of the light guide plate 16 is decreased, and the light entrance efficiency is decreased as the distance is increased. On the other hand, the light guide plate 16 thermally expands due to heat generated by light emission from the LED 17 and increases its size. Therefore, a clearance is required to be provided to allow the size increase of the light guide plate 16 due to the thermal expansion. This limits improvement of the light entrance efficiency of light entering the light guide plate 16.

Figure 13:
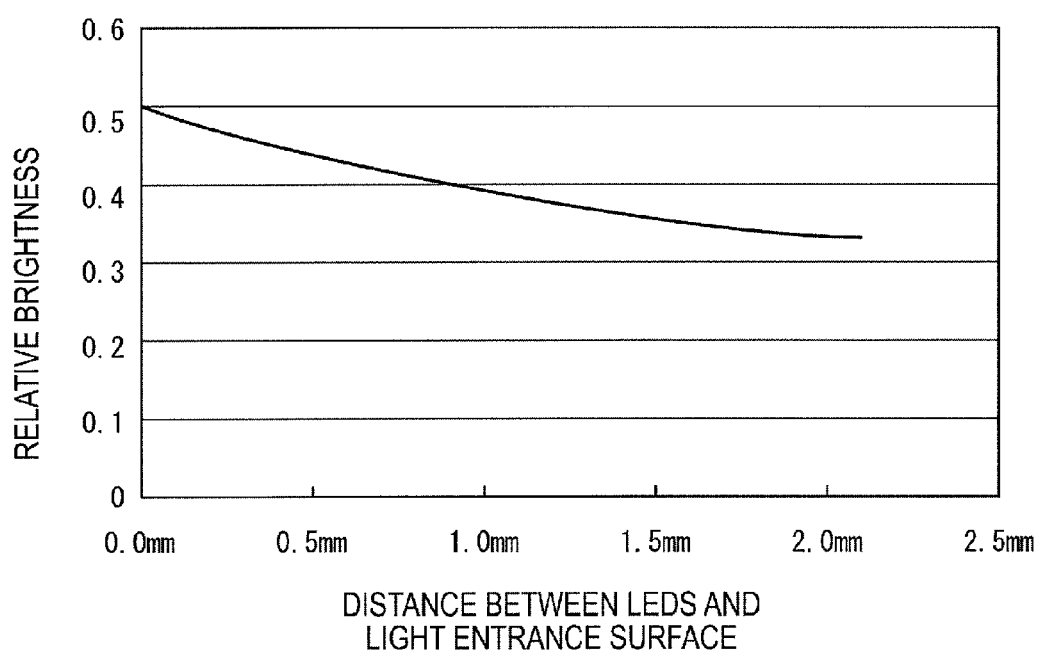
FIG. 13 is a graph representing a relation between a distance between the LED and the light entrance surface and relative brightness.

As a result of enthusiastic studies, the inventor found that if the distance between the LED 17 having the lambertian light intensity distribution and the light entrance surface 16*b* of the light guide plate 16 is a certain value or more, the light entrance efficiency is unlikely to be decreased according to the increase of the distance and the light entrance efficiency becomes constant. Hereinafter, relation between the distance between the LED 17 and the light entrance surface 16*b* of the light guide plate 16 and the light entrance efficiency will be described with reference to FIG. 13. In FIG. 13, a lateral axis represents a distance between the LED 17 and the light entrance surface 16*b* of the light guide plate 16, and a vertical axis represents relative brightness of light exiting the light guide plate 16 through the light exit surface 16*a*. Herein, the relative brightness represents a relative brightness value with a total flux of rays of emission light from the LED 17 as a reference value. According to the graph in FIG. 13, when the distance between the LED 17 and the light entrance surface 16*b* of the light guide plate 16 is substantially zero, the maximum relative brightness is approximately 0.5, and the relative brightness decreases gradually as the distance increases. When the distance is between 1.0 mm and 1.5 mm, the relative brightness decreases more moderately, and when the distance is between 1.5 mm and 2 mm, the relative brightness decreases much more moderately. Thus, the relative brightness, i.e., the decreasing rate of light entrance efficiency of the light emitted from the LED 17 and entering the light guide plate 16 through the light entrance surface 16*b* (a rate of the decreasing amount in the relative brightness with respect to the increase amount of the distance (entrance efficiency)) is unlikely to be decreased when the distance between the LED 17 and the light entrance surface 16*b* of the light guide plate 16 exceeds 1.0 mm. When the distance reaches 2 mm, the relative brightness substantially remains a certain value and becomes constant.

According to the result of the studies, the inventor arranges the light guide plate 16 that is arranged between the pair of LED boards 18 and the LEDs 17 that are mounted on the LED boards 18 as follows. One of the light entrance surfaces 16*b* of the light guide plate 16 is a first light entrance surface 16*b*A and the LEDs 17 opposed to the first light entrance surface 16*b*A are first LEDs 17A. The other light entrance surface 16*b* that is on an opposite side from the first light entrance surface 16*b*A is a second light entrance surface 16*b*B and the LEDs 17 opposed to the second light entrance surface 16*b*A are second LEDs 17B. As illustrated in FIG. 11, the first LEDs 17A are arranged to have a relatively small distance A from the first light entrance surface 16*b*A, and the second LEDs 17B are arranged to have a relatively great distance B from the second light entrance surface 16*b*B. A total dimension of the distance A and the distance B substantially equal to a maximum size increase amount of the light guide plate 16 that increases its size in the Y-axis direction (the direction in which the LEDs 17A, 17B and the light guide plate 16 are arranged) due to its thermal expansion. Hereinafter, the LEDs 17 arranged on the lower side of FIG. 11 are referred to as the first LEDs and the light entrance surface 16*b* arranged on the lower side in FIG. 11 is referred to as the first light entrance surface, and "A" is added to the respective reference numerals and symbols. The LEDs 17 arranged on the upper side of FIG. 11 are referred to as the second LEDs and the light entrance surface 16*b* arranged on the upper side in FIG. 11 is referred to as the second light entrance surface, and "B" is added to the respective reference numerals and symbols. No additional character is added to the reference numerals and symbols when the LEDs 17 or the light entrance surface 16*b* is generally referred to. FIG. 11 generally illustrates a plan-view arrangement configuration of the LEDs 17, the light guide plate 16, and the positioning portions 34 and a dot pattern of the light reflection portion 32.

Figure 14:
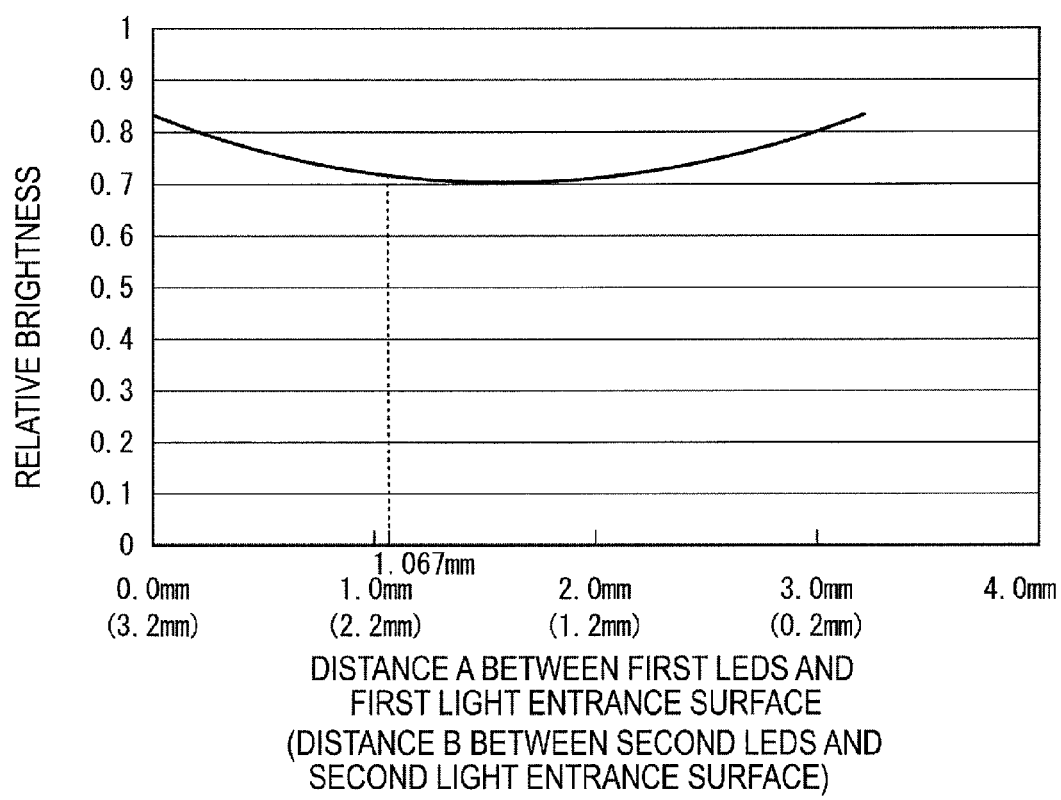
FIG. 14 is a graph representing a relation between a distance A between a first LED and a first light entrance surface (a distance B between a second LED and a second light entrance surface) and relative brightness.

With the above positional relation between the LEDs 17A, 17B and the light entrance surfaces 15*b*A, 16*b*B, the light entrance efficiency of light emitted from the first LED 17A and entering the light guide plate 16 through the first light entrance surface 16*b*A becomes relatively high and the light entrance efficiency of light emitted from the second LED 17B and entering the light guide plate 16 through the second light entrance surface 16*b*B becomes relatively low. However, the light entrance efficiency is unlikely to be decreased according to the increase of the distance and therefore, the light entrance efficiency stops decreasing from a certain value. Hereinafter, the relation between the respective distances A, B and the respective light entrance surfaces 16bA, 16bB and the brightness of light exiting the light guide plate 16 will be described with reference to FIG. 14. In FIG. 14, a lateral axis represents the distance A between the first LEDs 17A and the first light entrance surface 16bA of the light guide plate 16 (the distance B between the second LEDs 17B and the second light entrance surface 16bB of the light guide plate 16) and a vertical axis represents relative brightness of light exiting the light guide plate 16 through the light exit surface 16a. Herein, the relative brightness represents a relative brightness value with a total flux of rays of emission light from the first LED 17A and the second LED 17B as a reference value. In FIG. 14, a total value of the distance A and the distance B is 3.2 mm. Therefore, the distance A is equal to a value obtained by subtracting the distance B from 2.3 mm and the distance B is equal to a value obtained by subtracting the distance A from 3.2 mm. According to the graph in FIG. 14, when both of the distance A and the distance B are same and approximately 1.6 mm, the relative brightness is lowest and the relative brightness tends to increase as difference between the distance A and the distance B increases. If the distance A is equal to the distance B, the light entrance efficiency of light emitted from each LED 17 and entering the light guide plate 16 through each light entrance surface 16b is low and the light use efficiency is low as a whole. The light entrance efficiency of light with the distance A being equal to the distance B is referred to as a reference value and with the above-described positional relation between the respective LEDs 17A, 17B and the respective light entrance surfaces 16bA, 16bB, a plus difference value between the reference value and the light entrance efficiency of light emitted from the first LED 17A and entering the light guide plate 16 through the first light entrance surface 16bA (the light entrance efficiency is higher than the reference value) is greater than a minus difference value between the reference value and the light entrance efficiency of light emitted from the second LED 17B and entering the light guide plate 16 through the second light entrance surface 16bB (the light entrance efficiency is lower than the reference value). Thus, with the arrangement configuration in which the distance A differs from the distance B, the light use efficiency as a whole is improved compared to the configuration in which the distance A is equal to the distance B.

On the other hand, the light guide plate 16 thermally expands due to heat from the lighted LED 17 and increases its size along the plate surface thereof. The expansion of the light guide plate 16 occurs from the positioning portion thereof with respect to the chassis 14, i.e., the positioning portions and the fitting portions 33. Therefore, the movement amount of each light entrance surface 16bA, 16bB in the Y-axis direction due to the expansion of the light guide plate 16 tends to be proportional to the distance from the positioning portion 34 or the fitting portion 33 to each of the light entrance surfaces 16bA and 16bB. According to the present embodiment, as illustrated in FIG. 11, the positioning portions 34 and the fitting portions 33 are arranged such that a distance C from the positioning portions 34 and the fitting portions 33 to the first light entrance surface 16bA is relatively small and a distance D from the positioning portions 34 and the fitting portions 33 to the second light entrance surface 16bB is relatively large. Namely, the positioning portions 34 and the fitting portions 33 are arranged locally on a side of the first LEDs 17A (the first light entrance surface 16bA) on the light guide plate 16 with respect to the Y-axis direction. With such a configuration, the movement amount of the second light entrance surface 16bB due to the thermal expansion of the light guide plate 16 is relatively greater than the movement amount of the first entrance surface 16bA. The light guide plate 16 can increase its size by using the relatively great distance B that is provided between the second LEDs 17B and the second light entrance surface 16bB and each of the light entrance surfaces 16bA, 16bB is less likely to be in contact with the LEDs 17A, 17B. This minimizes the total of the distance A and the distance B that are provided between the LEDs 17A and 17B and the light entrance surfaces 16bA, 16bB, respectively. Especially, according to the present embodiment, a total size of the distance A and the distance B is substantially equal to a maximum size increase amount of the light guide plate 16 that increases its size in the Y-axis direction due to the thermal expansion of the light guide plate 16. Namely, the total size of the distance A and the distance B is the minimum size and this effectively decreases the size (of the frames) of the backlight device 12 and the liquid crystal display device 10.

According to the present embodiment, the LEDs 17A, 17B, the light guide plate 16, the positioning portions 34, and the fitting portions 33 are arranged to satisfy the following formulae (3), (4). As is expressed by the formula (3), the components are arranged such that the distance A is ⅓ or less of the total of the distance A and the distance B (the maximum size increase amount of the light guide plate 16 in the Y-axis direction), for example, 1.067 mm or less. With this configuration, as illustrated in FIG. 14, the distance A between the first LEDs 17A and the first light entrance surface 16bA of the light guide plate 16 is sufficiently small, and the light entrance efficiency of light emitted from the first LEDs 17A and entering the light guide plate 16 through the first light entrance surface 16bA is further improved. On the other hand, the light entrance efficiency of light emitted from the second LEDs 17B and entering the light guide plate 16 through the second light entrance surface 16bB already has a lowest value, and therefore the light entrance efficiency is less likely to be further decreased even if the distance B increases. Accordingly, the light use efficiency becomes high as a whole. If the components are arranged such that the distance C is ⅓ or less of the total of the distance C and the distance D (the short-side dimension of the light guide plate 16), the positional relation between each of the light entrance surfaces 16bA, 16bB of the light guide plate 16 and the positioning portions 34 and the fitting portions 33 becomes similar to that between the LEDs 17A, 17B and the light entrance surfaces 16bA, 16bB, as illustrated in FIG. 11. Accordingly, the light guide plate 16 can increase its size effectively due to the thermal expansion and the total of the distance A provided between the LEDs 17A and the light entrance surface 16bA and the distance B provided between the LEDs 17B and the light entrance surface 16bB is further decreased. This is effective to decrease the size of (the frame of) the backlight device 12 and the liquid crystal display device 10.

[formula 3]

$$A \leq \tfrac{1}{3}(A+B) \qquad (3)$$

[formula 4]

$$C \leq \tfrac{1}{3}(C+D) \qquad (4)$$

According to the present embodiment, the LEDs 17A, 17B, the light guide plate 16, the positioning portions 34, and the fitting portions 33 are arranged so as to satisfy formula (5). As is expressed by the formula (5), the components are arranged such that a ratio of the distance A and the distance B is substantially equal to a ratio of the distance C and the distance D. With this configuration, the total of the distance A and the distance B provided between the LEDs 17A, 17B and the light entrance surfaces 16bA, 16bB is minimized, and this is effective to decrease the size (of the frame) of the backlight device 12 and the liquid crystal display device 10.

[formula 5]

$$A:B=C:D \quad (5)$$

As is described before, according to the present embodiment, the distance A between the first LEDs 17A and the first light entrance surface 16bA differs from the distance B between the second LEDs 17B and the second light entrance surface 16bB. With this configuration, the amount of rays of light emitted from the first LEDs 17A and entering the light guide plate 16 through the first light entrance surface 16bA is relatively great and the amount of rays of light emitted from the second LEDs 17B and entering the light guide plate 16 through the second light entrance surface 16bB is relatively small. According to the present embodiment, as illustrated in FIG. 11, the light reflection portion 32 that accelerates exit of the light from the light guide plate 16 has an area distribution in a surface plane of a plate surface of the light guide plate 16 as follows. The area distribution of the light reflection portion 32 increases as is farther away from the respective first LEDs 17A and the second LEDs 17B and becomes maximum in a second LED 17B-side portion of the plate surface of the light guide plate 16. With such a distribution, in the plane of the plate surface of the light guide plate 16, the light entering through the first light entrance surface 16bA having a relatively great amount of incident light is less likely to be reflected by the light reflection portion 32 and the light entering through the second light entrance surface 16bB having a relatively small amount of incident light is likely to be reflected by the light reflection portion 32. Accordingly, the amount of light exiting the light guide plate 16 through the light exit surface 16a is averaged in the plane surface and unevenness of the brightness is less likely to occur. Specifically, the light reflection portion includes dots 32a formed with ink that are dispersed in a plate surface 16c on an opposite side from the light exit surface 16a of the light guide plate 16 with a predetermined distribution. An area of each of the dots 32a is increased as is farther away from the first LED 17A and the second LEDs 17B and becomes maximum in a portion closer to the second LEDs 17B than the first LEDs 17A.

As is described before, according to the present embodiment, the backlight device (the lighting device) 12 includes the light guide plate 16, the first LEDs (a first light source) 17A, the second LEDs (a second light source) 17B, and the positioning portions 34. The light guide plate 16 includes the light entrance surface 16b that is at least one of side surfaces thereof and the light exit surface 16a that is one of plate surfaces thereof. The first LEDs 17A are opposed to the first light entrance surface 16bA that is a first side surface of the light guide plate 16. The second LEDs 17B are opposed to the second light entrance surface 16bB that is a second side surface that is an opposite surface of the first side surface of the light guide plate 16. The second LEDs 17B are arranged such that the distance B between the second entrance surface 16bB and the second LEDs 17B is relatively greater than the distance A between the first LEDs 17A and the first light entrance surface 16bA. The light guide plate 16 is positioned by the positioning portions 34 with respect to the first LEDs 17A and the second LEDs 17B in the direction in which the first LEDs 17A, the light guide plate 16, and the second LEDs 17B are arranged. The positioning portions 34 are arranged such that the distance D between the second light entrance surface 16bB and the positioning portions 34 is relatively greater than the distance C between the first light entrance surface 16bA and the positioning portions 34.

With such a configuration, the light emitted from the first LEDs 17A enters the light guide plate 16 through the first light entrance surface 16bA and the light emitted from the second LEDs 17B enters the light guide plate 16 through the second light entrance surface 16bB and then, the light entering the light guide plate 16 travels within the light guide plate 16 and exits the light guide plate 16 through the light exit surface 16a. The light guide plate 16 is positioned by the positioning portions 34 with respect to the first LEDs 17A and the second LEDs 17B in the direction in which the first LEDs 17A, the light guide plate 16, and the second LEDs 17B are arranged. Therefore, the light entrance efficiency of the light emitted from the respective LEDs 17A and 17B and entering through the respective light entrance surfaces 16bA, 16bB is less likely to be varied unexpectedly.

The distance A between the first LEDs 17A and the first light entrance surface 16bA of the light guide plate 16 is relatively small and the distance B between the second LEDs 17B and the second light entrance surface 16bB of the light guide plate 16 is relatively great. Therefore, the light entrance efficiency of the light emitted from the first LEDs 17A and entering the light guide plate 16 through the first light entrance surface 16bA is relatively high and the light entrance efficiency of the light emitted from the second LEDs 17B and entering the light guide plate 16 through the second light entrance surface 16bB is relatively low. According to the inventor's studies, it is found that if the distance between the respective LEDs 17A and 17B and the respective light entrance surfaces 16bA, 16bB becomes a certain value or more, the light entrance efficiency of light is less likely to be decreased according to the increase of the distance. Therefore, the light entrance efficiency of the light emitted from the second LEDs 17B and entering the light guide plate 16 through the second light entrance surface 16bB becomes lower than the light entrance efficiency of the light emitted from the first LEDs 17A and entering the light guide plate through the first light entrance surface 16bA. However, the light entrance efficiency of the light emitted from the second LEDs 17B and entering the light guide plate 16 through the second light entrance surface 16bB is not further decreased from the certain value because the light entrance efficiency of light is less likely to be decreased according to the increase of the distance. The light entrance efficiency of light with the distance between the LEDs 17A and the light entrance surface 16bA being equal to the distance between the LEDs 17B and the light entrance surface 16bB is referred to as a reference value. A plus difference value between the reference value and the light entrance efficiency of light emitted from the first LED 17A and entering the light guide plate 16 through the first light entrance surface 16bA (the light entrance efficiency is higher than the reference value) is greater than a minus difference value between the reference value and the light entrance efficiency of light emitted from the second LED 17B and entering the light guide plate 16 through the second light entrance surface 16bB (the light entrance efficiency is lower than the reference value). Thus, the light use efficiency as a whole is improved compared to the light use efficiency in the configuration in which the distances between the respective LEDs 17A, 17B and the respective light entrance surfaces 16bA, 16bB are equal to each other.

The thermal expansion of the light guide plate 16 occurs from the positioning portions 34 and therefore, the movement amount of each light entrance surface 16bA, 16bB due to the expansion of the light guide plate 16 tends to be proportional to the distance from the positioning portions 34 to each of the light entrance surfaces 16bA and 16bB. The distance D between the positioning portions 34 and the second light entrance surface 16bB is relatively greater than the distance C between the positioning portions 34 and the first light entrance surface 16bA of the light guide plate 16. With such a configuration, the movement amount of the second light entrance surface 16bB due to the thermal expansion of the light guide plate 16 is relatively greater than the movement amount of the first entrance surface 16bA. Therefore, the light guide plate 16 can increase its size by using the relatively great distance B that is provided between the second LEDs 17B and the second light entrance surface 16bB. This minimizes the total of the distance A and the distance B that are provided between the LEDs 17A and 17B and the light entrance surfaces 16bA, 16bB, respectively. This effectively decreases the size (of the frames) of the backlight device 12 and according to the present embodiment, the light use efficiency is improved.

The distance between the first LEDs 17A and the first light entrance surface 16bA is the distance A, and the distance between the second LEDs 17B and the second light entrance surface 16bB is the distance B. The distance between the positioning portions 34 and the first light entrance surface 16bA is the distance C, and the distance between the positioning portions 34 and the second light entrance surface 16bB is the distance D. The distance A and the distance C are determined to satisfy the above-described formulae (3) and (4). Accordingly, the distance A between the first LEDs 17A and the first light entrance surface 16bA is effectively small and the light entrance efficiency of light emitted from the first LEDs 17A and entering the light guide plate 16 through the first light entrance surface 16bA is further improved. On the other hand, the light entrance efficiency of light emitted from the second LEDs 17B and entering the light guide plate 16 through the second light entrance surface 16bB is less likely to be further decreased even if the distance B is increased. Accordingly, the light use efficiency becomes high as a whole. The positional relation between each of the light entrance surfaces 16bA, 16bB and the positioning portions 34 becomes similar to that between the LEDs 17A, 17B and the light entrance surfaces 16bA, 16bB, as described above. Accordingly, the light guide plate 16 can increase its size effectively due to the thermal expansion and the total of the distance A provided between the LEDs 17A and the light entrance surface 16bA and the distance B provided between the LEDs 17B and the light entrance surface 16bB is further decreased. This is effective to decrease the size of (the frame of) the backlight device 12.

The ratio of the distance A and the distance B is substantially equal to the ratio of the distance C and the distance D. The distance A is a distance between the first LEDs 17A and the first light entrance surface 16bA and the distance B is a distance between the second LEDs 17B and the second light entrance surface 16bB. The distance C is a distance between the positioning portions 34 and the first light entrance surface 16bA. The distance D is a distance between the positioning portions 34 and the second light entrance surface 16bB. With this configuration, the total of the distance A and the distance B provided between the LEDs 17A, 17B and the light entrance surfaces 16bA, 16bB is minimized, and this is effective to decrease the size (of the frame) of the backlight device 12.

The first LEDs 17A and the second LEDs 17B are the same kinds of parts. Accordingly, a manufacturing cost of the first LEDs 17A and the second LEDs 17B is reduced and a management cost thereof is also reduced.

The first LEDs 17A and the second LEDs 17B represent a lambertian light intensity distribution. Accordingly, the light intensity distribution of the light emitted from the first LEDs 17A and the second LEDs 17B represents the lambertian light intensity distribution. Therefore, the emission light intensity is lowered with a curved inclination according to the increase of an angle of incidence of light with respect to the optical axis that is a traveling direction of the light having highest light emission intensity. In the lambertian light intensity distribution, the light entrance efficiency of the light emitted from the respective LEDs 17A, 17B and entering through the respective light entrance surfaces 16bA, 16bB is improved as the distance between the respective LEDs 17A, 17B and the respective light entrance surfaces 16bA, 16bB is decreased, and the light entrance efficiency is decreased as the distance is increased. However, if the distance reaches a certain value, the light entrance efficiency is less likely to be decreased and eventually does not change. Therefore, the distance A between the first light entrance surface 16bA and the first LEDs 17A that represent the lambertian light intensity distribution is set to be relatively small to improve the light entrance efficiency. Further, the distance B between the second light entrance surface 16bB and the second LEDs 17B that represent the lambertian light intensity distribution is set to be relatively great to allow the light guide plate 16 to increase its size and keep the light entrance efficiency to be the certain value. This improves the light entrance efficiency as a whole.

The first light source and the second light source include the respective LEDs 17A, 17B that are mounted on the respective LED boards (the base boards) 18. With this configuration, the LEDs 17 are generally the light source representing the lambertian light intensity distribution and therefore, the emission light intensity is lowered with a curved inclination according to the increase of an angle of incidence of light with respect to the optical axis that is a traveling direction of the light having highest light emission intensity. In the lambertian light intensity distribution, the light entrance efficiency of the light emitted from the respective LEDs 17A, 17B and entering through the respective light entrance surfaces 16bA, 16bB is improved as the distance between the respective LEDs 17A, 17B and the respective light entrance surfaces 16bA, 16bB is decreased, and the light entrance efficiency is decreased as the distance is increased. However, if the distance reaches a certain value, the light entrance efficiency is less likely to be decreased and eventually does not change. Therefore, the distance A between the first light entrance surface 16bA and the first LEDs 17A that are the first light source and represent the lambertian light intensity distribution is set to be relatively small to improve the light entrance efficiency. Further, the distance B between the second light entrance surface 16bB and the second LEDs 17B that are the second light source and represent the lambertian light intensity distribution is set to be relatively great to allow the guide plate 16 to increase its size and keep the light entrance efficiency to be the certain value. This improves the light entrance efficiency as a whole.

The first LEDs 17A, the light guide plate 16, and the second LEDs 17B are arranged in the chassis 14, and the positioning portions 34 are provided on the chassis 14 and fitted to a part of the light guide plate 16 with concavo-convex fitting. The positioning portions 34 provided on the chassis 13 are fitted to a part of the light guide plate 16 with the concavo-convex fitting, and accordingly the light guide plate 16 is effectively positioned with respect to the chassis 14 where the first LEDs 17A, the light guide plate 16, and the second LEDs 17B are arranged.

Second Embodiment

A second embodiment will be described with reference to FIGS. 15 and 16. In the second embodiment, a reflection sheet 35 is further included. The constructions, functions, and effects similar to those of the first embodiment will not be described.

Figure 15:
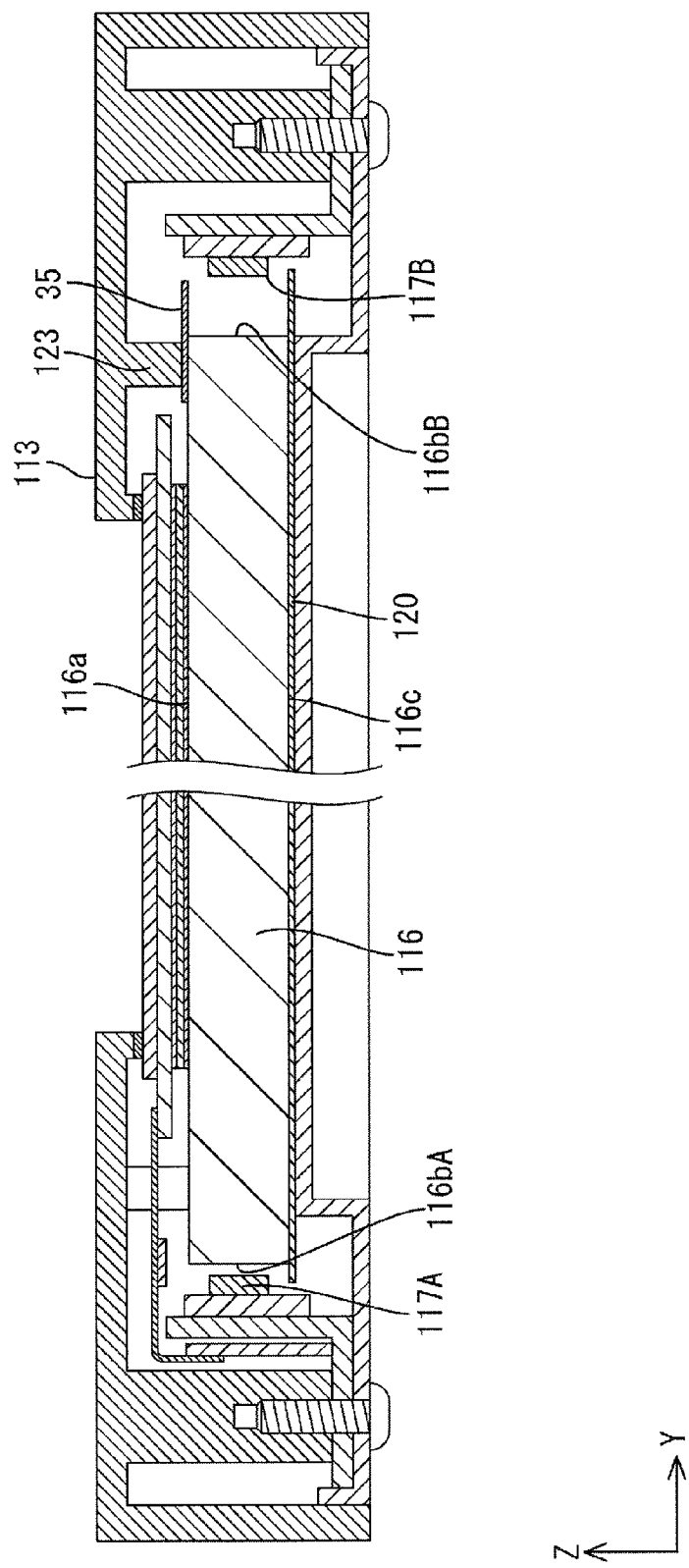
FIG. 15 is a cross-sectional view illustrating a cross-sectional configuration of a liquid crystal display device taken along a short-side direction thereof according to a second embodiment.
Figure 16:
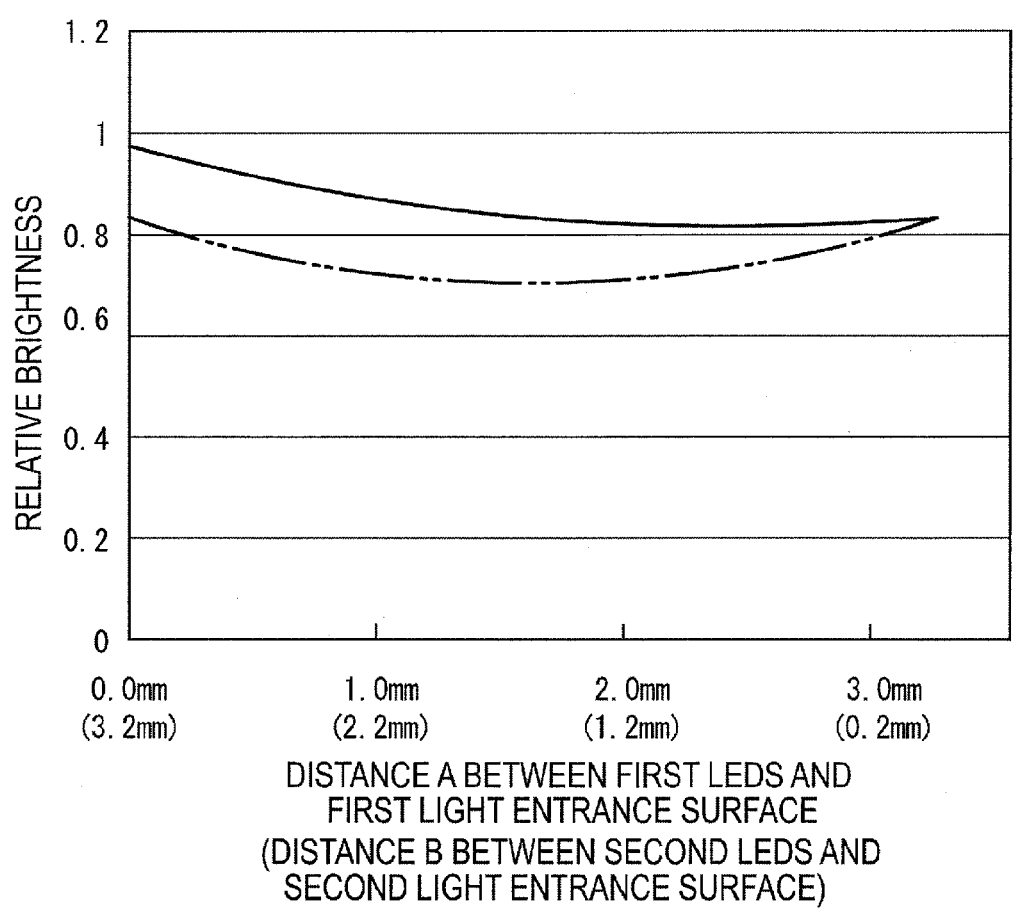
FIG. 16 is a graph representing a relation between a distance A between a first LED and a first light entrance surface (a distance B between a second LED and a second light entrance surface) and relative brightness.

As illustrated in FIG. 15, the reflection sheet 35 is arranged between an end portion of a light guide plate 116 having a second light entrance surface 116$b$B and a light guide plate support portion 123 of a frame 113. The reflection sheet 35 covers the end portion of the light guide plate 116 having the second light entrance surface 116$b$B of the light guide plate 116 and projects from the second light entrance surface 116$b$B toward second LEDs 117B like a visor. A projected portion of the reflection sheet 35 is arranged to cover a space provided between the second light entrance surface 116$b$B and the second LEDs 117B from a front side. A light guide reflection sheet 120 is arranged over a rear-side plate surface 116$c$ of the light guide plate 116 and projects from the second light entrance surface 116$b$B toward the second LEDs 117B. A projected portion is opposed to the reflection sheet 35. Namely, the reflection sheet 35 and the light guide reflection sheet 120 cover the space provided between the second light entrance surface 116$b$B and the second LEDs 117B. With this configuration, light emitted from the second LEDs 117BB is repeatedly reflected by the reflection sheets 35, 120 within the space provided between the second light entrance surface 116$b$B and the second LEDs 117B and enter the light guide plate 116 through the second light entrance surface 116$b$B. Therefore, the light is less likely to leak outside the space. Accordingly, light entrance efficiency of light emitted from the second LEDs 117B and entering through the second light entrance surface 116$b$B is improved. On the other hand, the reflection sheet 35 is not arranged between an end portion of the light guide plate 116 having the first light entrance surface 116$b$A and the light guide plate support portion of the frame 13.

Relation between each of a distance A and a distance B and brightness of light exiting the light guide plate 116 will be described with reference to FIG. 16. The distance A is a distance between the LEDs 117A and the light entrance surface 116$b$A and the distance B is a distance between the LEDs 117B and the light entrance surface 116$b$B. In FIG. 16, a lateral axis represents the distance A between the first LEDs 117A and the first light entrance surface 116$b$A of the light guide plate (the distance B between the second LEDs 117B and the second light entrance surface 116$b$B of the light guide plate 116), and a vertical axis represents relative brightness of light exiting the light guide plate 116 through the light exit surface 116$a$. Herein, the relative brightness represents a relative brightness value with a total flux of rays of emission light from the first LEDs 117A and the second LEDs 117B as a reference value. In FIG. 16, a graph described by a solid line is related to the configuration of the present embodiment (including the reflection sheet 35) and a graph described by a two-dot chain line is related to the configuration of the first embodiment (without the reflection sheet 35). With the second reflection sheet 35 according to the present embodiment, the light use efficiency as a hole is improved as the distance A between the first LEDs 117A and the first light entrance surface 116$b$A is decreased and the distance B between the second LEDs 117B and the second light entrance surface 116$b$B is increased. This is because the improvement effects of the light entrance efficiency of the light caused by the reflection sheet 35 is more remarkable as the distance B between the second LEDs 117B and the second light entrance surface 116$b$B is increased. With such a configuration, if the components are arranged such that the distances A to D satisfy the formulae (3) to (5) described in the first embodiment, the light use efficiency of the light as a whole becomes quite high.

As is described above, according to the present embodiment, the reflection sheet (a reflection member) 35 is provided to cover and close at least the space provided between the second LEDs 117B and the second light entrance surface 116$b$B from the light exit side. With such a configuration, the light entrance efficiency of the light emitted from the second LEDs 117B and entering through the second light entrance surface 116$b$B is relatively lower than the light entrance efficiency of the light emitted from the first LEDs 117A and entering through the first light entrance surface 116$b$A. However, since at least the space provided between the second LEDs 117B and the second light entrance surface 116$b$B is covered with and closed by the reflection sheet 35 from the light exit side, the light entrance efficiency of the light emitted from the second LEDs 117B and entering through the second light entrance surface 116$b$B is improved. Accordingly, the light use efficiency as a whole is further improved.

The reflection sheet 35 is selectively provided to cover the space between the second LEDs 117B and the second light entrance surface 116$b$B from the light exit side. For example, if the reflection sheet 35 covers not only the space provided between the second LEDs 117B and the second light entrance surface 116$b$B but also a space provided between the first LED 117A and the first light entrance surface 116$b$A, the light use efficiency is further improved. However, this increases a cost for providing the reflection sheet 35. The reflection sheet 35 is arranged to cover only the space between the second LEDs 117B and the second light entrance surface 116$b$B so that the cost for providing the reflection sheet 35 is reduced and the light use efficiency as a whole is effectively improved.

Third Embodiment

A third embodiment will be described with reference to FIG. 17. According to the third embodiment, LEDs 217 are arranged to face four sides of a light guide plate 216. The constructions, functions, and effects similar to the first embodiment will not be described.

Figure 17:
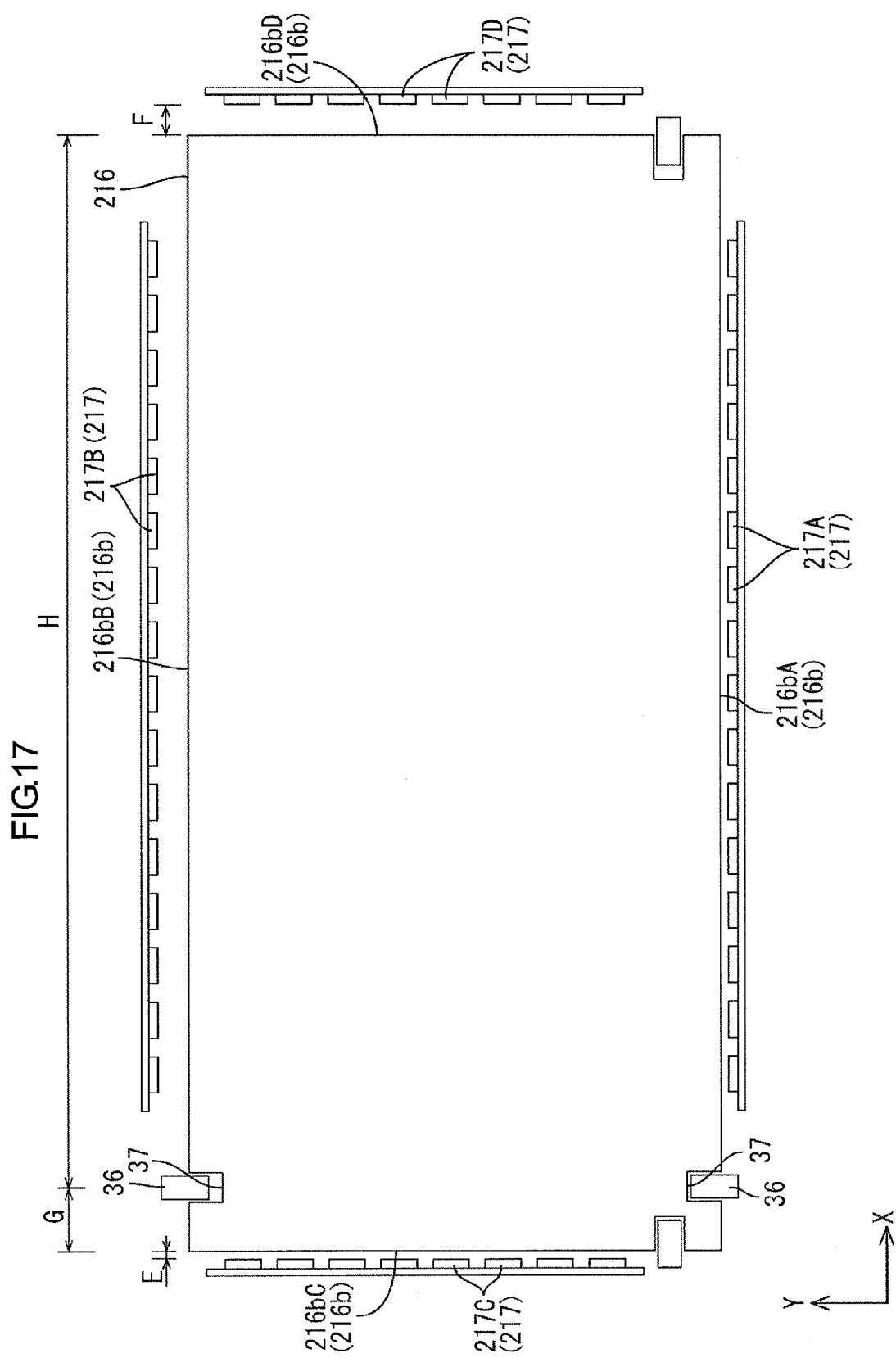
FIG. 17 is a plan view generally illustrating an arrangement configuration of LEDs, a light guide plate, positioning portions, fitting portions, second positioning portions, and second fitting portions according to a third embodiment.

As illustrated in FIG. 17, according to the present embodiment, the LEDs 217 are arranged to be opposed to each of the four side surfaces of the light guide plate 216 that has a square plan view shape. Specifically, a pair of long-side end surfaces of the light guide plate 216 includes a first light entrance surface 216$b$A and a second light entrance surface 216$b$B, and first LEDs 217A are arranged to be opposed to the first light entrance surface 216$b$A and second LEDs 217B are arranged to be opposed to the second light entrance surface 216$b$B. A pair of short-side end surfaces of the light guide plate 216 includes a third light entrance surface 216$b$C and a fourth light entrance surface 216$b$D, and third LEDs 217C are arranged to be opposed to the third light entrance surface 216$b$C and fourth LEDs 217D are arranged to be opposed to the fourth light entrance surface 216$b$D. Hereinafter, the LEDs 217 arranged on the left side in FIG. 17 are referred to as the third LEDs and the light entrance surface 216$b$ of the light guide plate 216 arranged on the left side in FIG. 17 is referred to as the third light entrance surface, and a character "C" is added to the respective symbols or numerals. The LEDs 217 arranged on the right side in FIG. 17 are referred to as the fourth LEDs and the light entrance surface 216b of the light guide plate 216 arranged on the right side in FIG. 17 is referred to as the fourth light entrance surface, and a character "D" is added to the respective symbols or numerals. No additional character is added to the reference numerals and symbols when the LEDs 217 or the light entrance surface 216b is generally referred to.

According to the present embodiment, the third LEDs 217C and the fourth LEDs 217D are arranged so that a distance E between the third LEDs 217C and the third light entrance surface 216bC is relatively small and a distance F between the fourth LEDs 217D and the forth light entrance surface 216bD is relatively great. A total dimension of the distance E and the distance F substantially equal to the maximum size increase amount of the light guide plate 216 that increases its size in the X-axis direction (the direction in which the third LEDs 217C, the fourth LEDs 217D and the light guide plate 216 are arranged) due to its thermal expansion. With such a configuration, the light entrance efficiency of the light emitted from the third LEDs 217C and entering the light guide plate 216 through the third light entrance surface 216bC is relatively high and the light entrance efficiency of the light emitted from the fourth LEDs 217D and entering the light guide plate 216 through the fourth light entrance surface 216bD is relatively low. However, the light entrance efficiency of the light is less likely to be decreased due to the increase of the distance and therefore, the light entrance efficiency of the light is not decreased from the certain value. The light entrance efficiency of light with the distance E being equal to the distance F is referred to as a reference value. A plus difference value between the reference value and the light entrance efficiency of light emitted from the third LEDs 217C and entering the light guide plate 216 through the third light entrance surface 216bC (the light entrance efficiency is higher than the reference value) is greater than a minus difference value between the reference value and the light entrance efficiency of light emitted from the fourth LEDs 217D and entering the light guide plate 216 through the fourth light entrance surface 16bD (the light entrance efficiency is lower than the reference value). Thus, the light use efficiency as a whole is improved with the configuration in which the distance E differs from the distance F compared to the configuration in which the distance E is equal to the distance F.

According to the present embodiment, second positioning portions 36 and second fitting portions 37 are provided to position the light guide plate 216 with respect to the X-axis direction. The second fitting portion 37 has a recessed shape formed by cutting off a part of the long-side end portion of the light guide plate 216. Specifically, the second fitting portion 37 is through the long-side end portion of the light guide plate 216 in the Z-axis direction (a plate thickness direction) and opens at a side thereof in the Y-axis direction (the short-side direction). The second positioning portions 36 are attached to a pair of screw attachment portions on the long sides of the frame (not illustrated), respectively, and the attachment structure is same as those of the positioning portions 34 described in the first embodiment (refer to FIG. 8). The second positioning portions 36 are fitted to the respective second fitting portions 37 with concavo-convex fitting so as to position the light guide plate 216 in the X-axis direction. The second positioning portions 36 and the second fitting portions 37 are arranged such that a distance G from the second positioning portions 36 and the second fitting portions 37 to the third light entrance surface 216bC is relatively small and a distance H from the second positioning portions 36 and the second fitting portions 37 to the fourth light entrance surface 216bD is relatively large. Namely, the second positioning portions 36 and the second fitting portions 37 are arranged locally on a side of the third LEDs 217C (the third light entrance surface 216bC) on the light guide plate 216 with respect to the Y-axis direction. With such a configuration, the movement amount of the fourth light entrance surface 216bD due to the thermal expansion of the light guide plate 216 is relatively greater than the movement amount of the third entrance surface 216bC. The light guide plate 216 can increase its size by the relatively great distance F that is provided between the fourth LEDs 217D and the fourth light entrance surface 216bD and each of the light entrance surfaces 216bC, 216bD is less likely to be in contact with the LEDs 217C, 217D. This minimizes the total of the distance E and the distance F that are provided between the LEDs 217C and 217D and the light entrance surfaces 216bC, 216bD, respectively.

According to the present embodiment, the LEDs 217C, 217D, the light guide plate 216, the second positioning portions 36, and the second fitting portions 37 are arranged to satisfy the following formulae (6), (7). As is expressed by the formula (6), the components are arranged such that the distance E is ⅓ or less of the total of the distance E and the distance F (the maximum size increase amount of the light guide plate 216 in the X-axis direction). With this configuration, the distance E between the third LEDs 217C and the third light entrance surface 216bC of the light guide plate 216 is sufficiently small, and the light entrance efficiency of light emitted from the third LEDs 217C entering the light guide plate 216 through the third light entrance surface 216bC is further improved. On the other hand, the light entrance efficiency of light emitted from the fourth LEDs 17D entering the light guide plate 216 through the fourth light entrance surface 216bD already has a lowest value, and therefore the light entrance efficiency is less likely to be further decreased even if the distance F increases. Accordingly, the light use efficiency becomes high as a whole. If the components are arranged such that the distance G is ⅓ or less of the total of the distance G and the distance H (the long-side dimension of the light guide plate 216), the positional relation between each of the light entrance surfaces 216bC, 216bD of the light guide plate 216 and the second positioning portions 36 and the second fitting portions 37 becomes similar to that between the LEDs 217C, 217D and the light entrance surfaces 216bC, 216bD. Accordingly, the light guide plate 216 can increase its size effectively due to the thermal expansion and the total of the distance E provided between the LEDs 217C and the light entrance surface 216bC and the distance F provided between the LEDs 217D and the light entrance surface 216bD is further decreased. This is effective to decrease the size of (the frame of) the backlight device and the liquid crystal display device.

[formula 6]

$$E \leq \tfrac{1}{3}(E+F) \qquad (6)$$

[formula 7]

$$G \leq \tfrac{1}{3}(G+H) \qquad (7)$$

According to the present embodiment, the LEDs 217C, 217D, the light guide plate 216, the second positioning portions 36, and the second fitting portions 37 are arranged so as to satisfy the following formula (8). As is expressed by the formula (5), the components are arranged such that a ratio of the distance E and the distance F is substantially equal to a ratio of the distance G and the distance H. With this configuration, the total of the distance E and the distance F provided between the LEDs 217C, 217D and the light entrance surfaces 216bC, 216bD is minimized, and this is effective to decrease the size (of the frame) of the backlight device and the liquid crystal display device. The light guide plate 216 includes a light reflection portion (not illustrated) configured as follows. The area distribution of the light reflection portion increases as is farther away from the respective first LEDs 217A to 217D and becomes maximum in a portion close to the second LEDs 217B and the fourth LEDs 217D in the plate surface of the light guide plate 216. Accordingly, the amount of light exiting the light guide plate 216 is averaged in the plane surface.

[formula 8]

$$E:F=G:H \qquad (8)$$

As is described before, according to the present embodiment, the light guide plate 216 has a square shape and includes the third light entrance surface 216bC that is a side end surface adjacent to the first light entrance surface 216bA and the second light entrance surface 216bB and includes the fourth light entrance surface 216bD that is an opposite side end surface from the third light entrance surface 216bC. The third LEDs (a third light source) 217C are opposed to the third light entrance surface 216bC and the fourth LEDs (a fourth light source) 217D are opposed to the fourth light entrance surface. The fourth LEDs 217D are arranged such that the distance F between the fourth LEDs 217D and the fourth light entrance surface 216bD is relatively greater than the distance E between the third LEDs 217C and the third light entrance surface 216bC. The second positioning portions 36 position the light guide plate 216 with respect to the third LEDs 217C and the fourth LEDs 217D in the direction in which the third LEDs 217C, the light guide plate 216, and the fourth LEDs 217D are arranged. The second positioning portions 36 are arranged such that the distance H between the second positioning portions 36 and the fourth light entrance surface 216bD is relatively greater than the distance G between the second positioning portions 36 and the third light entrance surface 216bC. With such a configuration, the side end surfaces of the square light guide plate 216 are the first light entrance surface 216bA, the second light entrance surface 216bB, the third light entrance surface 216bC, and the fourth light entrance surface 216bD through which the light emitted from the first LEDs 217A, the second LEDs 217B, the third LEDs 217C, and the fourth LEDs 217D enters the light guide plate 216, respectively. Accordingly, a sufficient large amount of incident light that enters the light guide plate 216 is ensured and this is effective to increase a size of the backlight device. The distance E between the third LEDs 217C and the third light entrance surface 216bC is relatively small and the light entrance efficiency of the light emitted from the third LEDs 217C is improved. The distance F between the fourth LEDs 217D and the fourth light entrance surface 216bD is relatively great and the light entrance efficiency of the light emitted from the fourth LEDs 217D is not further decreased from the certain value. Accordingly, the light use efficiency as a whole is further improved. The distance H between the second positioning portions 36 and the fourth light entrance surface 216bD is relatively greater than the distance G between the second positioning portions 36 and the third light entrance surface 216bC of the light guide plate 216. With such a configuration, the movement amount of the fourth light entrance surface 216bD due to the thermal expansion of the light guide plate 216 is greater than the movement amount of the third entrance surface 216bC. The light guide plate 216 can increase its size by using the relatively great distance F that is provided between the fourth LEDs 217D and the fourth light entrance surface 216bD. This minimizes the total of the distance E provided between the third LEDs 217C and the third light entrance surface 216bC and the distance F provided between the fourth LEDs 217D and the fourth light entrance surface 216bD. This effectively decreases the size (of the frames) of the backlight device.

Fourth Embodiment

Figure 18:
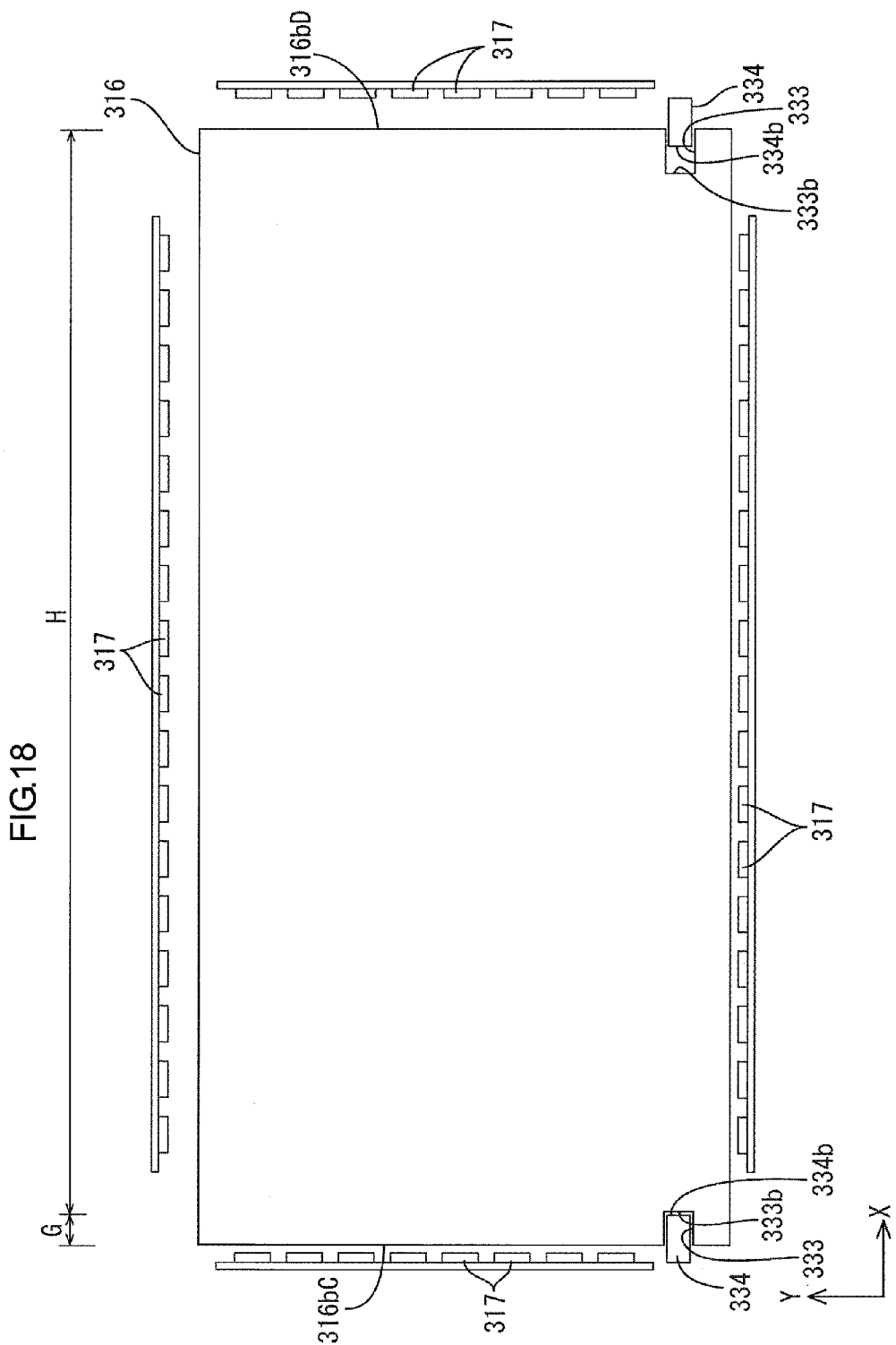
FIG. 18 is a plan view generally illustrating an arrangement configuration of LEDs, a light guide plate, positioning portions, and fitting portions according to a fourth embodiment.

A fourth embodiment will be described with reference to FIG. 18. A configuration according to the fourth embodiment includes the configuration according to the third embodiment without the second positioning portions and the second fitting portions. The constructions, functions, and effects similar to those of the third embodiment will not be described.

According to the present embodiment, as illustrated in FIG. 17, the LEDs 317 are arranged to be opposed to each of the four side surfaces of the light guide plate 316 that has a square plan view shape. The light guide plate 316 includes a pair of fitting portions 333 on short-side end portions thereof. A pair of positioning portions 334 is fitted to the pair of fitting portions 333 with concavo-convex fitting to position the light guide plate 316. Namely, the configuration according to the present embodiment is the configuration of the third embodiment without the second positioning portions and the second fitting portions. One of the positioning portions 334 on the left side in FIG. 17 has a second side surface 334b that is adjacent to or in contact with a second side surface 333b of the fitting portion 333. The positioning portion 334 on the right side in the drawing has the second side surface 334b that is away from the second side surface 333b of the fitting portion 333 with a certain space. The certain space allows the light guide plate 316 to increase its size in the long-side direction (the X-axis direction) and expand from the positioning portion 334 on the left side in the drawing. The fitting portions 333 and the positioning portions 334 on the left side in FIG. 17 are positioned such that a distance G from the second side surfaces 333b, 334b to the third light entrance surface 316bC is relatively small and a distance H from the second side surfaces 333b, 334b to the fourth light entrance surface 315bD is relatively great. The distances G, H are effectively set to satisfy the formulae (7) and (8) described in the third embodiment.

Fifth Embodiment

A fifth embodiment will be described with reference to FIGS. 18 to 23. A configuration according to the fifth embodiment further includes cabinets Ca, Cb that sandwich a liquid crystal display device 410 from front and rear sides. The constructions, functions, and effects similar to those of the first embodiment will not be described.

Figure 20:
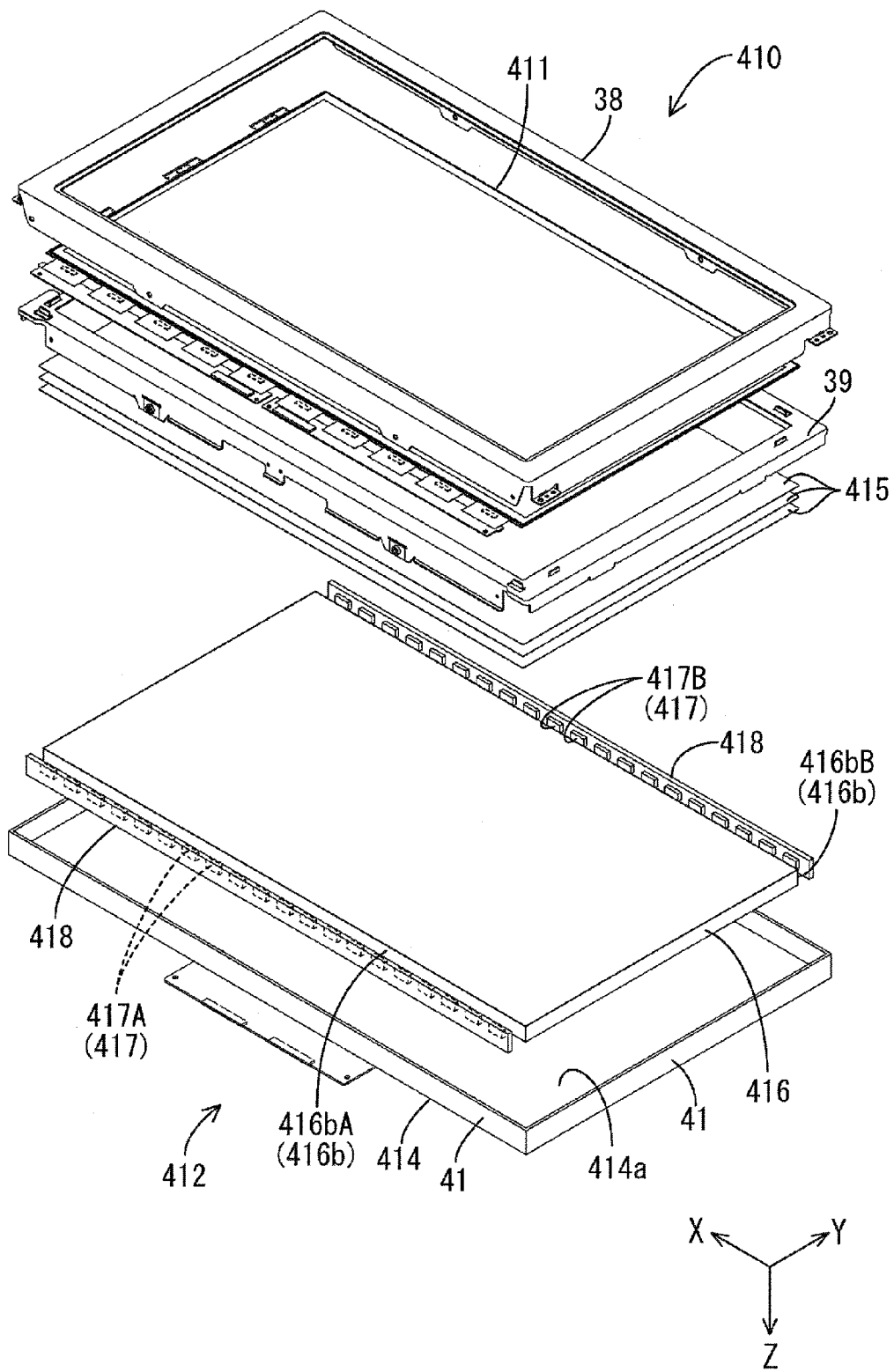
FIG. 20 is an exploded perspective view of a general configuration of the liquid crystal display device of the liquid crystal display device.

As illustrated in FIG. 19, a television device TV according to the present embodiment includes the liquid crystal device 410, the front and rear cabinets Ca, Cb that hold the liquid crystal display device 410 therebetween, a power source P, a tuner T, and a stand S. The liquid crystal display device 410 is held in the cabinets Ca, Cb in a vertical position. As illustrated in FIG. 20, the liquid crystal display device 410 includes a liquid crystal panel 411 and a backlight unit 412 as an external light source. The liquid crystal panel 411 and the backlight unit 412 are held with a bezel 413 having a frame-like shape. The liquid crystal panel 411 has a configuration similar to the one in the first embodiment.

Figure 21:
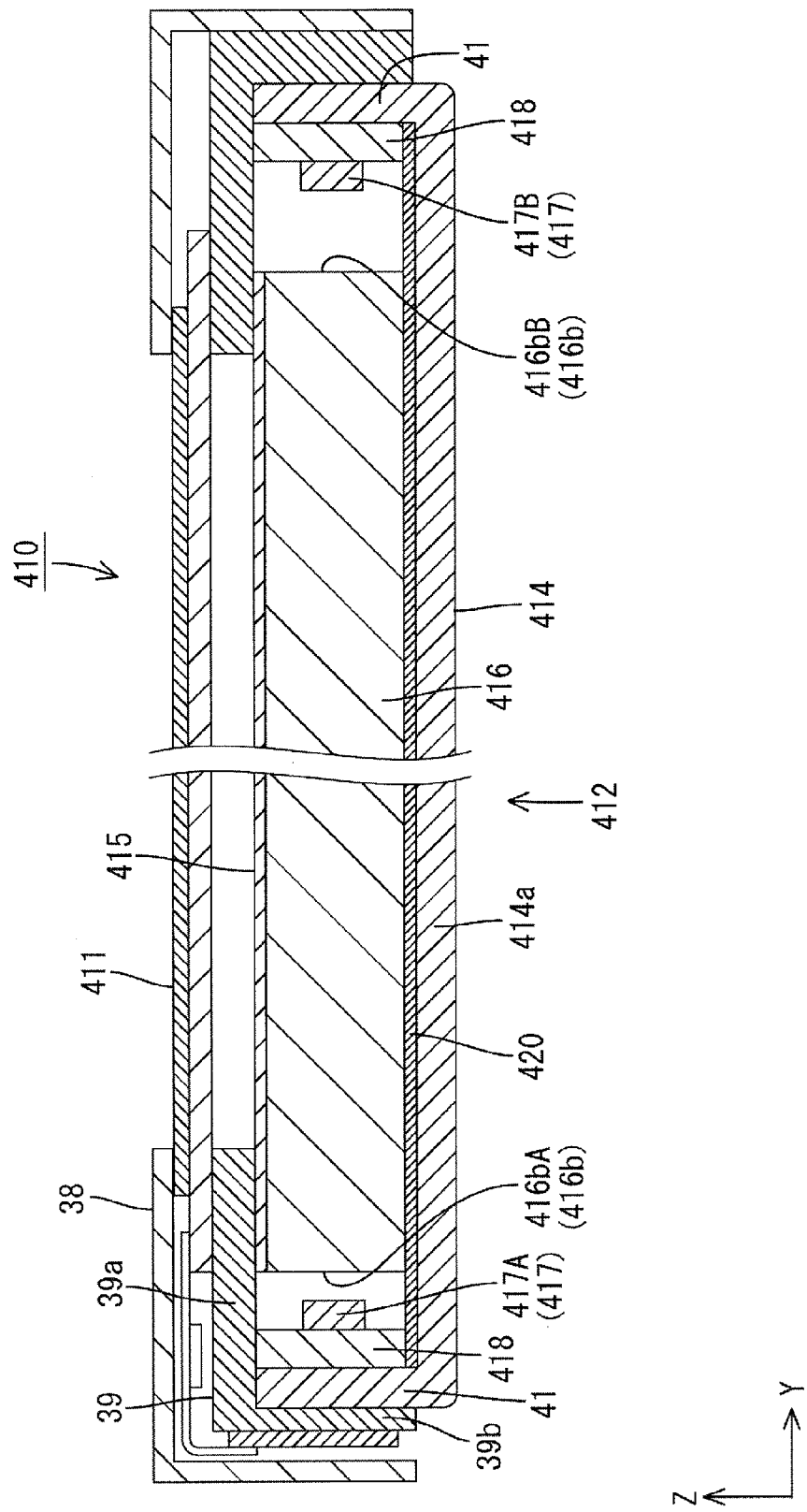
FIG. 21 is a cross-sectional view of the liquid crystal display device taken along a short-side direction thereof.
Figure 22:
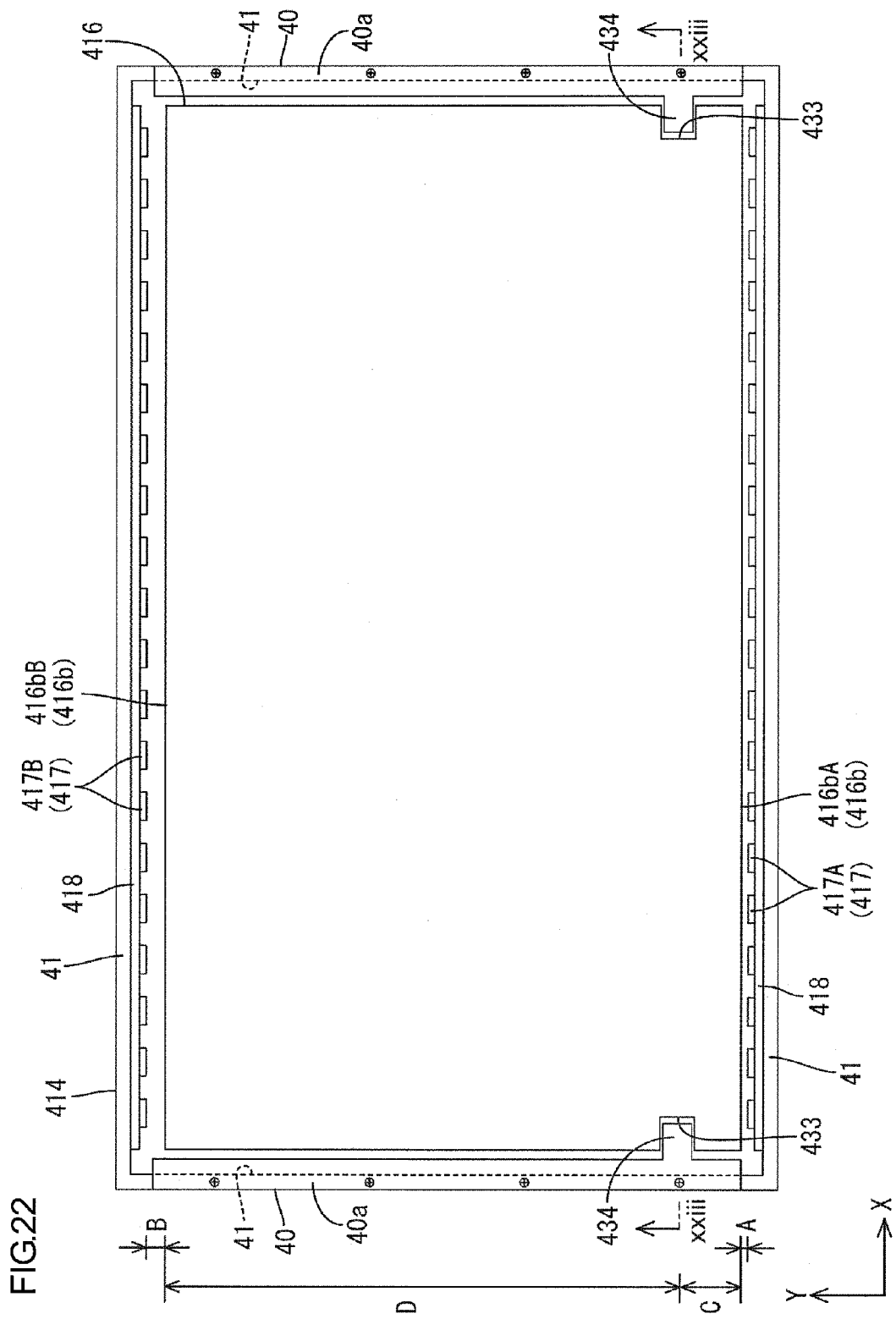
FIG. 22 is a plan view illustrating an arrangement configuration of LEDs, a light guide plate, positioning portions in a chassis.
Figure 23:
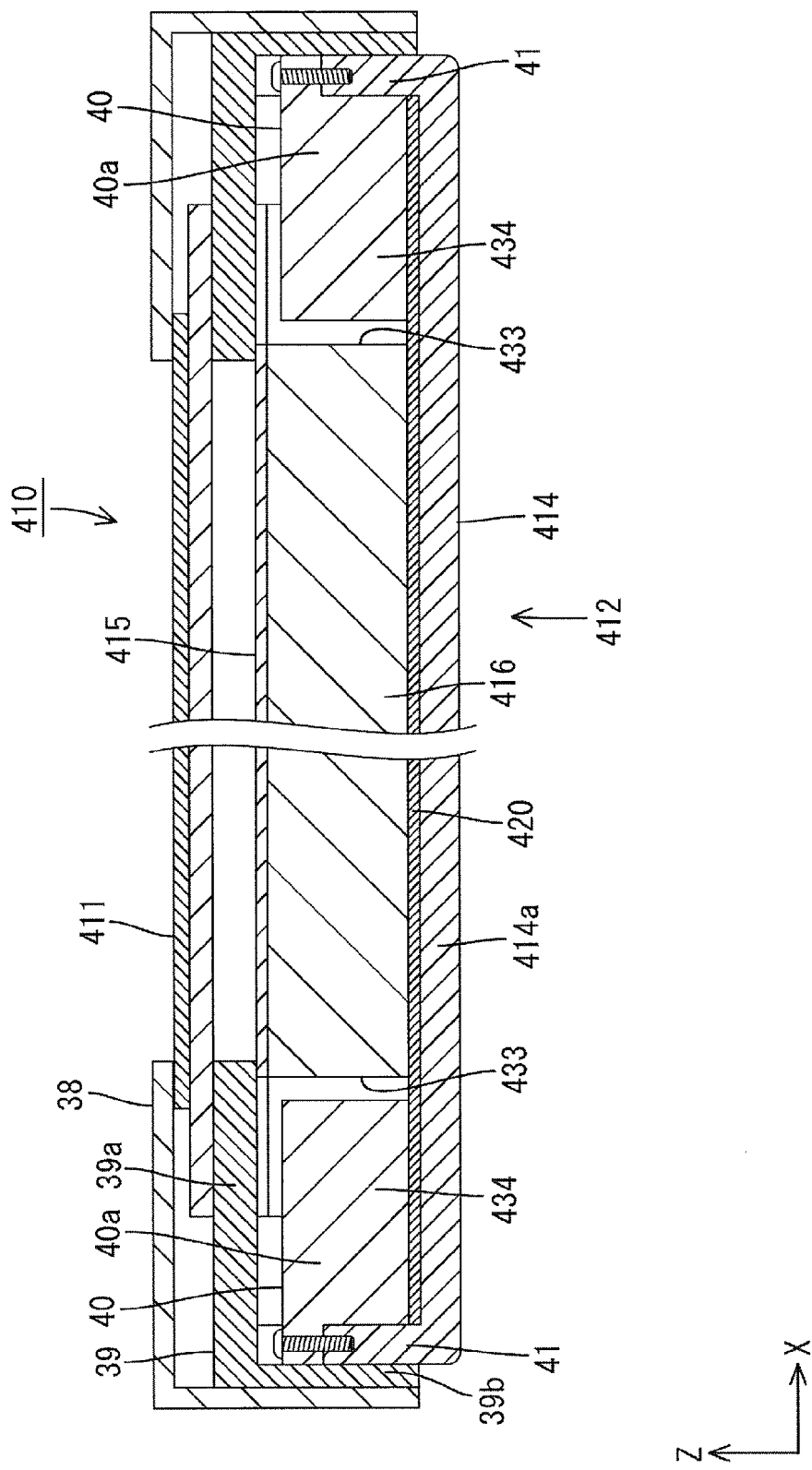
FIG. 23 is a cross-sectional view of FIG. 22 taken along line xxiii-xxiii.

As illustrated in FIGS. 20 and 21, the backlight unit 412 includes a chassis 414 and an optical member 415. The chassis 414 has a box-like shape and has a light exit portion 414c that opens to the front side. The optical member 415 covers the light exit portion 414c. The chassis 414 holds a pair of LED boards 418 on each of which LEDs 417 are mounted, a light guide plate 416, and a frame 39. The frame 39 presses the light guide plate 416 and the optical member 415 from the front side and receives the liquid crystal panel 411 from the rear side. As illustrated in FIGS. 22 and 23, the chassis 414 further includes a pair of positioning members 40 that position the light guide plate 416.

As illustrated in FIGS. 20 and 21, the chassis 414 includes a light guide plate receiving portion 414a and side plates 41. The light guide plate receiving portion 414a has a landscape rectangular shape in a plan view, similar to the liquid crystal panel 411, and each of the side plates 41 extends from each of long-side outer ends and short-side outer ends of the light guide plate receiving portion 414a. The light guide plate receiving portion 414a extends over the light guide plate 416 and the light guide reflection sheet 420 arranged in the chassis 414 and supports them from the rear side. The LED boards 418 are attached to inner plate surfaces of the long-side side plates 41, respectively. The frame 39 and the bezel 38 are mounted to the outer side plate surfaces of the side plates 41 with screws.

The frame 39 is made of synthetic resin, and as illustrated in FIGS. 20 and 21, the frame 39 has a frame portion 39a and a wall frame portion 39b. The frame portion 39a extends parallel to the optical member 415 and the light guide plate 416 and has a frame-like shape. The wall frame portion 39b projects from an outer peripheral edge of the frame portion 39a toward the rear side and has a substantially short wall frame shape. The frame portion 39a is opposite the outer edge portions of the optical member 415 and the light guide plate 416 so as to hold down substantially entire edges of the optical member 415 and the light guide plate 416 from the front side. The wall frame portion 39b is mounted to fit to outer surfaces of the side plates 41 of the chassis 414. The frame portion 39a receives outer edge portions of the liquid crystal panel 411 from the rear side.

As illustrated in FIGS. 21 and 22, LED boards 418 in a pair are attached to the respective long-side side plates 41 of the chassis 414. The LEDs 417 mounted on each LED board 418 are arranged to be opposed to respective light entrance surfaces 416b of the light guide plate 416. The LEDs 417 arranged on a lower side with respect to the light guide plate 416 in FIG. 22 (on the left side in FIG. 21) are first LEDs 417A, and the LEDs 417 arranged on an upper side with respect to the light guide plate 415 in FIG. 22 (on the right side in FIG. 21) are second LEDs 417B. A distance A between the first LEDs 417A and an opposed first light entrance surface 416bA is relatively small and a distance B between the second LEDs 417B and an opposed second light entrance surface 416bB is relatively great.

As illustrated in FIGS. 22 and 23, the positioning members 40 are attached to the respective short-side side plates 41 of the chassis 414. The positioning member 40 includes a base portion 40a and a positioning portion 434. The base portion 40a extends along the side plate 41 and the positioning portion 434 projects from a part of an inner surface of the base portion 40a toward the light guide plate 416. The base portion 40a is in contact with an inner plate surface and a front side end surface of the short-side side plate 41 of the chassis 414 and fixed to the side plate 41 with screws. The positioning portion 434 is fitted into the fitting portion 322 that is a recess in the short side end portion of the light guide plate 416. Accordingly, the light guide plate 416 is positioned with respect to the Y-axis direction, i.e., the direction in which the LEDs 417 and the light guide plate 416 are arranged. The positioning portions 434 and the fitting portions 433 are positioned such that a distance C from the positioning portions 434 and the fitting portions 433 to the first light entrance surface 416bA is relatively small and a distance D from the positioning portions 434 and the fitting portions 433 to the second light entrance surface 416bB is relatively great.

As described before, in the configuration provided with the cabinets Ca, Cb holding the liquid crystal display device 410 from the front and rear sides, the frame 39 arranged between the light guide plate 416 and the liquid crystal panel 411, and the positioning members 40 attached to the side plates 41 of the chassis 414, the positioning portions 434 and the fitting portions 433 are arranged as described before and accordingly, the light use efficiency is improved.

Sixth Embodiment

A sixth embodiment will be described with reference to FIGS. 24 and 25. According to the sixth embodiment, in the configuration of the fifth embodiment, positioning portions 534 are integrally formed with the chassis 514. The constructions, functions, and effects similar to those of the fifth embodiment will not be described.

Figure 24:
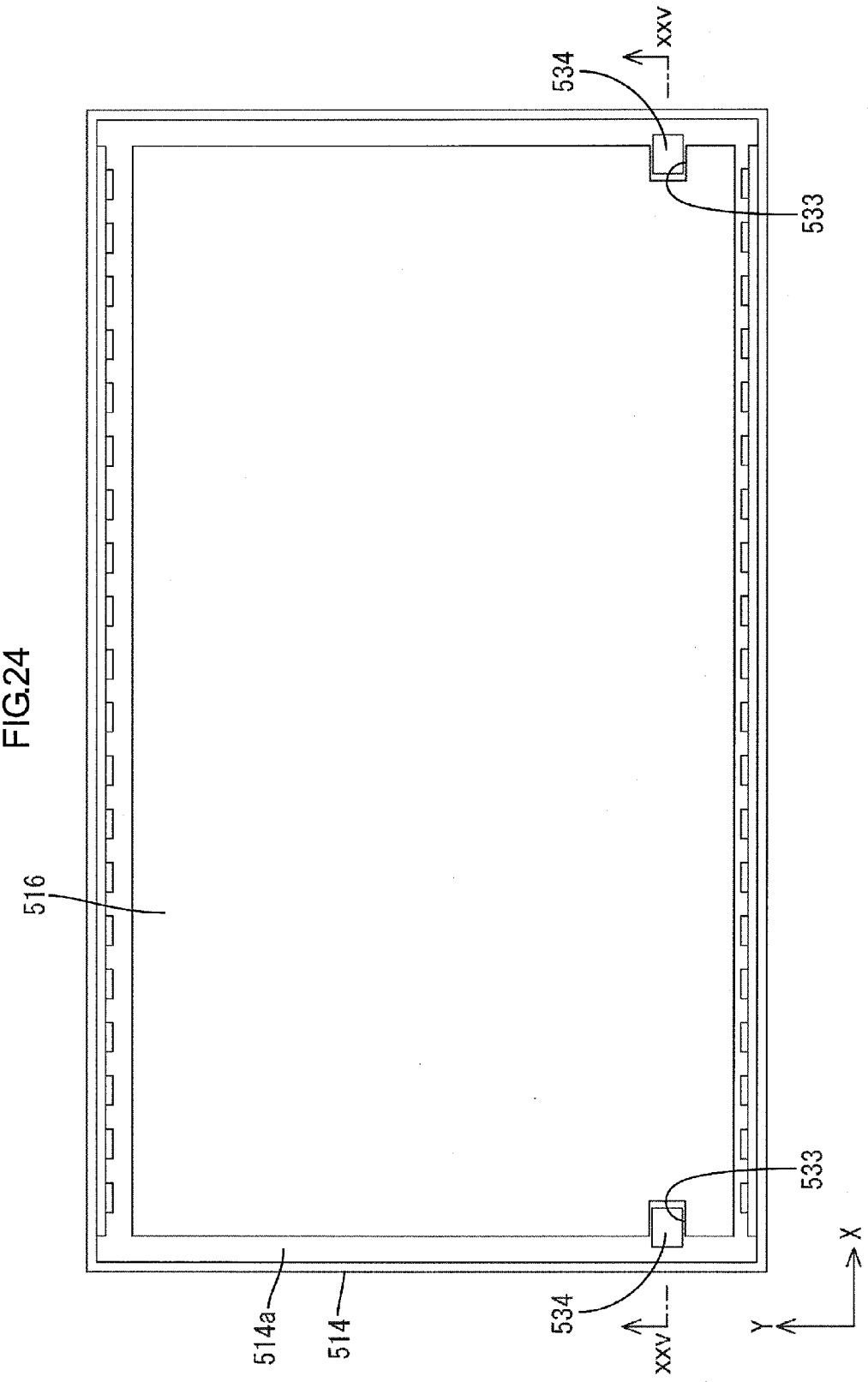
FIG. 24 is a plan view illustrating an arrangement configuration of LEDs, a light guide plate, and positioning portions in a chassis according to a sixth embodiment.
Figure 25:
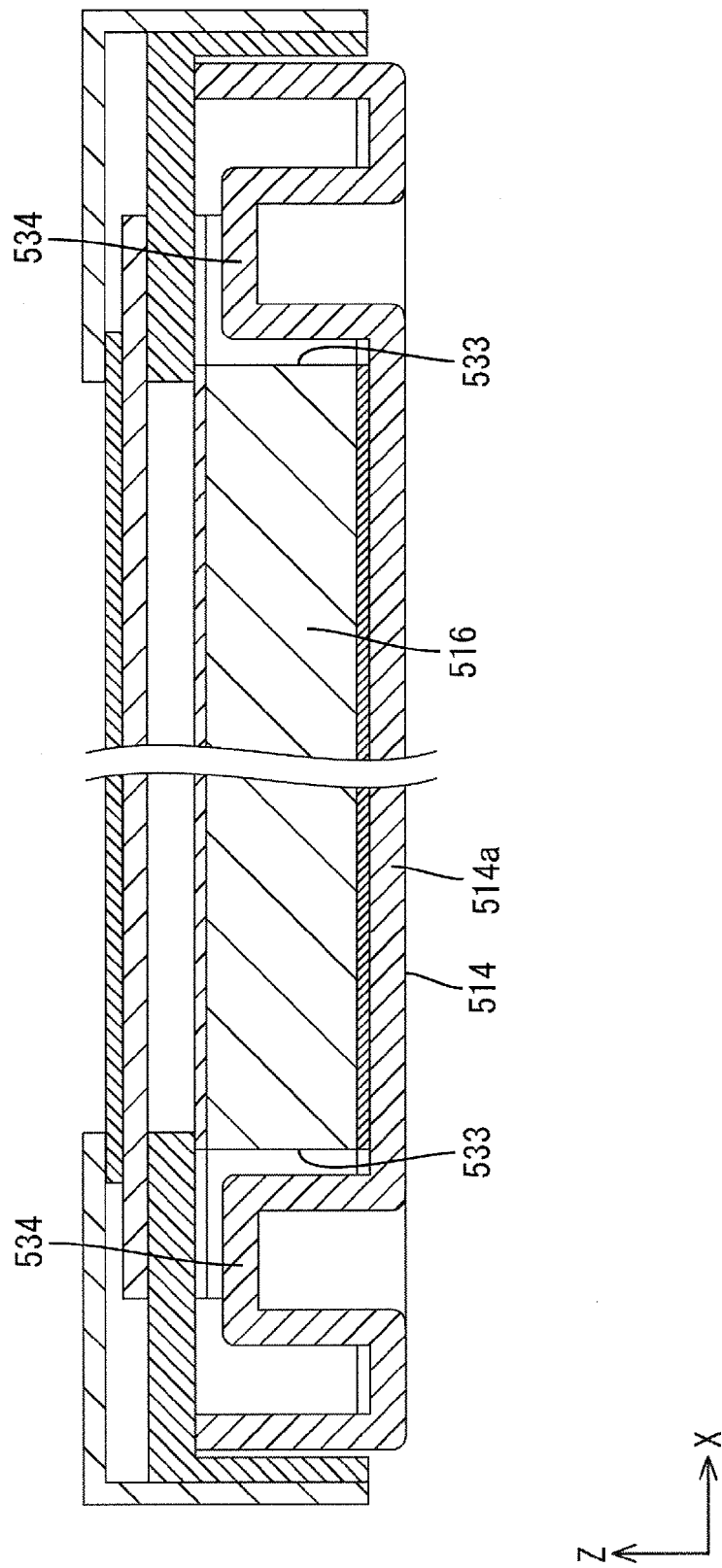
FIG. 25 is a cross-sectional view of FIG. 24 taken along line xxv-xxv.

As illustrated in FIGS. 24 and 25, the positioning portions 523 according to the present embodiment are integrally formed with a light guide plate receiving portion 514a of the chassis 514. The light guide plate receiving portion 514a includes portions that overlap the fitting portions 422 of the light guide plate 516 with a plan view. The overlapped portions partially project toward the front side and the projected portions constitute the positioning portions 534 that are fitted to the fitting portions 533 with concavo-convex fitting.

Seventh Embodiment

A seventh embodiment will be described with reference to FIGS. 26 and 27. According to the seventh embodiment, in the configuration of the fifth embodiment, positioning portions 634 are attached to a light guide plate receiving portion 614a of a chassis 614. The constructions, functions, and effects similar to those of the fifth embodiment will not be described.

Figure 26:
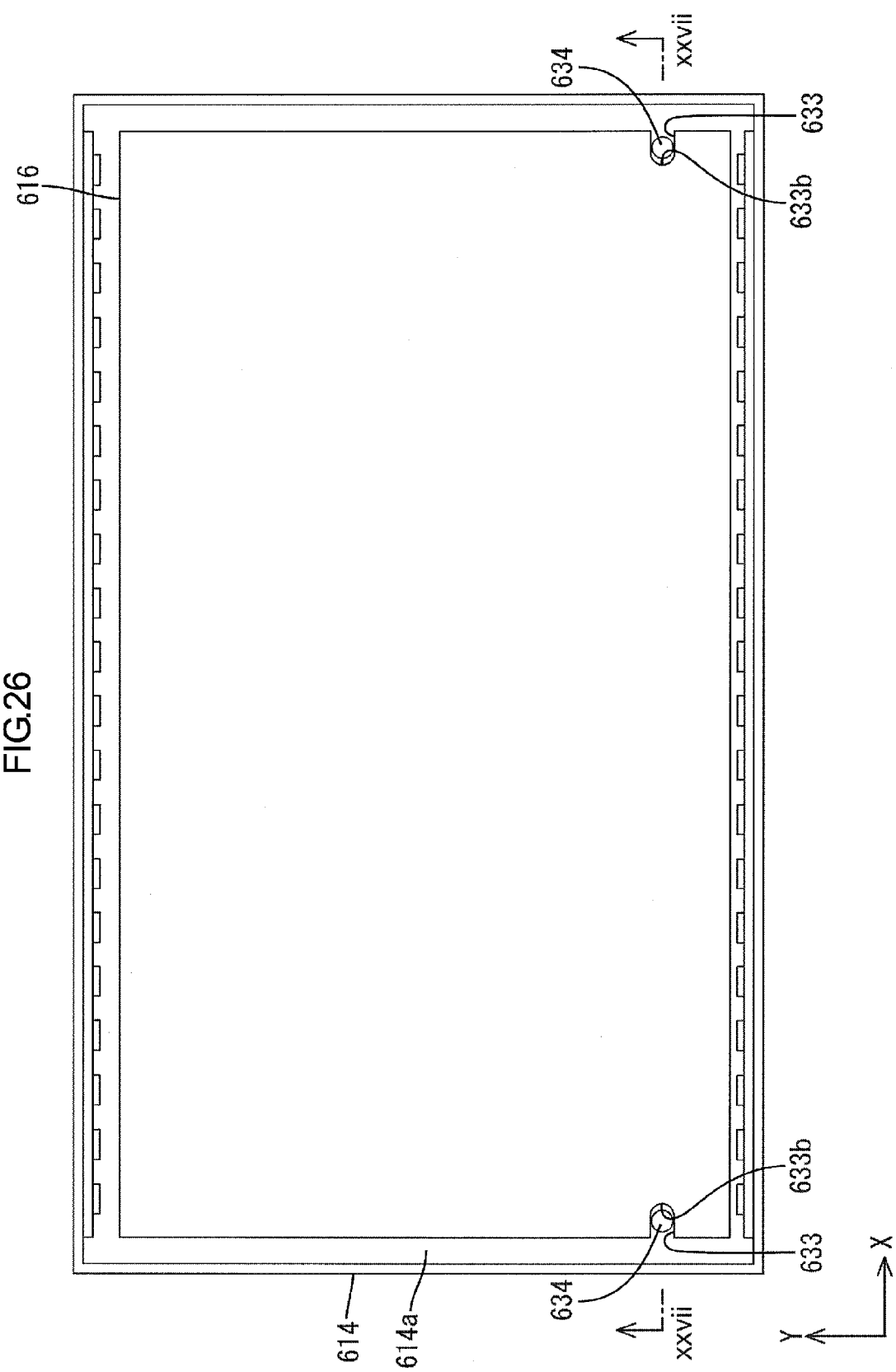
FIG. 26 is a plan view illustrating an arrangement configuration of LEDs, a light guide plate, and positioning portions in a chassis according to a seventh embodiment.
Figure 27:
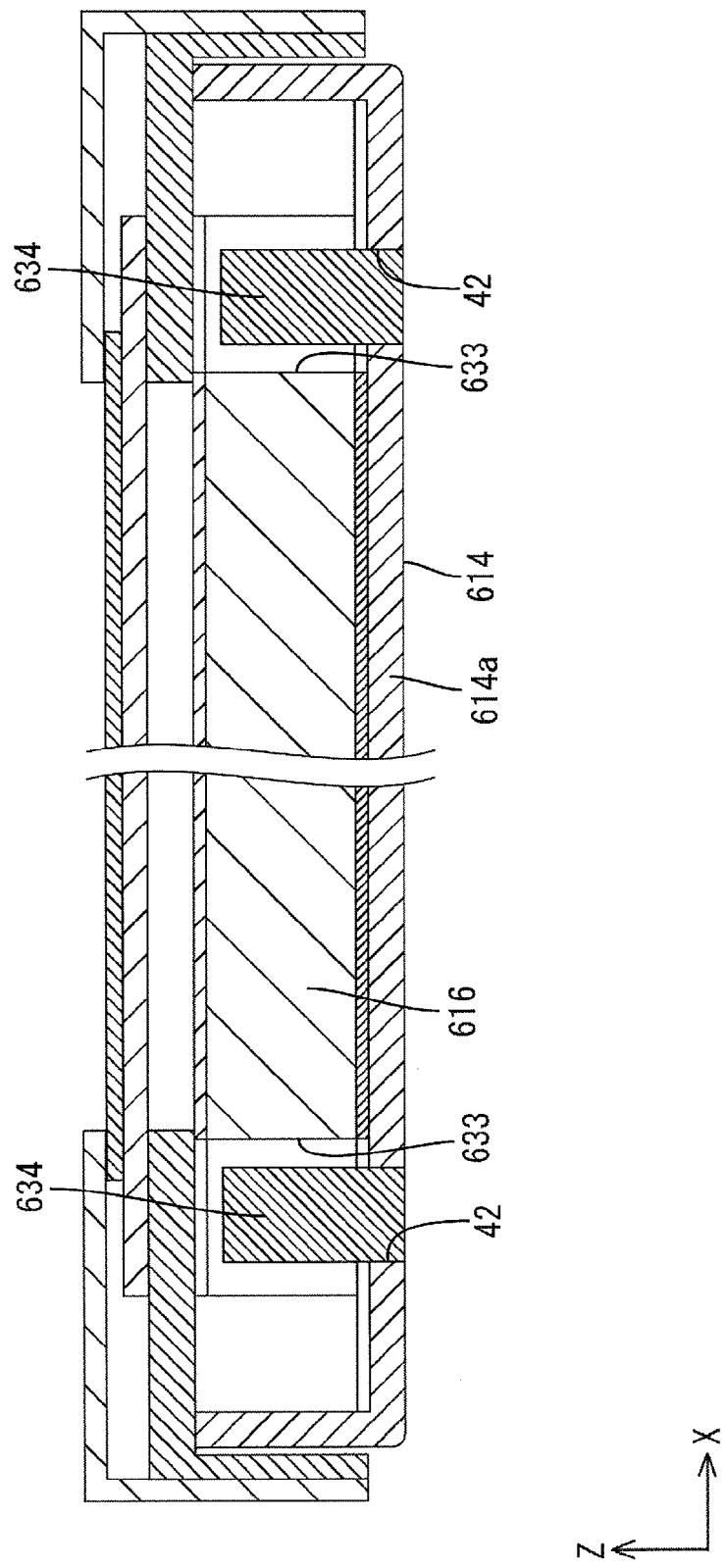
FIG. 27 is a cross-sectional view of FIG. 26 taken along line xxvii-xxvii.

As illustrated in FIGS. 26 and 27, the positioning portions 634 according to the present embodiment have a post-like shape. The positioning portions 634 are fitted into mounting holes 42 formed in the light guide receiving portion 614a of the chassis 614 and attached to the chassis 614. A light guide plate 616 includes fitting portions 633 that are recessed in short-side end portions of the light guide plate 616. The fitting portion 633 has a second side surface 633b having an arc-shaped surface (a curved surface) following an outer peripheral surface of the positioning portion 634.

Eighth Embodiment

An eighth embodiment will be described with reference to FIG. 28. According to the eighth embodiment, a concavo-convex relation of positioning portions 734 and fitting portions 733 are opposite from that in the configuration of the sixth or seventh embodiment. The constructions, functions, and effects similar to those of the sixth or seventh embodiment will not be described.

Figure 28:
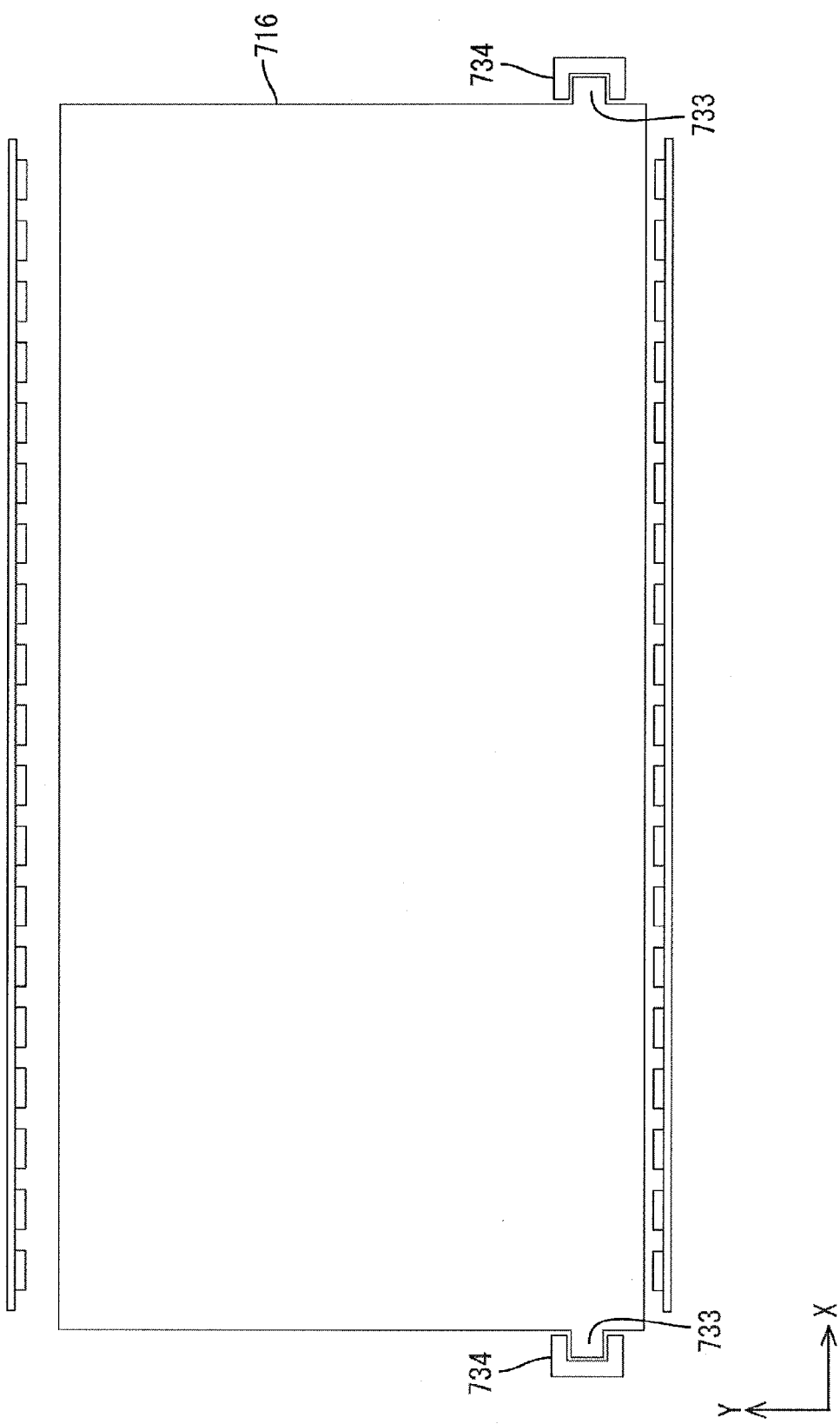
FIG. 28 is a plan view illustrating an arrangement configuration of LEDs, a light guide plate, and positioning portions according to an eighth embodiment.

As illustrated in FIG. 28, the fitting portions 733 according to the present embodiment project from short-side end surfaces (side surfaces) of a light guide plate 716 toward a side along the X-axis direction. The fitting portion 733 has a square shape having a vertical elongated plan view. The positioning portion 734 has a substantially gate-like shape with a plan view so as to surround three outer side surfaces of the fitting portion 733. The positioning portion 734 has a recess that is fitted to the fitting portion 733 that is a projection.

Ninth Embodiment

A ninth embodiment will be described with reference to FIG. 29. A configuration according to the ninth embodiment includes the configuration of the sixth or seventh embodiment without the fitting portions. The constructions, functions, and effects similar to those of the sixth or seventh embodiment will not be described.

Figure 29:
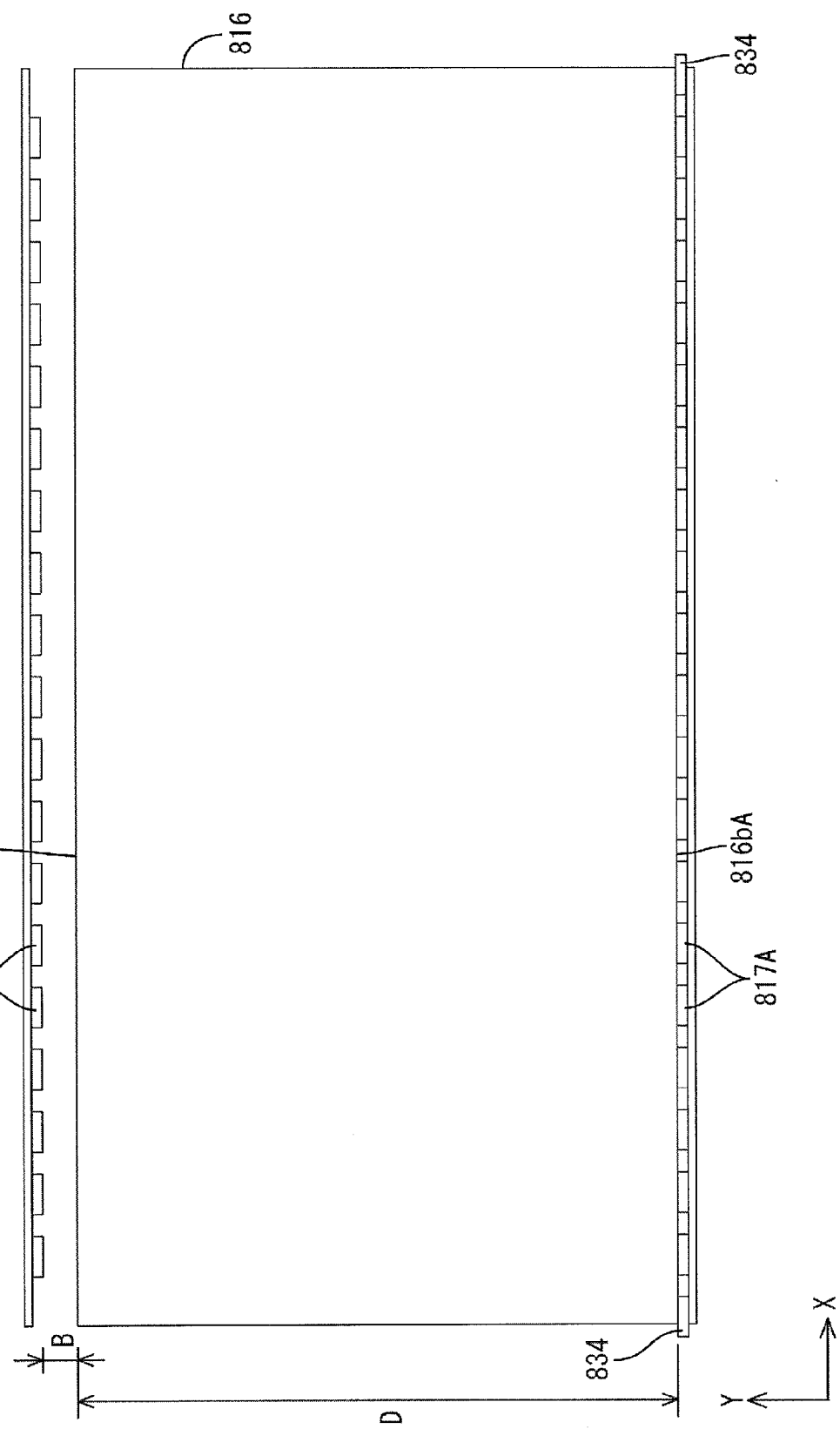
FIG. 29 is a plan view illustrating an arrangement configuration of LEDs, a light guide plate, and positioning portions according to a ninth embodiment.

As illustrated in FIG. 29, positioning portions 834 according to the present embodiment are arranged between a first light entrance surface 816bA of a light guide plate 816 and a LED board 818I on which first LEDs 817A are mounted. The positioning portion 834 is in contact with the first light entrance surface 816bA of the light guide plate 816 so as to position the light guide plate 816 with respect to the Y-axis direction (the direction in which the first LEDs 817A, the light guide plate 816, and second LEDs 817B are arranged). Therefore, the light guide plate 816 does not include fitting portions as described in the first to eighth embodiments.

In such a configuration, a distance C between the positioning portion 834 and the first light entrance surface 816bA is substantially zero and a distance D between the positioning portion 834 and a second light entrance surface 816bB is substantially equal to a short-side dimension of the light guide plate 816 (a dimension along the Y-axis direction). The first LEDs 817A are arranged such that the distance A between the first LEDs 817A and the first light entrance surface 816bA is substantially zero. The second LEDs 817B are arranged such that a distance B between the second LEDs 817B and the second light entrance surface 816bB is substantially equal to the maximum size increase amount of the light guide plate 816 in the Y-axis direction caused by the thermal expansion. With such a configuration, the light entrance efficiency of light emitted from the first LEDs 817A and entering through the first light entrance surface 816bA becomes highest and the light entrance efficiency of light emitted from the second LEDs 817B and entering through the second light entrance surface 816bB is decreased to be lowest and is not further decreased (refer to a graph in FIG. 13). The light entrance efficiency of light with the distance A being equal to the distance B is referred to as a reference value. A plus difference value between the reference value and the light entrance efficiency of light emitted from the first LEDs 817A and entering the light guide plate 816 through the first light entrance surface 816bA (the light entrance efficiency is higher than the reference value) is greater than a minus difference value between the reference value and the light entrance efficiency of light emitted from the second LED 817B and entering the light guide plate 816 through the second light entrance surface 816bB (the light efficiency is lower than the reference value). The difference value relating the light entrance efficiency of light emitted from the first LEDs 817A becomes maximum (refer to the graph in FIG. 14). Accordingly, the light use efficiency becomes highest.

Tenth Embodiment

A tenth embodiment will be described with reference to FIG. 30. A configuration according to the tenth embodiment includes the configuration of the fifth embodiment in which a cold cathode tube 43 is used as the light source. The constructions, functions, and effects similar to those of the fifth embodiment will not be described.

Figure 30:
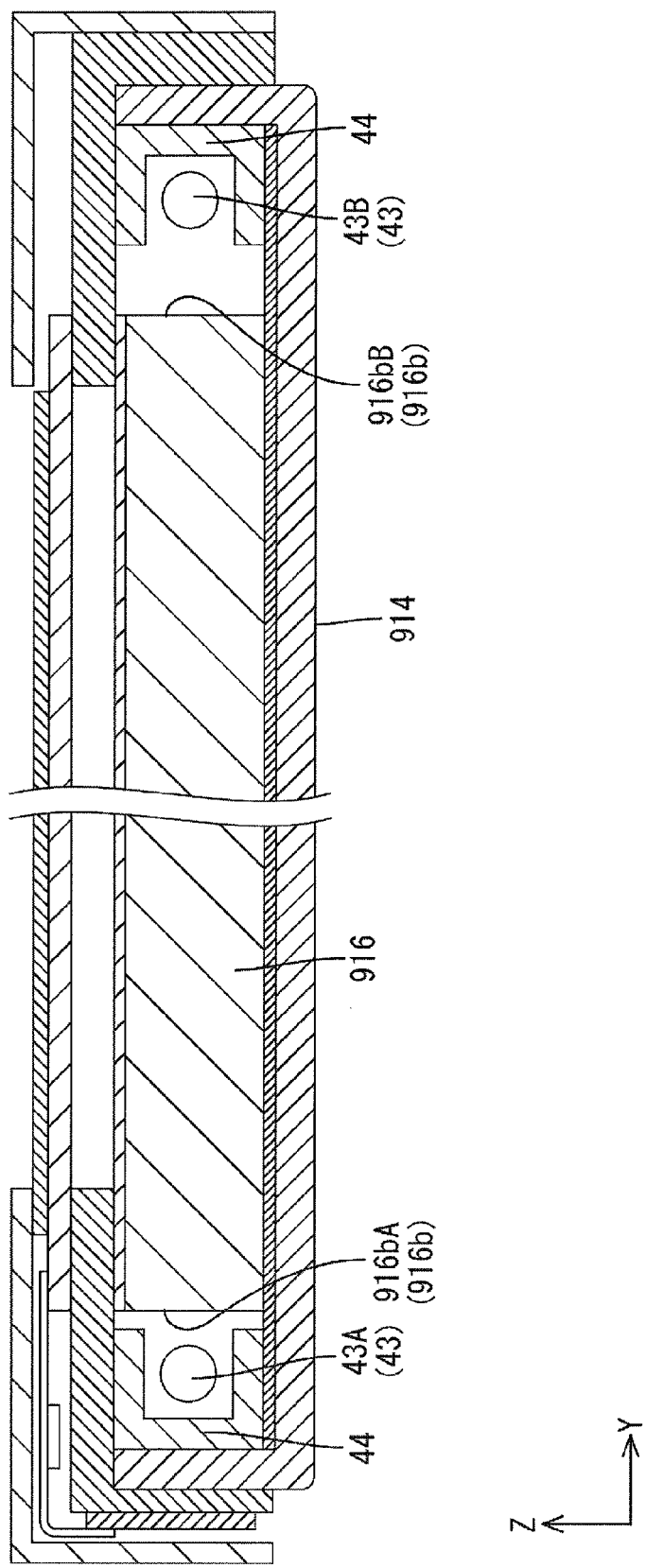
FIG. 30 is a cross-sectional view of a liquid crystal display device according to a tenth embodiment.

According to the present embodiment, as illustrated in FIG. 30, the light source is the cold cathode tube 43 and the cold cathode tubes 43 and reflectors 44 are arranged in a chassis 914. The cold cathode tube 43 has an elongated tubular shape and is arranged in each long-side end portion of the chassis 914 such that an elongated direction thereof (an axial direction) matches a long-side direction of the chassis 914. The reflector 44 has a substantially gate-like shape that surrounds the cold cathode tube 43 and opens toward a light guide plate 916. The reflector 44 has a white surface having a good light reflection property. Light emitted from the cold cathode tube 43 directly enters the light guide plate 916 through a light entrance surface 916b or indirectly enters the light guide plate 916 through a light entrance surface 916b after reflecting off the reflector 44. With the configuration having the cold cathode tube 43 and the reflector 44, the light intensity distribution of light directing from an opening end of the reflector 44 toward the light entrance surface 916b is a substantially lambertian light intensity distribution. A pair of the cold cathode tubes 43 includes a first cold cathode tube 43A arranged on a left side in FIG. 30 and a second cold cathode tube 43B arranged on a right side in FIG. 30. The first cold cathode tube 43A is away from an opposed first light entrance surface 916bA with a relatively small distance and the second cold cathode tube 43B is away from an opposed second light entrance surface 916bB with a relatively great distance.

Other Embodiments

The present invention is not limited to the above embodiments explained in the above description and the drawings. The technology described herein may include the following embodiments.

Figure 31:
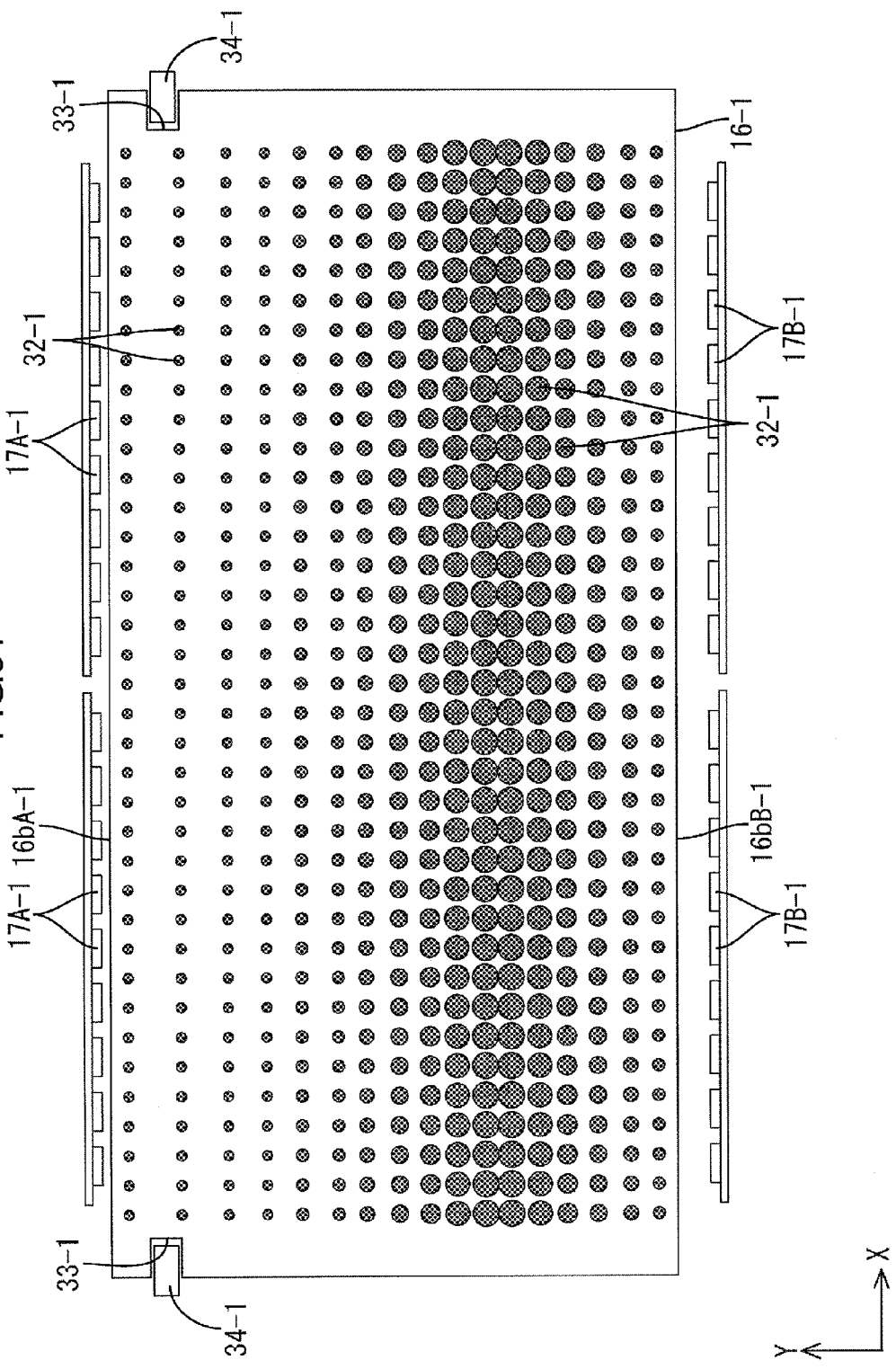
FIG. 31 is a plan view illustrating a general arrangement configuration of LEDs, alight guide plate, positioning portions, and fitting portions according to another embodiment (1).

(1) In the first embodiment, the LEDs, the positioning portions, and the fitting portions may be arranged in a reversed arrangement. Specifically, as illustrated in FIG. 31, first LEDs 17A-1 and a first light entrance surface 16bA-1 are arranged on an upper side in FIG. 31 and second LEDs 17B-1 and a second light entrance surface 16bB-1 may be arranged on a lower side in FIG. 31. Positioning portions 34-1 and fitting portions 33-1 may be arranged on an upper side in FIG. 31, that is close to the first LEDs 17A-1 (the first light entrance surface 16bA-1). Light reflection portion 32-1 may have a dot pattern such that an area distribution in a plate plane surface of a light guide plate 16-1 is maximum in a lower portion in FIG. 30, that is, a local area close to the second LEDs 17B-1.

(2) In the third embodiment, the LEDs, the positioning portions, and the fitting portions, the second positioning portions, and the second fitting portions may be arranged in a reversed arrangement. Specifically, as illustrated in FIG. 32, first LEDs 17A-2 and a first light entrance surface 16bA-2 may be arranged on an upper side in FIG. 32 and second LEDs 17B-2 and a second light entrance surface 16bB-2 may be arranged on a lower side in FIG. 32. Positioning portions 34-2 and fitting portions 33-2 may be arranged on an upper side in FIG. 32, that is close to the first LEDs 17A-2 (the first light entrance surface 16bA-2). Further, third LEDs 217C-2 and a third light entrance surface 16bC-2 may be arranged on a right side in FIG. 32 and fourth LEDs 17D-2 and a fourth light entrance surface 16bD-2 may be arranged on a left side in FIG. 32. Second positioning portions 36-2 and a second fitting portion 37-2 may be arranged on a right side in FIG. 32, that is close to the third LEDs 217C-2 (a third light entrance surface 16bC-2).

(3) In the first embodiment, the distance A between the first LEDs and the first light entrance surface and the distance between the second LEDs and the second light entrance surface are set to satisfy the relation represented by the formula (3). Specific values may be changed within a range satisfying the formula (3). The LEDs may be arranged such that the distance exceeds the value satisfying the formula (3), that is, the distance A may be equal to or more than $\frac{1}{3}$ of a total of the distance A and the distance B.

(4) The above described matters (3) are similarly applied to the third embodiment. Namely, the relation between the distance E between the third LEDs and the third light entrance surface and the distance F between the fourth LEDs and the fourth light entrance surface may not necessarily satisfy the formula (6) and the LEDs may be arranged such that the distance E is equal to or greater than $\frac{1}{3}$ of the total of the distance E and the distance F.

(5) In the first embodiment, the distance C between the positioning portions and the first light entrance surface and the distance D between the positioning portions and the second light entrance surface are set to satisfy the relation represented by the formula (4). Specific values may be changed within a range satisfying the formula (4). The LEDs may be arranged such that the distance exceeds the value satisfying the formula (4), that is, the distance C may be equal to or more than $\frac{1}{3}$ of a total of the distance C and the distance D.

(6) The above described matters (5) are similarly applied to the third embodiment. Namely, the relation between the distance G between the second positioning portions and the third light entrance surface and the distance G between the second positioning portions and the fourth light entrance surface may not necessarily satisfy the formula (7) and the LEDs may be arranged such that the distance G is equal to or greater than $\frac{1}{3}$ of the total of the distance G and the distance H.

(7) In the first embodiment, the ratio of the distance A between the first LEDs and the first light entrance surface and the distance B between the second LEDs and the second light entrance surface is equal to the ratio of the distance C between the positioning portions and the first light entrance surface and the distance D between the positioning portions and the second light entrance surface (the relation satisfying the formula (5)). The values of the above two ratios may differ from each other.

(8) In the third embodiment, the ratio of the distance E between the third LEDs and the third light entrance surface and the distance F between the fourth LEDs and the fourth light entrance surface is equal to the ratio of the distance G between the second positioning portions and the third light entrance surface and the distance H between the second positioning portions and the fourth light entrance surface (the relation satisfying the formula (8)). The values of the above two ratios may differ from each other.

(9) In the second embodiment, the reflection sheet is arranged to cover the space provided between the second LEDs and the second light entrance surface. In addition to the reflection sheet arranged on the second LED side, another reflection sheet may be arranged to cover a space provided between the first LEDs and the first light entrance surface.

(10) In the third embodiment, a pair of the positioning portions (the fitting portions) and a pair of the second positioning portions (the second fitting portions) are provided. However, one positioning portion (one fitting portion) and one second positioning portion (one second fitting portion) may be provided.

(11) In the first and fifth embodiments, the LEDs are arranged to be opposed to a pair of long-side end surfaces of the light guide plate. However, the LED may be arranged to be opposed to a pair of short-side end surfaces of the light guide plate. In such a configuration, the short-side end surfaces of the light guide plate may be the first light entrance surface and the second light entrance surface, and the fitting portions may be provided in end portions of long sides of the light guide plate, and the positioning portion may be fitted to the fitting portions with concavo-convex fitting.

(12) In the above embodiments, the LEDs (the cold cathode tubes) are arranged to be opposed to a pair of end surfaces or four end surfaces of the light guide plate. However, the LEDs may be arranged to be opposed to any three end surfaces.

(13) Each configuration of the second to fourth embodiments may be applied to the sixth to tenth embodiments.

(14) Each configuration of the sixth to tenth embodiments may be applied to the first embodiment.

(15) In the above embodiments, the LED board (the first cold cathode tube) having the first LEDs and the LED board (the second cold cathode tube) having the second LEDs are parts of the same type. However, the LED board having the first LEDs and the LED board having the second LEDs may be parts of different types.

(16) Other than the above embodiments, the number of LED boards, the number of LEDs mounted on the LED board, and the arrangement intervals between the LEDs on the LED board may be altered if necessary.

(17) Other than the above embodiments, the plane shape, the cross-sectional shape, and the number of the positioning portions and the fitting portions may be altered if necessary.

(18) The dot pattern of the light reflection portion formed on the plate surface opposite from the light exit surface of the light guide plate may have an arrangement configuration different from that in the above embodiments, if necessary.

(19) in the first to ninth embodiments, the LEDs are used as the light source. However, other light sources such as an organic EL diode may be used as the light source.

(20) In the tenth embodiment, the cold cathode tube is used as the light source. However, other linear light sources such as a hot cathode tube may be used as the light source.

(21) In the above embodiments, the color filter of the liquid crystal panel includes the color portions of three colors including red (R), green (G), and blue (B). However, the color filter may include color portions of four colors or more.

(22) In the above embodiments, the TFTs are used as switching components of the liquid crystal display device. However, the technology described herein may be applied to liquid crystal display devices including a liquid crystal display panel using switching components other than TFTs (e.g., thin film diodes (TFDs)). Furthermore, the technology may be applied to a liquid crystal display device including a black-and-white liquid crystal display panel other than a liquid crystal display device including a color liquid crystal display panel.

(23) In the above embodiments, the liquid crystal display device includes the liquid crystal panel as the display panel. However, the technology described herein may be applied to display devices including other kinds of display panels.

(24) In the above embodiments, the television device includes the tuner. However, the technology can be applied to display devices without including a tuner. Specifically, the technology can be applied to liquid crystal display devices that are used as digital signage or electronic black boards.

EXPLANATION OF SYMBOLS

10, 410: liquid crystal display device (display device), 11, 411: liquid crystal panel (display panel), 11a: CF substrate (substrate), 11*b*: array substrate (substrate), 12, 412: backlight device (lighting device), 14, 414, 514, 614, 914: chassis, 16, 116, 216, 316, 416, 516, 616, 716, 816, 916: light guide plate, 16*a*: light exit surface, 16*b*: light entrance surface, 16*b*A, 116*b*A, 216*b*A, 416*b*A, 816*b*A, 916*b*A: first light entrance surface, 16*b*B, 116*b*B, 216*b*B, 416*b*B, 816*b*B, 916*b*B: second light entrance surface, 17A, 117A, 217A, 417A, 817A: first LED (first light source), 17B, 117B, 217B, 417B, 817B: second LED (second light source), 18, 418: LED board (base board), 34, 334, 434, 534, 634, 734, 834: positioning portion, 35: reflection sheet, 36: second positioning portion, 43A: first cold cathode tube (first light source), 43B: second cold cathode tube (second light source), 216*b*C, 316*b*C: third light entrance surface, 216*bd*, 316*b*D: fourth light entrance surface, 217C: third LED (third light source), 217D: fourth LED (fourth light source), A to H: distance, TV: television device

The invention claimed is:

1. A lighting device comprising:
a light guide plate having at least one end surface as a light entrance surface and one plate surface as a light exit surface;
a first light source opposed to a first light entrance surface that is a first end surface of the light guide plate;
a second light source opposed to a second light entrance surface that is an end surface opposite from the first light entrance surface of the light guide plate, the second light source being away from the second light entrance surface with a distance relatively greater than a distance between the first light source and the first light entrance surface;
a positioning portion configured to position the light guide plate in a direction in which the first light source, the light guide plate, and the second light source are arranged, and to position the light guide plate with respect to the first light source and the second light source, the positioning portion being arranged to be away from the second light entrance surface with a distance relatively greater than a distance between the positioning portion and the first light entrance surface; and
a chassis where the first light source, the light guide plate, and the second light source are arranged, the chassis including the positioning portion that is fitted to a part of the light guide plate with concavo-convex fitting.

2. The lighting device according to claim 1, wherein
the distance between the first light source and the first light entrance surface is represented by A, the distance between the second light source and the second light entrance surface is represented by B, the distance between the positioning portion and the first light entrance surface is represented by C, and the distance between the positioning portion and the second light entrance surface is represented by D, and
the distance A and the distance C are set to satisfy following formulae (1) and (2)

[formula 1]

$$A \leq \tfrac{1}{3}(A+B) \quad (1)$$

[formula 2]

$$C \leq \tfrac{1}{3}(C+D) \quad (2).$$

3. The lighting device according to claim 1, wherein a ratio of the distance between the first light source and the first light entrance surface and the distance between the second light source and the second light entrance surface is substantially equal to a ratio of the distance between the positioning portion and the first light entrance surface and the distance between the positioning portion and the second light entrance surface.

4. The lighting device according to claim 1, wherein the first light source and the second light source are parts of a same type.

5. The lighting device according to claim 1, wherein the first light source and the second light source represent a lambertian light intensity distribution.

6. The lighting device according to claim 1, wherein each of the first light source and the second light source includes a base board and LEDs that are mounted on the base board.

7. A display device comprising:
the lighting device according to claim 1; and
a display panel displaying with using light from the lighting device.

8. The display device according to claim 7, wherein the display panel is a liquid crystal panel including a pair of substrates and liquid crystals enclosed therebetween.

9. A television device comprising the display device according to claim 7.

10. A lighting device comprising:
a light guide plate having at least one end surface as a light entrance surface and one plate surface as a light exit surface;
a first light source opposed to a first light entrance surface that is a first end surface of the light guide plate;
a second light source opposed to a second light entrance surface that is an end surface opposite from the first light entrance surface of the light guide plate, the second light source being away from the second light entrance surface with a distance relatively greater than a distance between the first light source and the first light entrance surface;
a positioning portion configured to position the light guide plate in a direction in which the first light source, the light guide plate, and the second light source are arranged, and to position the light guide plate with respect to the first light source and the second light source, the positioning portion being arranged to be away from the second light entrance surface with a distance relatively greater than a distance between the positioning portion and the first light entrance surface; and
a reflection member arranged to cover at least a space provided between the second light source and the second light entrance surface from a light exit side.

11. The lighting device according to claim 10, wherein the reflection member is selectively arranged to cover the space provided between the second light source and the second light entrance surface from the light exit side.

12. A display device comprising:
the lighting device according to claim 10; and
a display panel displaying with using light from the lighting device.

13. The display device according to claim 12, wherein the display panel is a liquid crystal panel including a pair of substrates and liquid crystals enclosed therebetween.

14. A television device comprising the display device according to claim 12.

15. A lighting device comprising:
a light guide plate having at least one end surface as a light entrance surface and one plate surface as a light exit surface;
a first light source opposed to a first light entrance surface that is a first end surface of the light guide plate;
a second light source opposed to a second light entrance surface that is an end surface opposite from the first light entrance surface of the light guide plate, the second light source being away from the second light entrance surface with a distance relatively greater than a distance between the first light source and the first light entrance surface;
a positioning portion configured to position the light guide plate in a direction in which the first light source, the light guide plate, and the second light source are arranged, and to position the light guide plate with respect to the first light source and the second light source, the positioning portion being arranged to be away from the second light entrance surface with a distance relatively greater than a distance between the positioning portion and the first light entrance surface;
a third light source opposed to a third light entrance surface of the light guide plate, the third light entrance surface being an end surface that is adjacent to the first light entrance surface and the second light entrance surface;
a fourth light source opposed to a fourth light entrance surface of the light guide plate, the fourth light entrance surface being an end surface opposite from the third light entrance surface, the fourth light source being arranged to have a distance from the fourth light entrance surface relatively greater than a distance between the third light source and the third light entrance surface; and
a second positioning portion configured to position the light guide plate in a direction in which the third light source, the light guide plate, and the fourth light source are arranged, and to position the light guide plate with respect to the third light source and the fourth light source, the second positioning portion arranged to have a distance from the fourth light entrance surface relatively greater than a distance from the third light entrance surface, wherein
the light guide plate has a square shape.

16. A display device comprising:
the lighting device according to claim 15; and
a display panel displaying with using light from the lighting device.

17. The display device according to claim 12, wherein the display panel is a liquid crystal panel including a pair of substrates and liquid crystals enclosed therebetween.

18. A television device comprising the display device according to claim 16.

\* \* \* \* \*